(12) United States Patent
Mavrofrides

(10) Patent No.: US 11,207,915 B1
(45) Date of Patent: Dec. 28, 2021

(54) WHEEL WITH INTERCHANGEABLE CAPS

(71) Applicant: Demetrios Mavrofrides, Orlando, FL (US)

(72) Inventor: Demetrios Mavrofrides, Orlando, FL (US)

( * ) Notice: Subject to any disclaimer, the term of this patent is extended or adjusted under 35 U.S.C. 154(b) by 126 days.

(21) Appl. No.: 16/720,438

(22) Filed: Dec. 19, 2019

Related U.S. Application Data

(60) Division of application No. 15/626,691, filed on Jun. 19, 2017, now Pat. No. 10,543,716, which is a continuation-in-part of application No. 14/286,325, filed on May 23, 2014, now Pat. No. 9,682,597.

(51) Int. Cl.
*B60B 7/00* (2006.01)
*B60B 7/06* (2006.01)

(52) U.S. Cl.
CPC ............ *B60B 7/0013* (2013.01); *B60B 7/066* (2013.01); *B60B 2900/572* (2013.01)

(58) Field of Classification Search
CPC ... B60B 7/0013; B60B 7/0066; B60B 7/0073; B60B 7/008; B60B 7/04; B60B 7/06; B60B 7/066; B60B 7/068; B60B 7/10; B60B 7/12
See application file for complete search history.

(56) References Cited

U.S. PATENT DOCUMENTS

| | | |
|---|---|---|
| 3,528,705 A | 9/1970 | Oldroyd |
| 4,040,672 A | 8/1977 | Imahashi |
| 4,295,685 A | 10/1981 | Spisak |
| 4,547,021 A | 10/1985 | Abbate Daga |
| 4,781,419 A | 11/1988 | Boothe |
| 5,064,249 A | 11/1991 | Hung |
| 5,152,854 A | 10/1992 | Maxwell |
| 5,443,582 A | 8/1995 | Ching |
| 5,464,276 A | 11/1995 | Ott |
| 5,494,336 A | 2/1996 | Russell |
| 5,584,537 A | 12/1996 | Miansian |
| 5,630,653 A | 5/1997 | Polka |
| 5,890,773 A | 4/1999 | Wright et al. |
| 6,238,007 B1 | 5/2001 | Wieczorek et al. |
| 6,443,531 B1 * | 9/2002 | Hogan .................. B60B 7/0053 301/37.34 |

(Continued)

*Primary Examiner* — Frank B Vanaman
(74) *Attorney, Agent, or Firm* — Brian S. Steinberger; Hilary F. Steinberger; Law Offices of Brian S. Steinberger, P.A.

(57) ABSTRACT

Systems, apparatus, devices, brackets, assemblies, and methods for a wheel hub with interchangeable caps for changing the appearance of wheels having exposed lug nuts about a center hole. A bracket invention having both a small cap and a large cap can be used on an existing wheel which exposes a center hole and the lug nuts. A smaller cap can be used to cover only the center hole of the wheel. A larger cap can be used to cover both the center hole and the exposed lug nuts on the wheel. An adapter ring can be used for OEM (original equipment manufacturer) wheels to allow for using the base that allows for either a small cap or large cap to be interchangeably used to change the exterior appearance of the wheel. The bracket can be integrated with the wheel, or be attachable onto the wheel. The caps can be mounted and dismounted by pressing and rotating spring biased emblems with either ball bearings or studs from the bases.

9 Claims, 48 Drawing Sheets

(56) References Cited

U.S. PATENT DOCUMENTS

| | | | |
|---|---|---|---|
| 6,502,308 B1 | 1/2003 | Carfora et al. | |
| 7,156,890 B1 | 1/2007 | Thompson et al. | |
| 7,246,860 B1 * | 7/2007 | Seitz | B60B 7/0046 |
| | | | 220/789 |
| 7,396,087 B1 * | 7/2008 | Baker | B60B 7/0013 |
| | | | 301/37.24 |
| 7,416,259 B2 * | 8/2008 | Dagh | B60B 7/04 |
| | | | 301/37.102 |
| 7,416,260 B1 | 8/2008 | Cuevas et al. | |
| D677,609 S | 3/2013 | Sabblah | |
| 9,682,597 B1 | 6/2017 | Mavrofrides | |
| 2003/0020322 A1 | 1/2003 | Zaniboni | |
| 2005/0179311 A1 | 8/2005 | Barney | |
| 2005/0195612 A1 | 9/2005 | Cho | |
| 2006/158021 A1 | 7/2006 | Dagh et al. | |
| 2007/0228807 A1 | 10/2007 | Leslie et al. | |
| 2009/0021071 A1 * | 1/2009 | Kinslow | B60B 7/10 |
| | | | 301/37.31 |
| 2011/0248551 A1 * | 10/2011 | Scicluna | B60B 1/006 |
| | | | 301/37.26 |
| 2013/0015698 A1 | 1/2013 | Butler et al. | |
| 2013/0106169 A1 | 5/2013 | Chu | |
| 2014/0152078 A1 | 6/2014 | Noriega | |
| 2014/0284994 A1 * | 9/2014 | Polka | B60B 7/14 |
| | | | 301/37.102 |
| 2015/0224819 A1 | 8/2015 | Huusmann | |
| 2016/0159142 A1 * | 6/2016 | Whitten | B60B 7/04 |
| | | | 301/108.1 |

\* cited by examiner

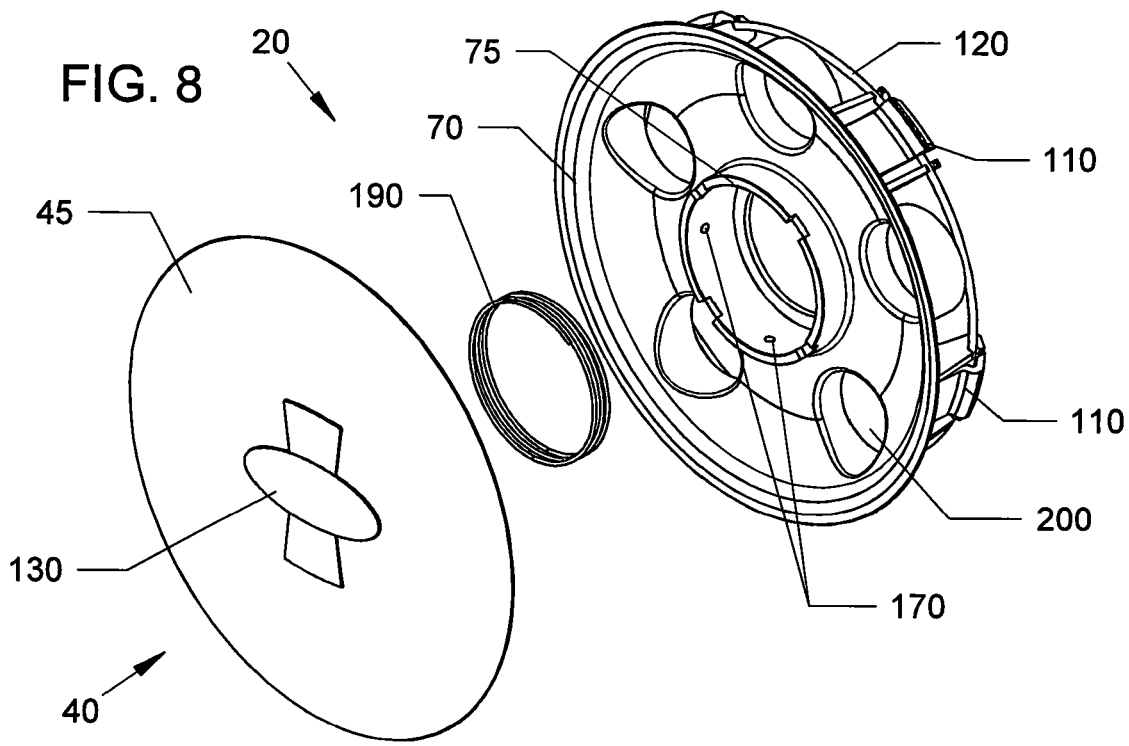
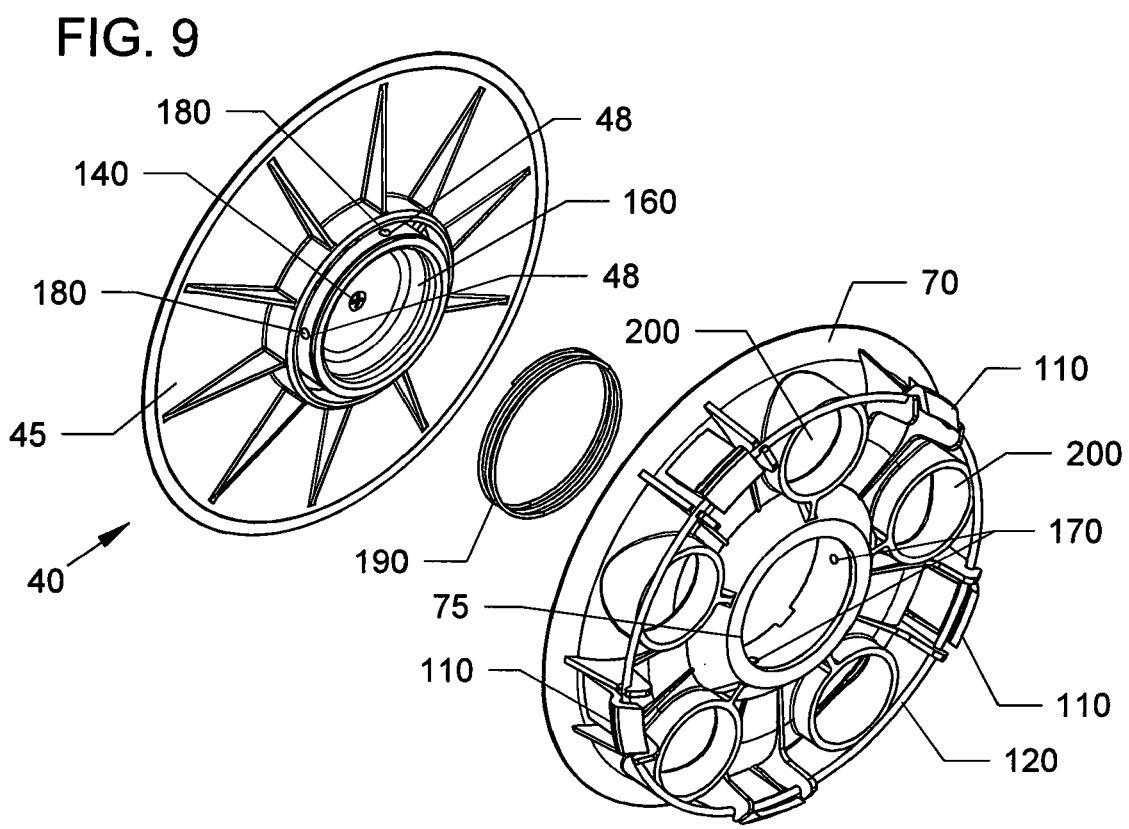

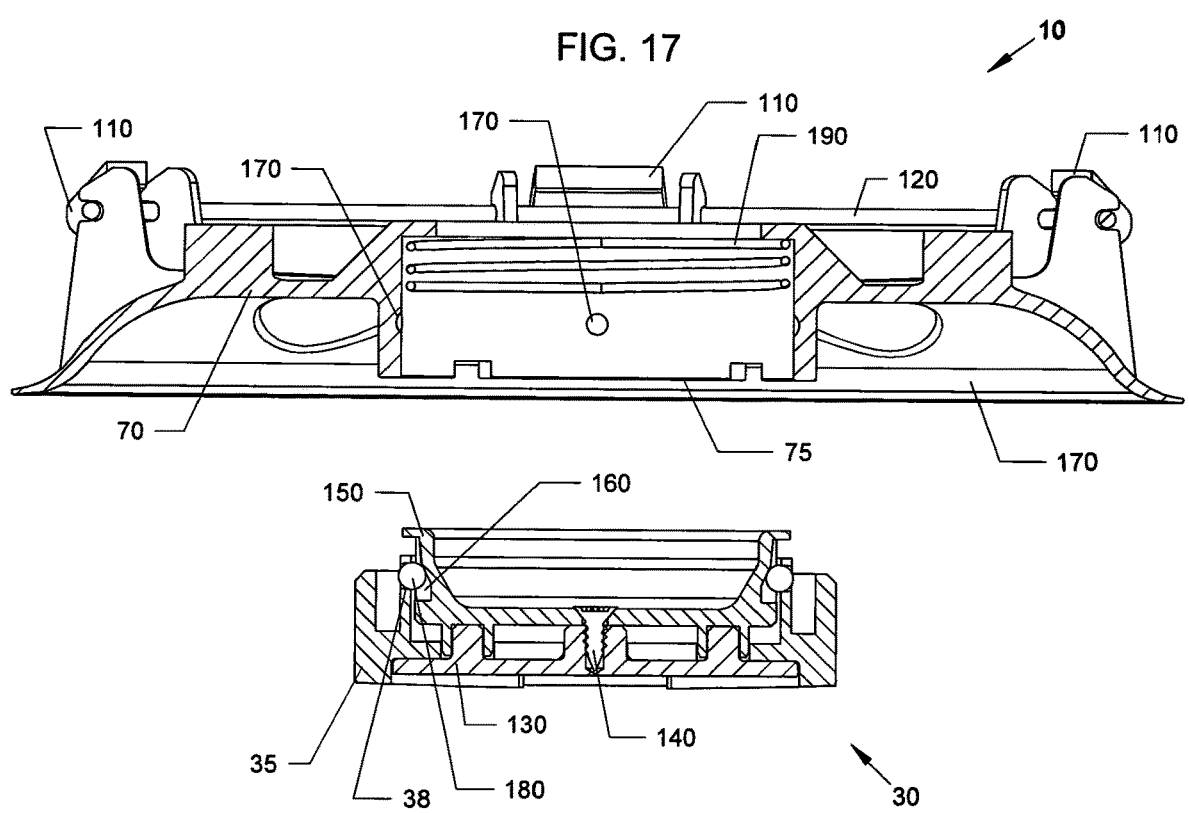

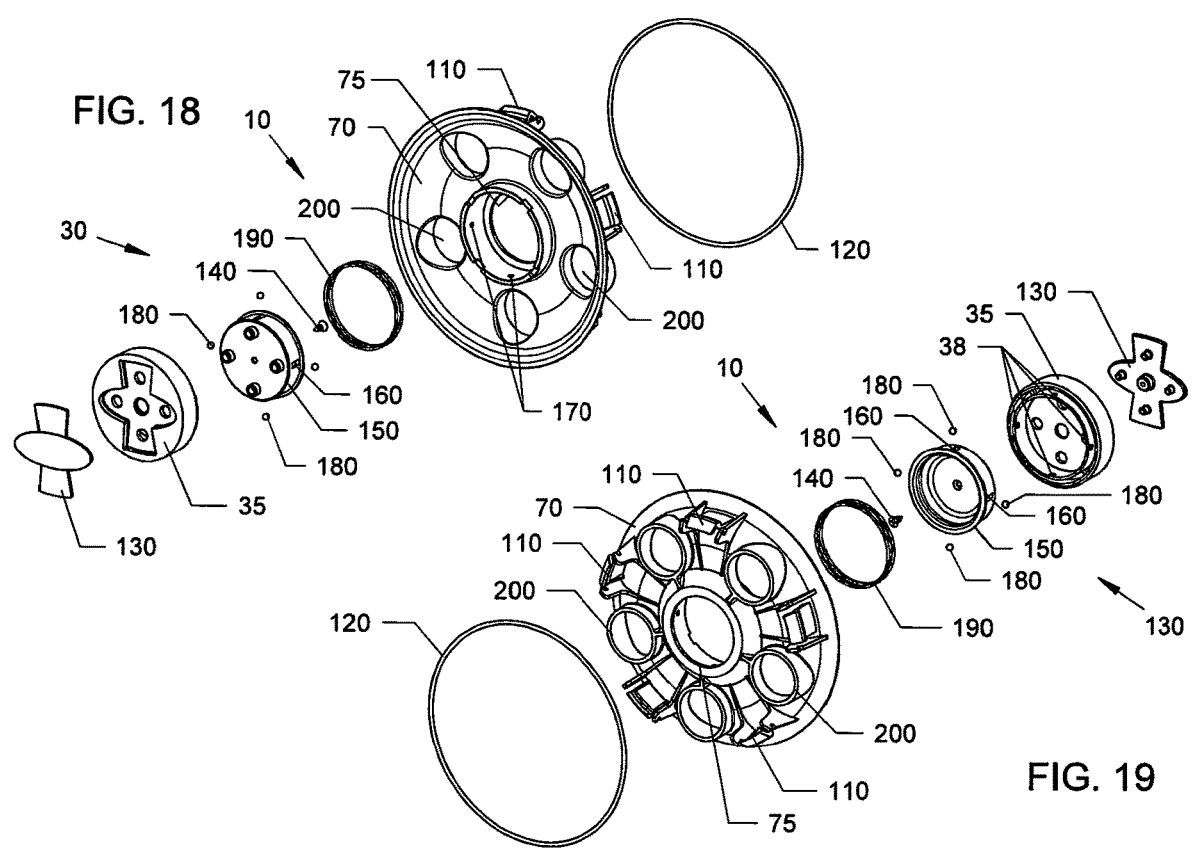

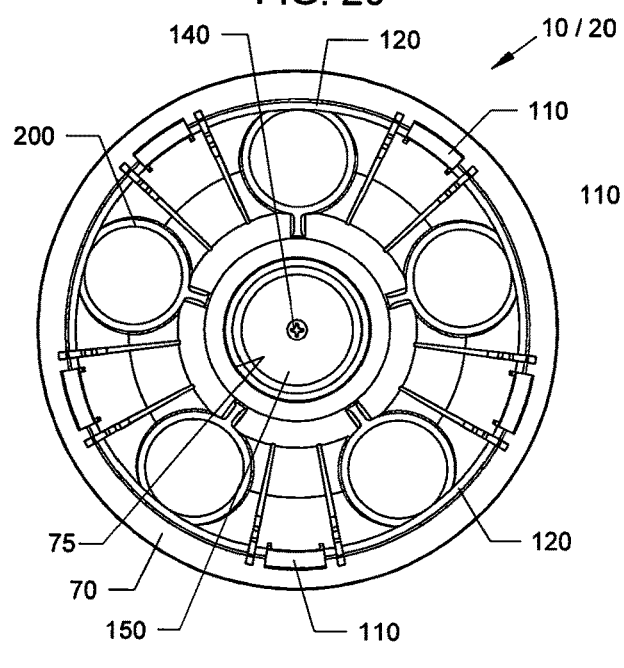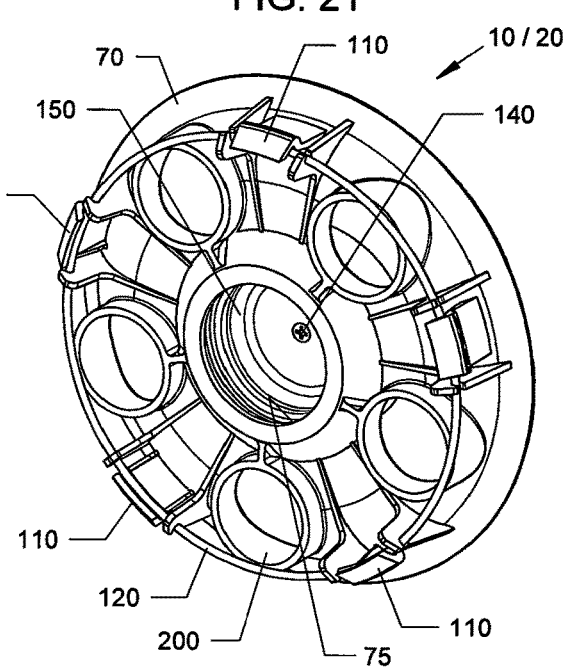

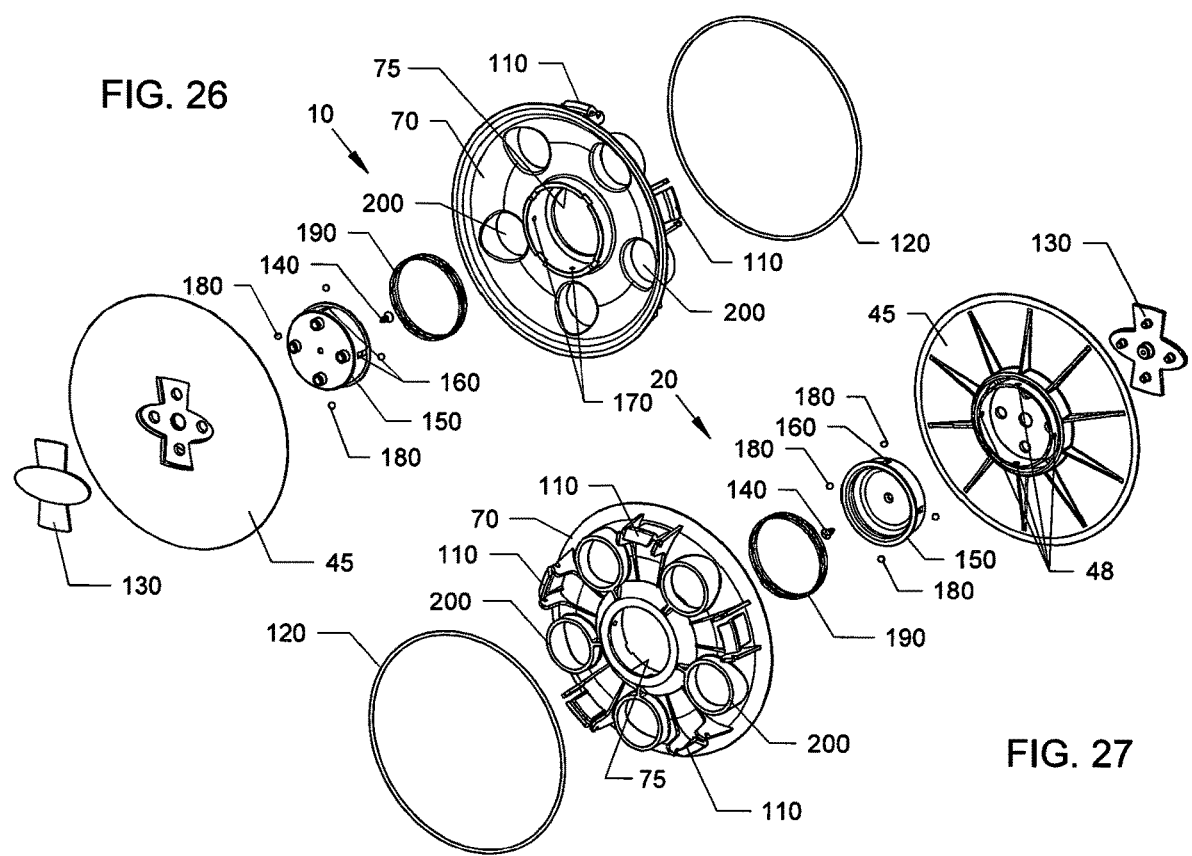

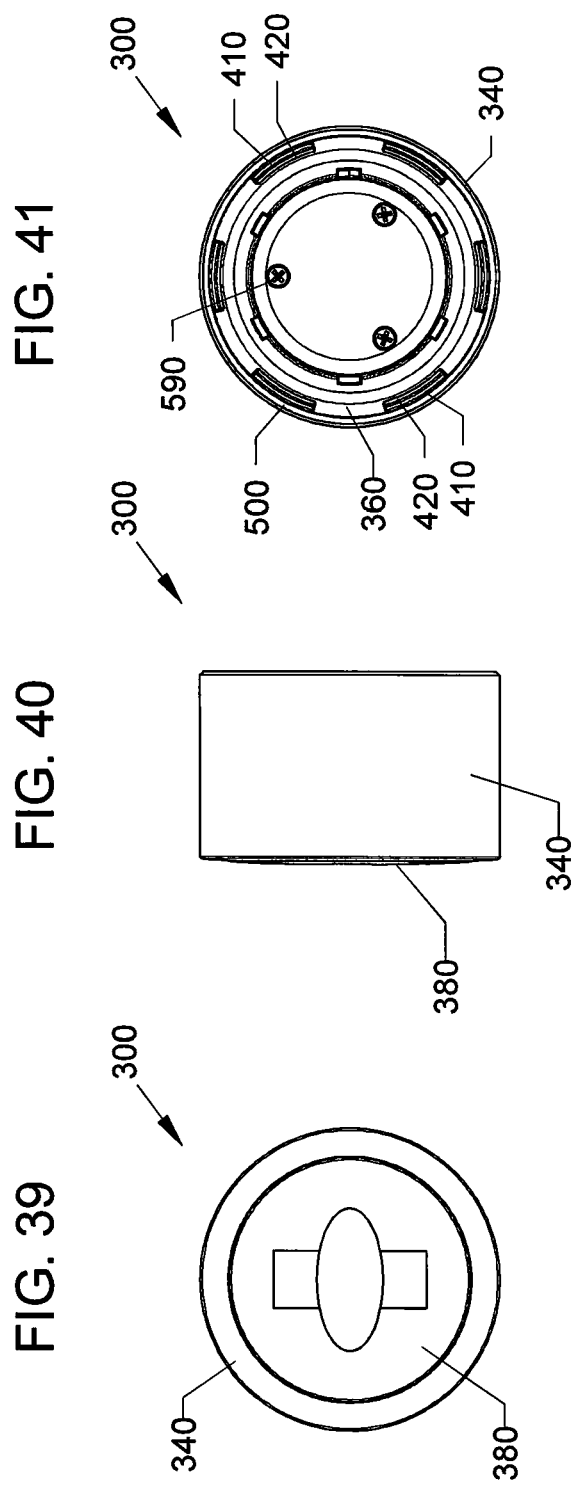

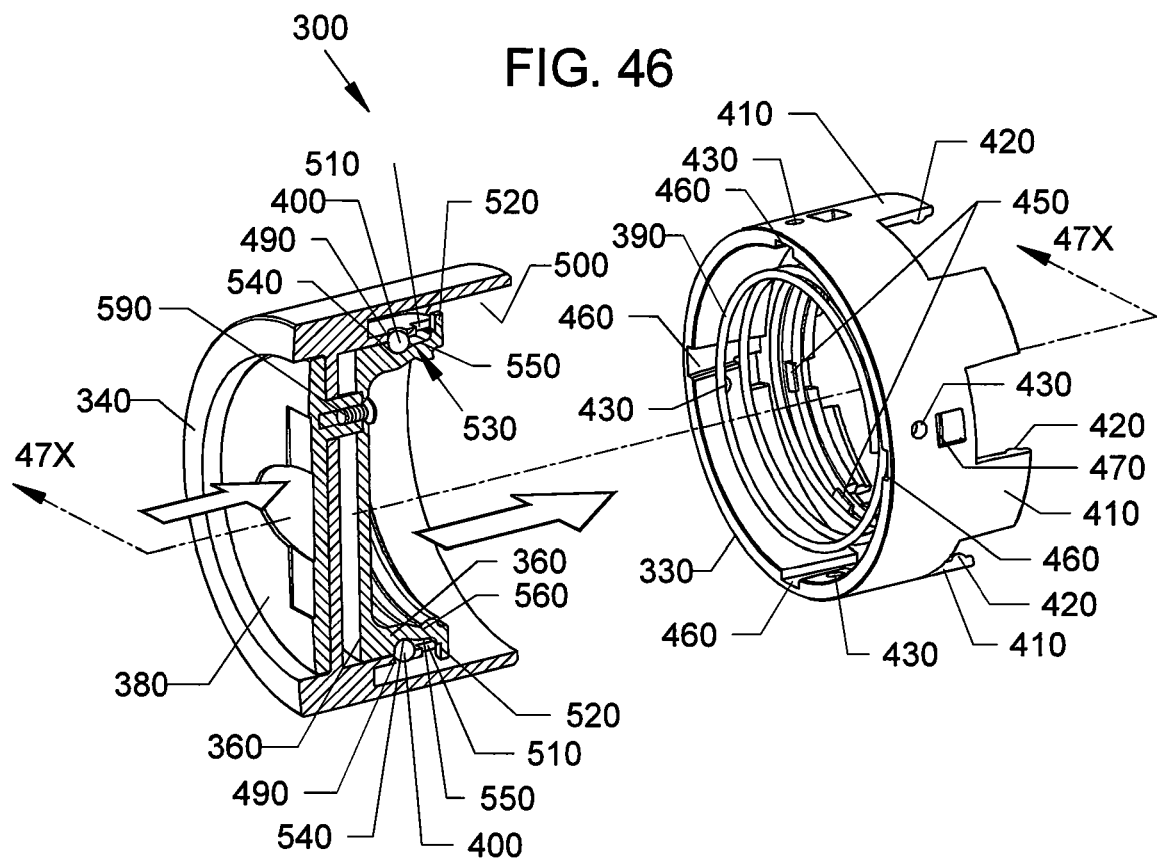
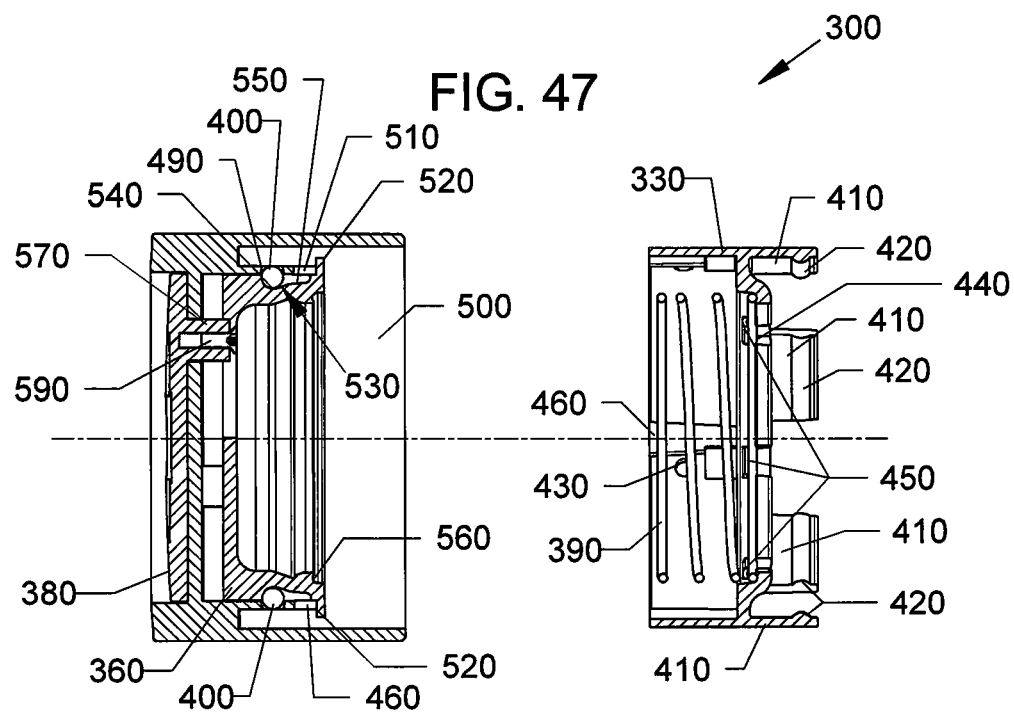

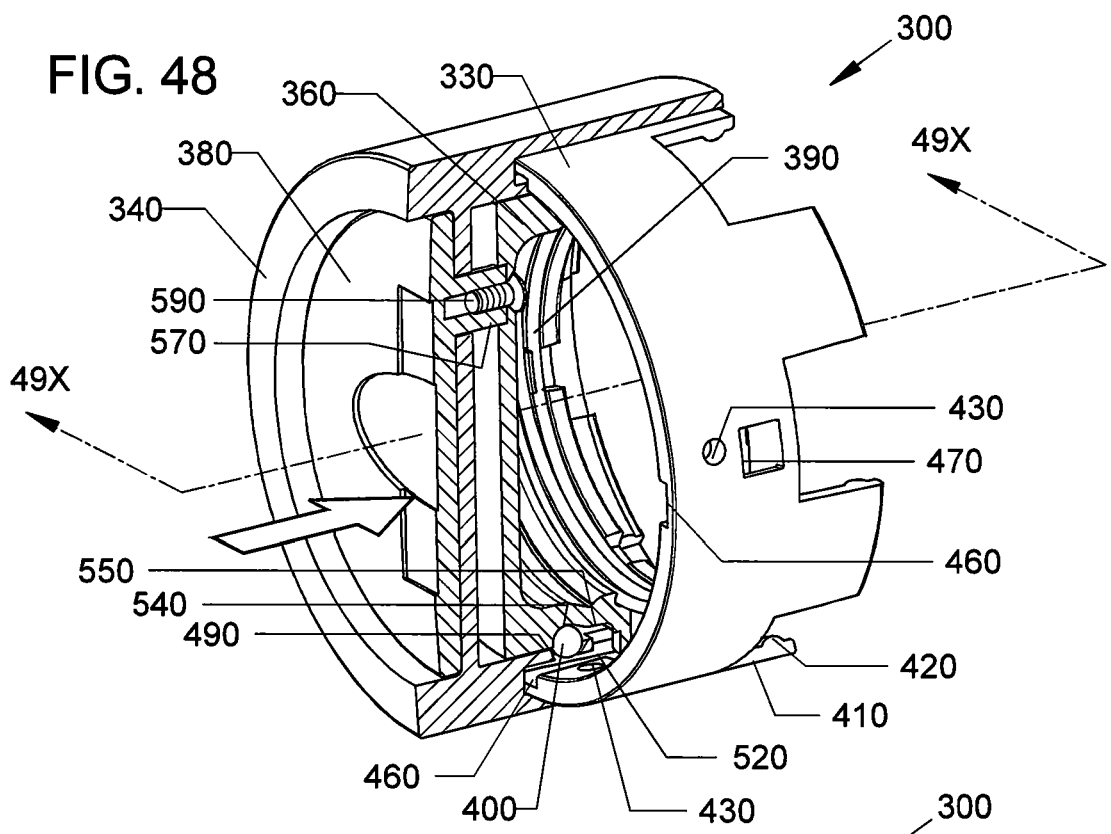
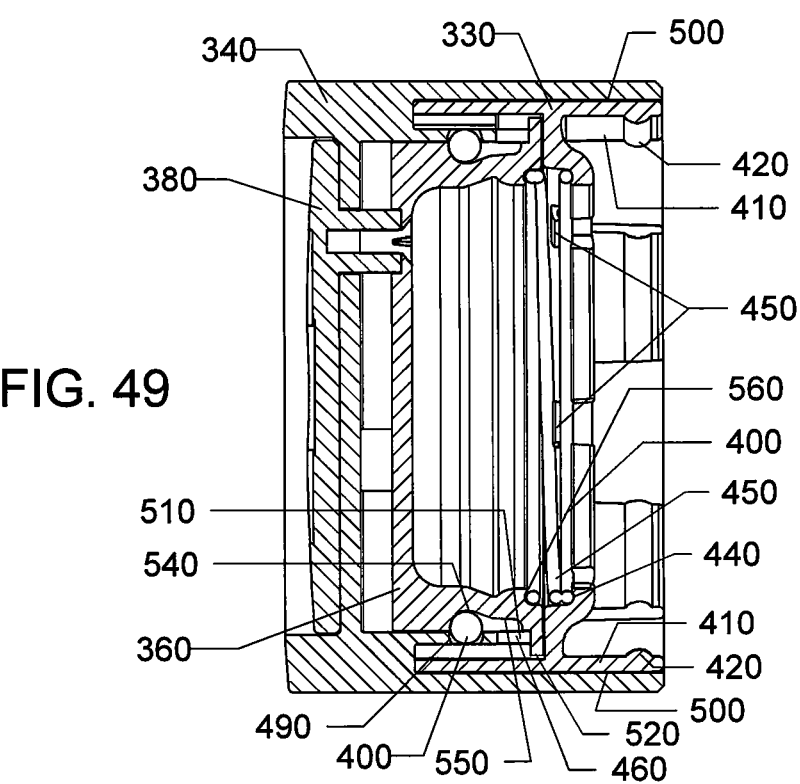

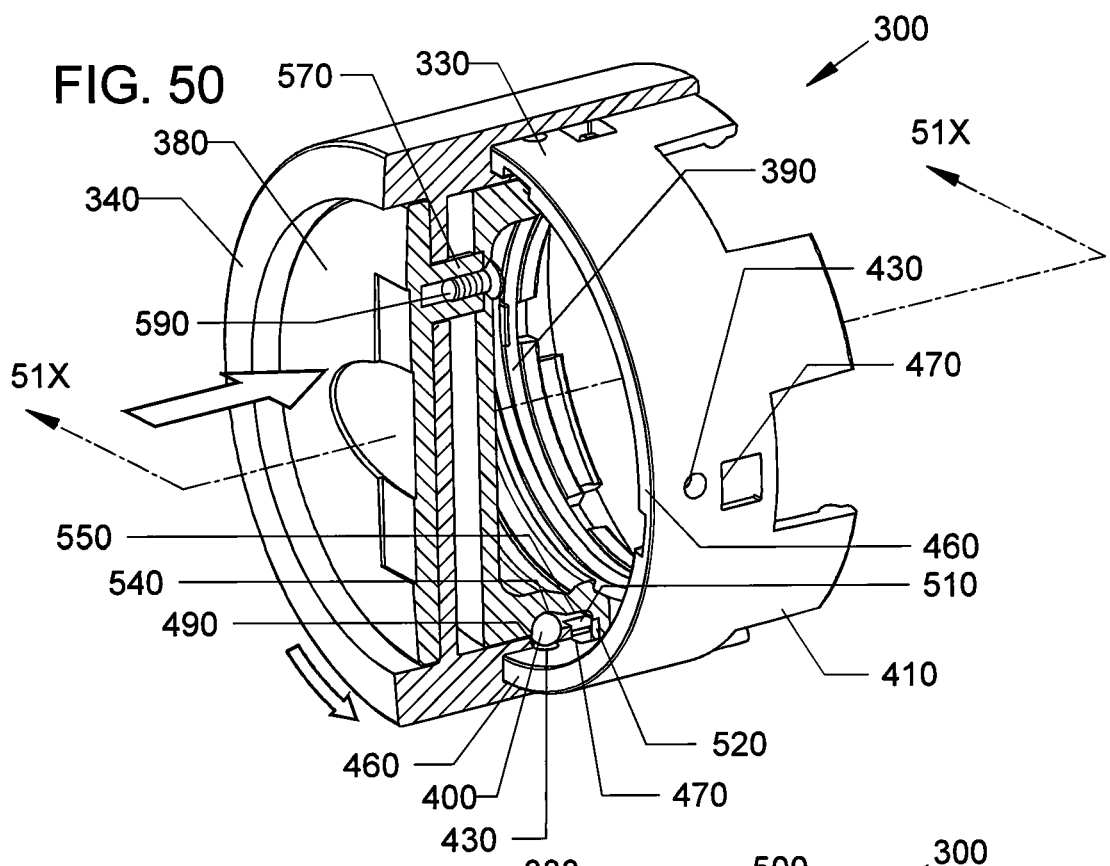
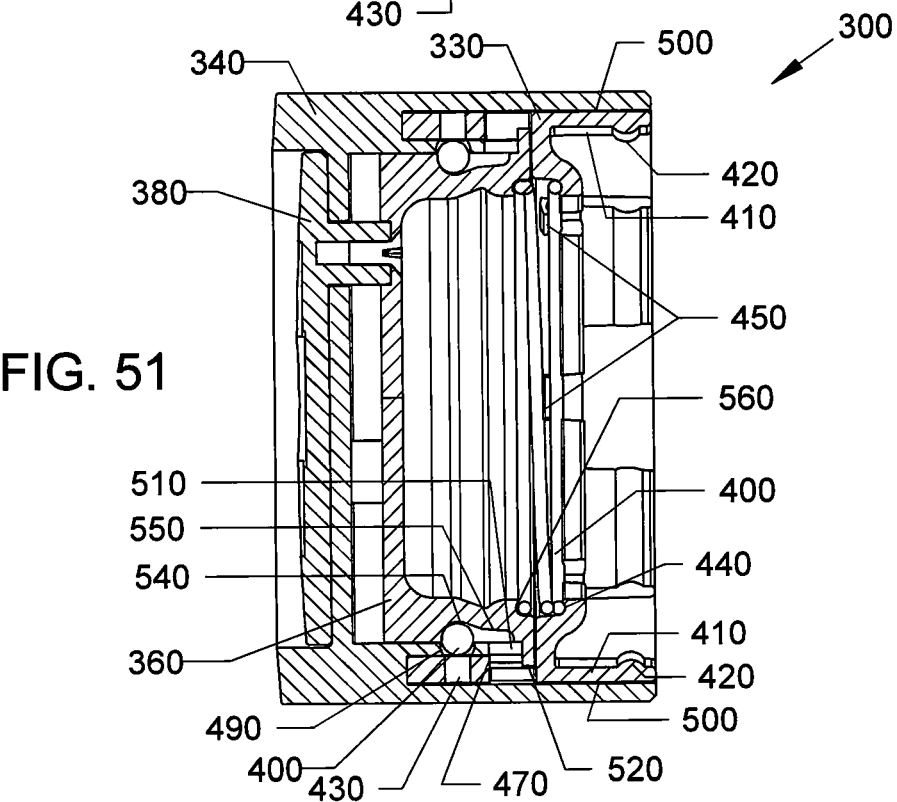

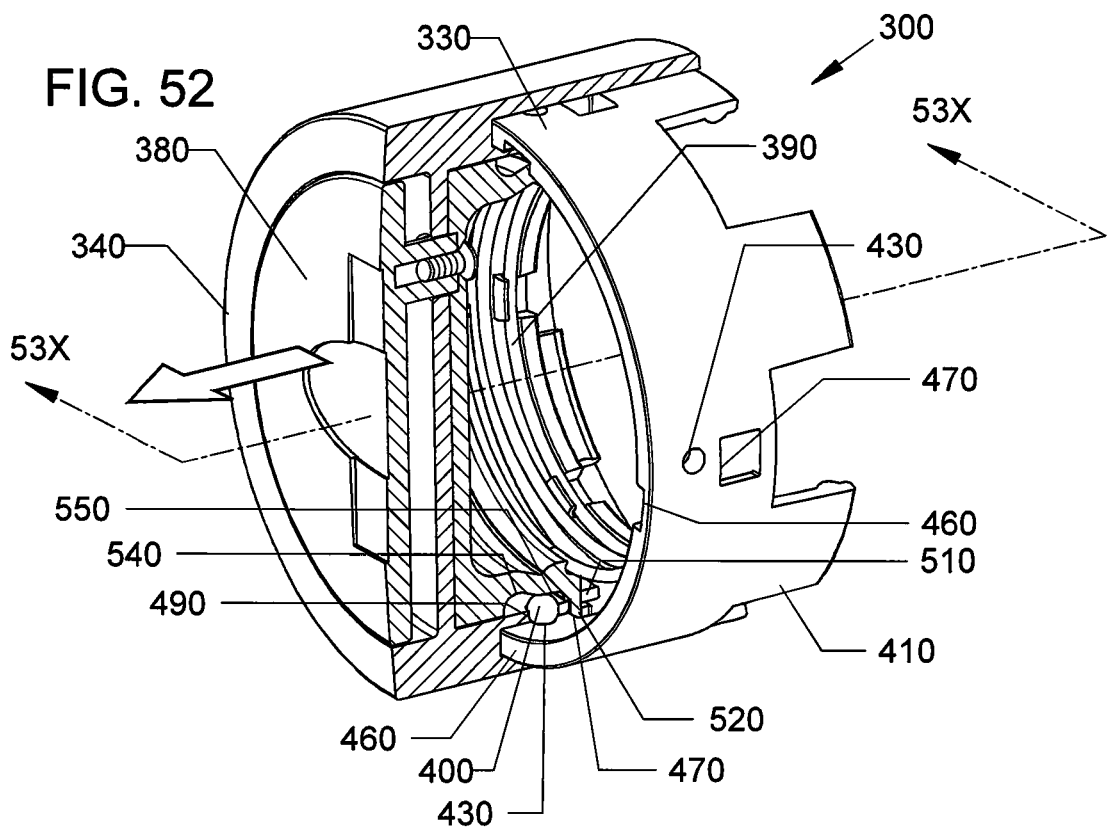
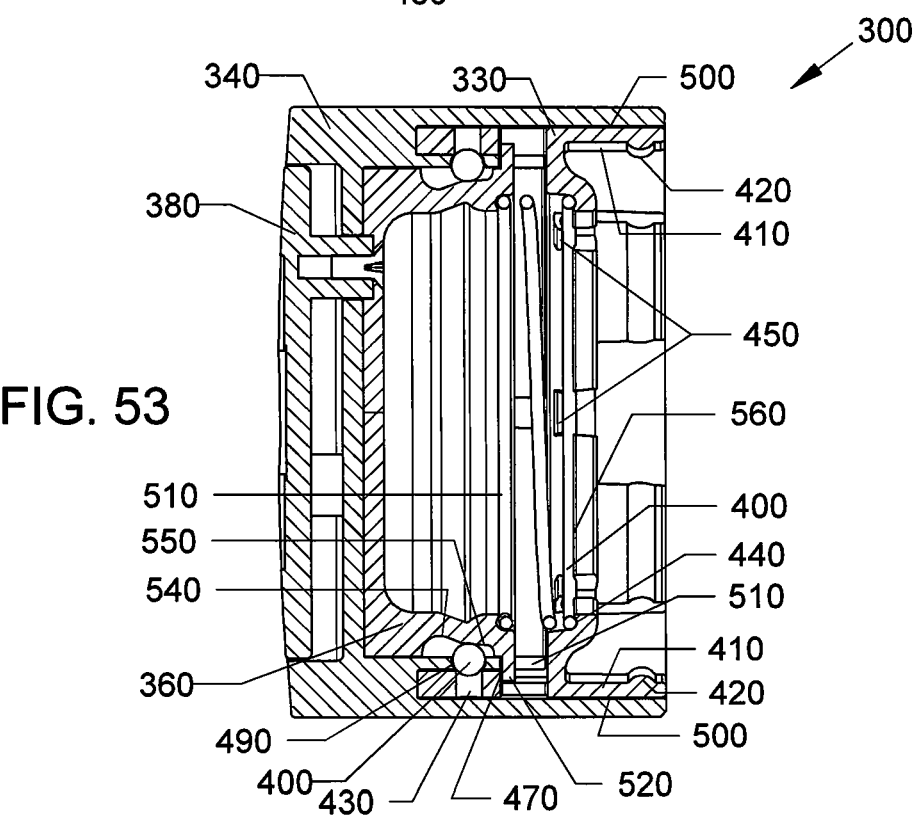

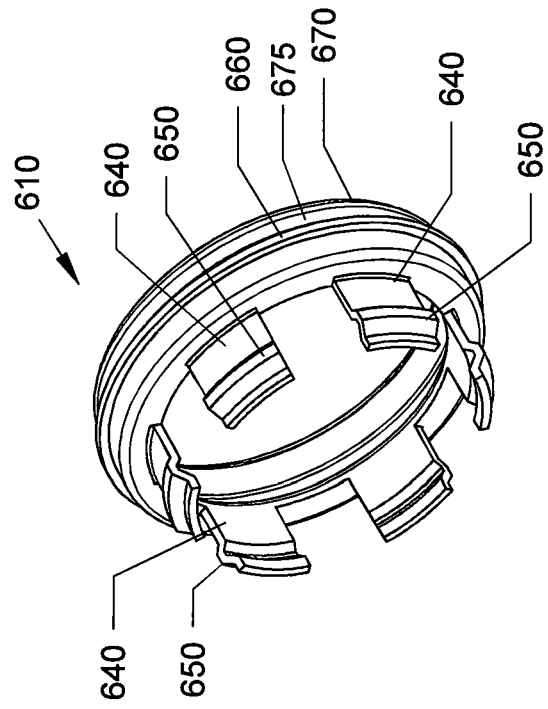
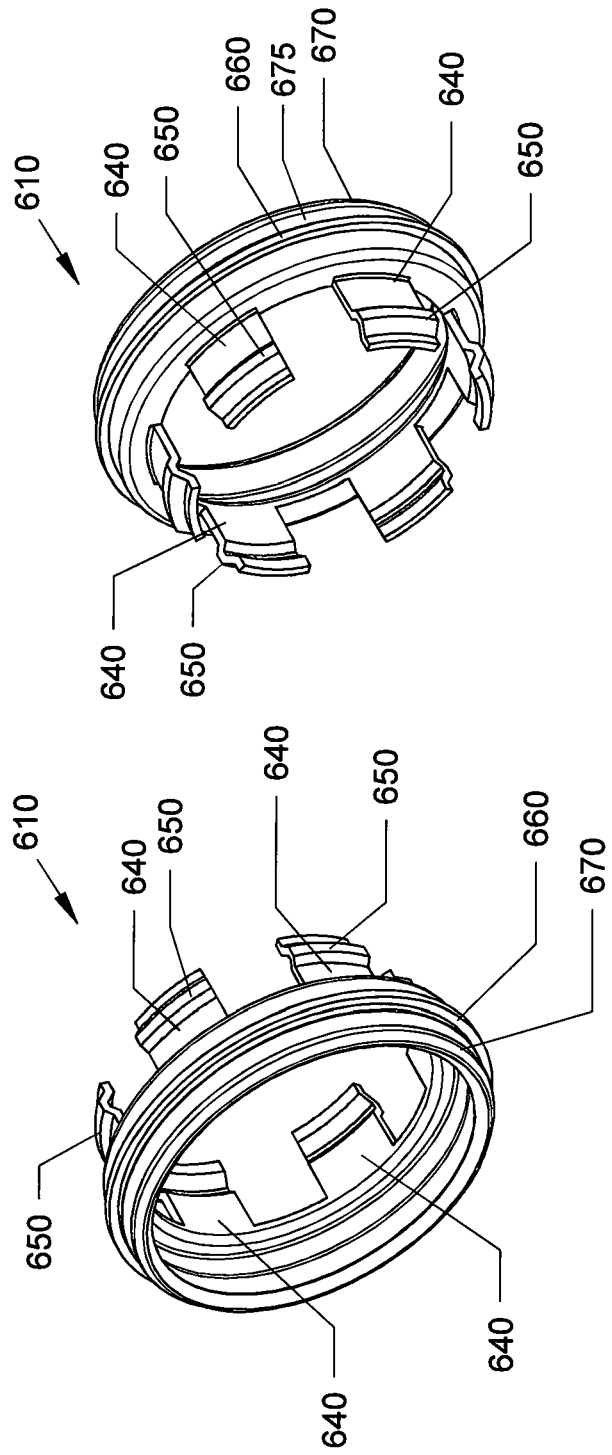

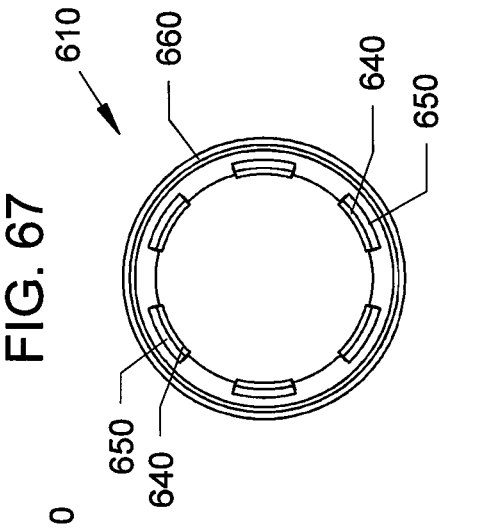
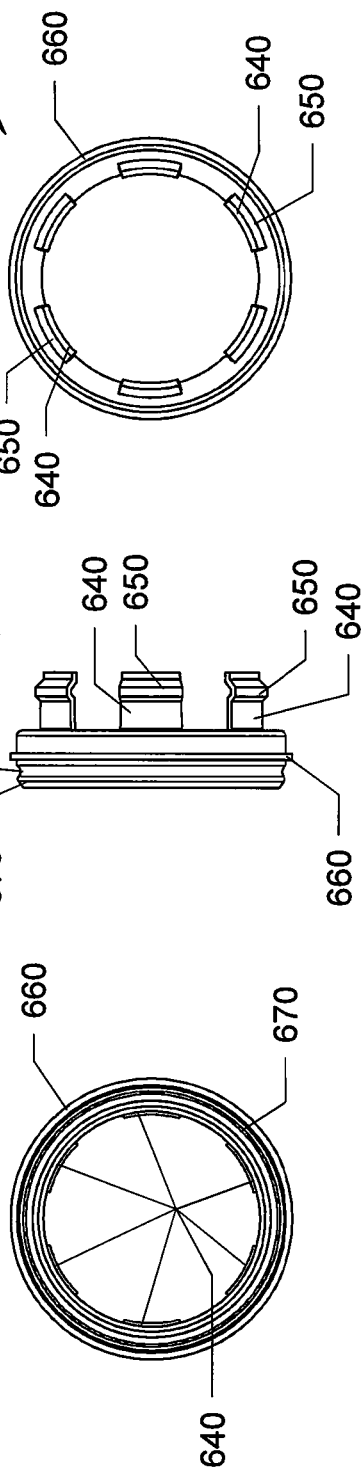
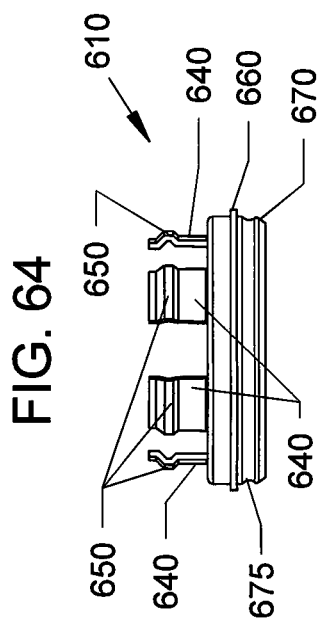

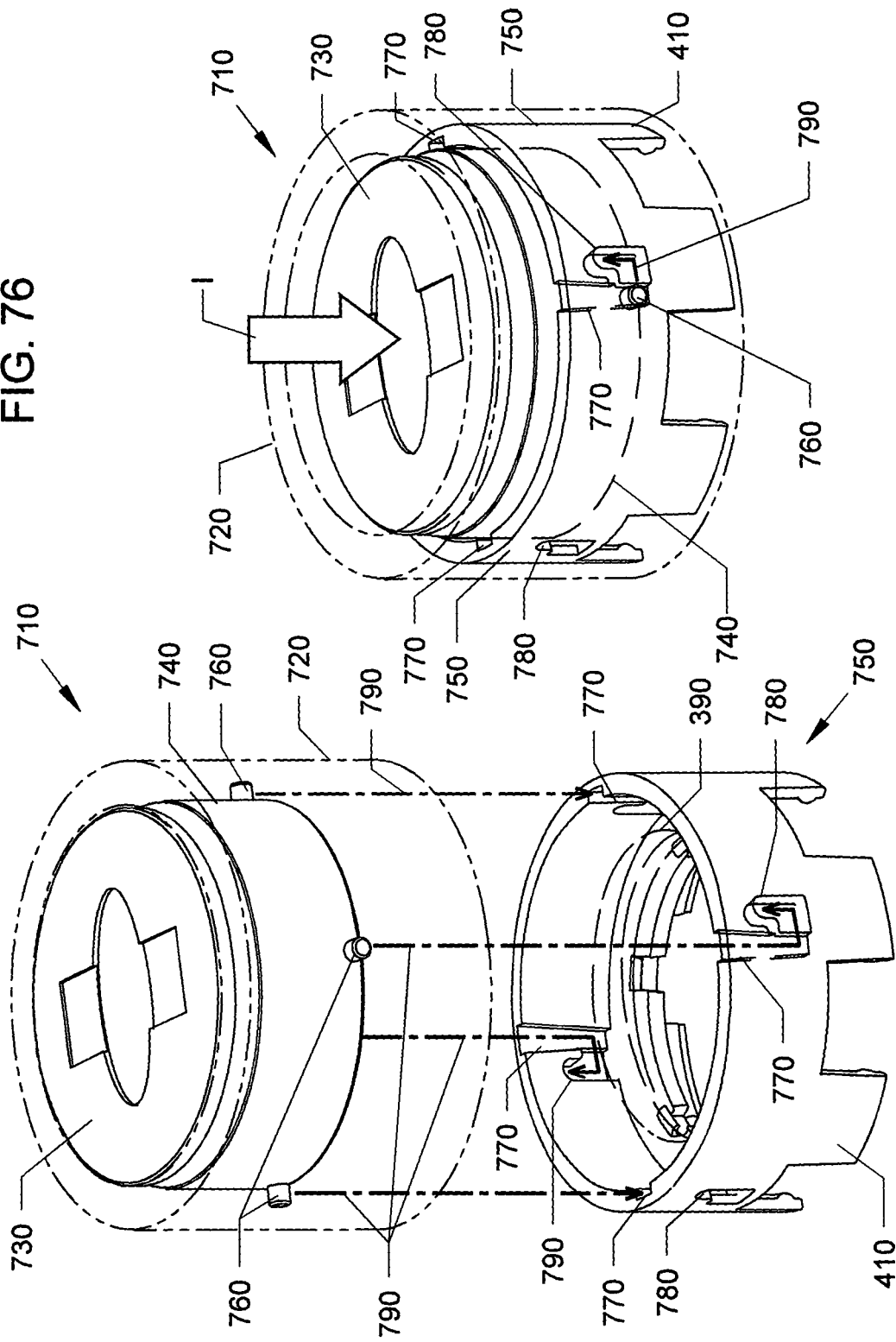

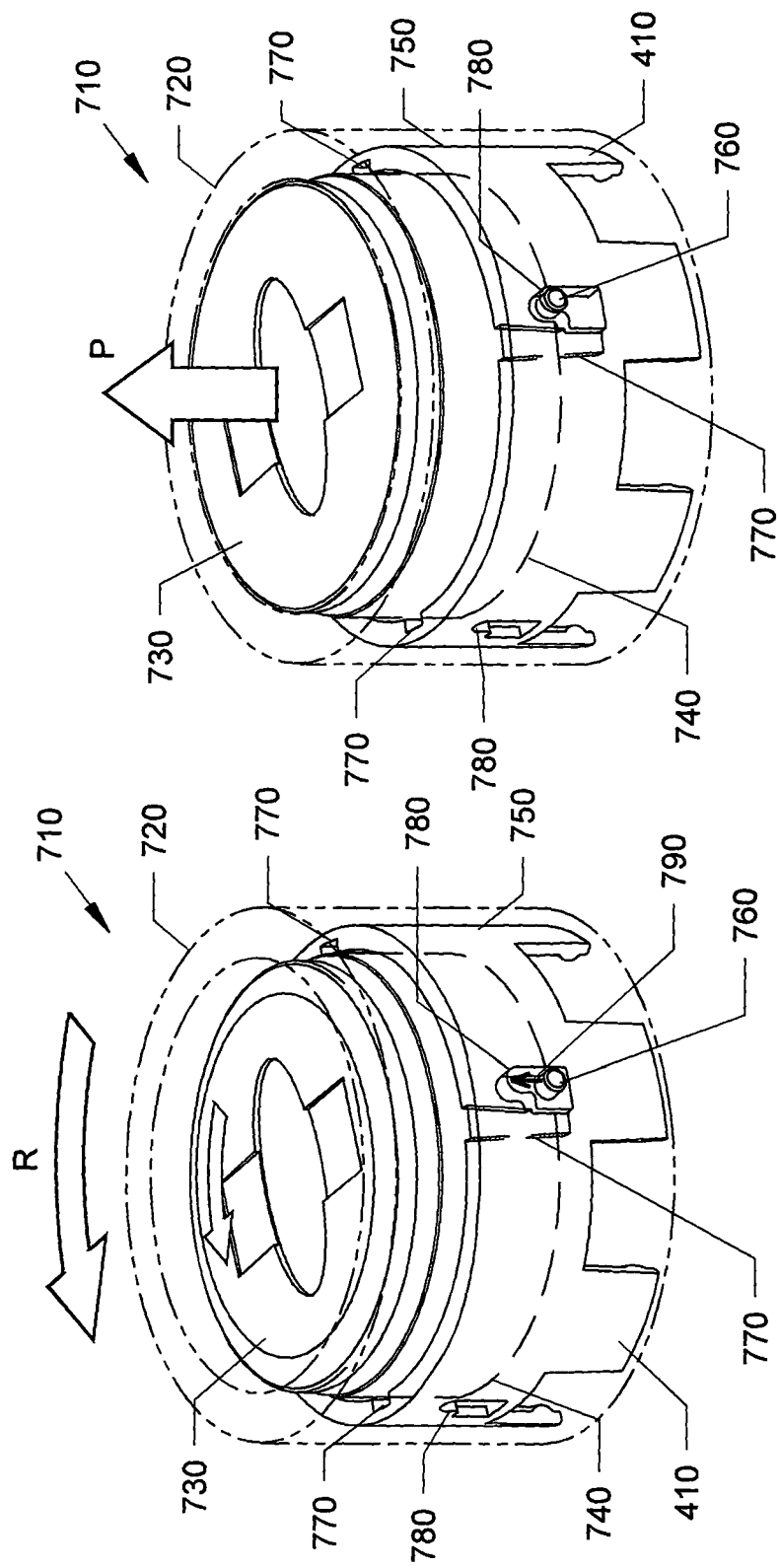
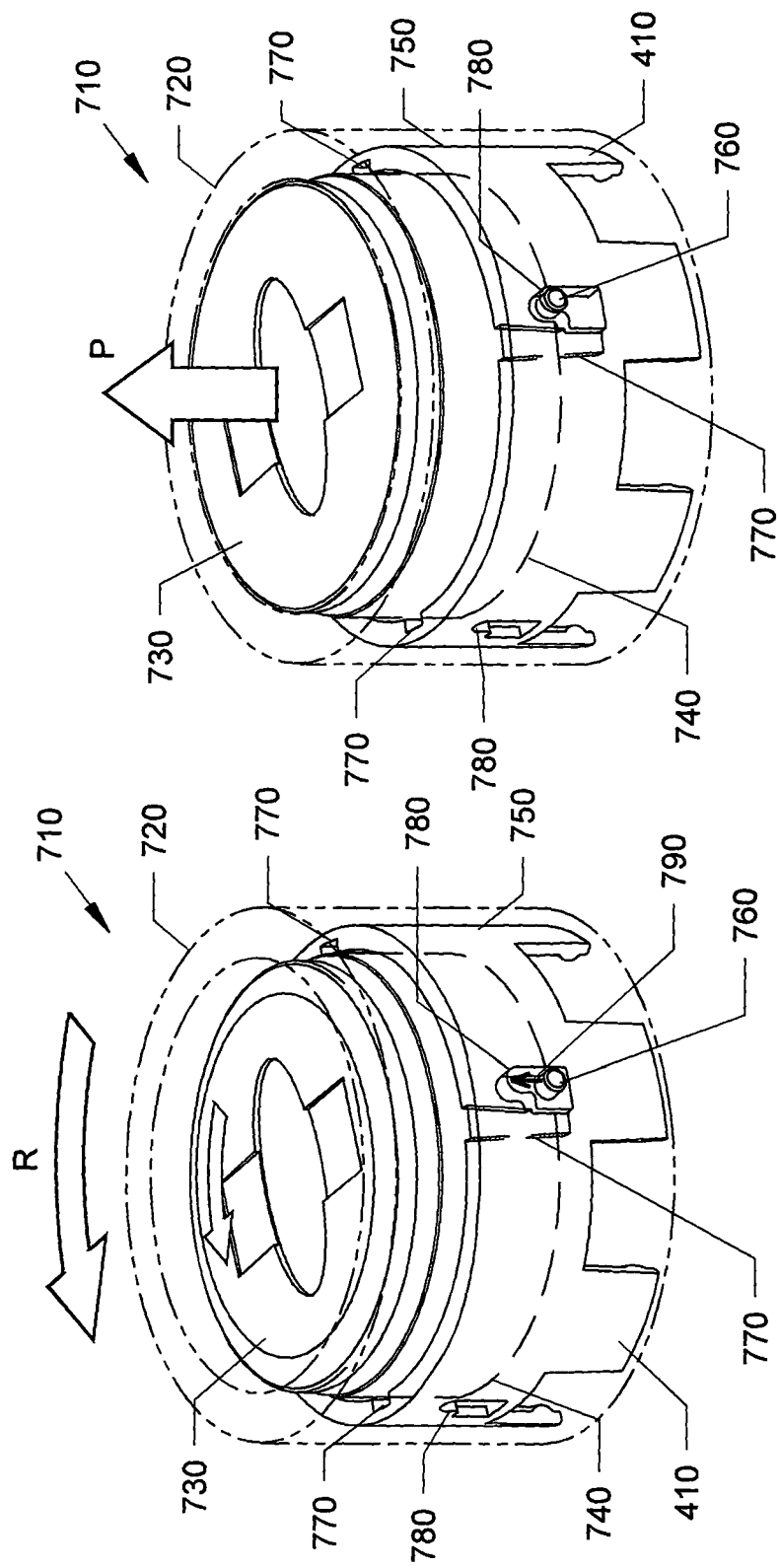
FIG. 77
FIG. 78

WHEEL WITH INTERCHANGEABLE CAPS

RELATED APPLICATIONS

This application is a Divisional of U.S. patent application Ser. No. 15/626,691 filed Jun. 19, 2017, now allowed as U.S. Pat. No. 10,543,716, which is a Continuation-In-Part of U.S. patent application Ser. No. 14/286,325 filed May 23, 2014, now allowed as U.S. Pat. No. 9,682,597. The entire disclosure of each of the applications listed in this paragraph are incorporated herein by specific reference thereto.

FIELD OF INVENTION

This invention relates to vehicles, and in particular to apparatus, devices, brackets assemblies, systems and methods for changing the appearance and style of wheels having lug nuts about a center hole with a bracket that allows for interchanging a small cap to cover only the center hole and a larger cap for covering both the center hole and surrounding lug nuts.

BACKGROUND AND PRIOR ART

The majority of wheels used on vehicles, such as on automobiles have often showed lug nuts about a center opening. Various types of wheels and hubs have allowed for a single cap to close off the center hole in the middle of the wheel while others close off the surrounding lug nuts in addition to the center hole. However, to change the appearance of the wheel style by exposing or hiding the lug nuts, the vehicle owner would have to remove all the tires from the wheels and replace each entire wheel with another wheel which allows for a hub cap to completely cover the lug nuts and center hole or just the center hole. This is because automotive wheels are designed to accept one type of cap that has a single function to either cover the center hole only or both the center hole and also the lug nuts.

Having to remove the tires from the wheels to change the style is both time consuming and expensive. The user would have to purchase two separate wheels for each of the wheels on the vehicle, which would come to two sets of wheels for changing the appearance of the wheels on a normal vehicle having four wheels and tires. As a result, the time and labor to replace the wheels makes changing the appearance of the wheels undesirable and out of the reach to most vehicle owners.

Thus, the need exists for solutions to the above problems with the prior art.

SUMMARY OF THE INVENTION

A primary objective of the present invention is to provide apparatus, devices, brackets, assemblies, systems and methods for changing the appearance and style of wheels having lug nuts about a center hole with a bracket that allows for interchanging a small cap to cover only the center hole and a larger cap for covering both the center hole and surrounding lug nuts.

A secondary objective of the present invention is to provide apparatus, devices, brackets, assemblies, systems and methods for changing the appearance and style of wheels having lug nuts about a center hole without having to remove the tire from the wheel.

A third objective of the present invention is to provide apparatus, devices, brackets, assemblies, systems and methods for changing the appearance and style of wheels having lug nuts about a center hole, by just changing cap covers.

A wheel assembly for a vehicle, that includes a bracket on an exposed side of a vehicle wheel having a front side showing an appearance of lug nuts surrounding a center hole, and a plurality of interchangeable caps attachable to the front side of the bracket for changing the appearance of the wheel.

The plurality of caps can include a first cap attachable to the front side of the bracket for covering the center hole on the wheel, and a second cap larger than the first cap for being attachable to the front side of the bracket for covering both the lug nuts and the center hole.

The bracket can be integrated with the exposed side of the wheel. The bracket can have a rear side that is attachable to the exposed side of the wheel.

The wheel assembly can further include a second bracket on an exposed side of a second vehicle wheel having front side showing an appearance of lug nuts surrounding a center hole, a second plurality of interchangeable caps attachable to the front side of the second bracket for changing the appearance of the second wheel, a third bracket on an exposed side of a third vehicle wheel having a front side showing an appearance of lug nuts surrounding a center hole, a third plurality of interchangeable caps attachable to the front side of the third bracket for changing the appearance of the third wheel, a fourth bracket on an exposed side of a fourth vehicle wheel having a front side showing an appearance of lug nuts surrounding a center hole, and a fourth plurality of interchangeable caps attachable to the front side of the fourth bracket for changing the appearance of the fourth wheel.

Each of the plurality of caps can include a first cap attachable to the front side of the bracket for covering the center hole on the wheel, and a second cap larger than the first cap for being attachable to the front side of the bracket for covering both the lug nuts and the center hole.

Each of the second bracket, the third bracket and the fourth bracket can be integrated with the exposed side of their respective wheel. Each of the second bracket, the third bracket and the fourth bracket can have a rear side that is attachable to the exposed side of the respective wheel.

A method of changing the appearance of a wheel having lug nuts surrounding a center hole with interchangeable caps, can include the steps of providing a wheel with a bracket on an exposed side of the wheel. The wheel can have a front side with lug nuts surrounding a central opening, providing a plurality of caps that are each attachable to the front side of the bracket, and changing appearance of the exterior surface of the wheel with each of the interchangeable caps.

The step of providing a plurality of caps, can include steps of providing a first cap, and providing a second cap having a larger diameter than the first cap.

The step of changing the appearance of the exterior surface of the wheel can include the step of attaching the first cap to the front of the bracket to cover the center hole of the exterior surface of the wheel, while leaving the lug nuts exposed.

The step of changing the appearance of the exterior surface of the wheel can include the step of attaching the second cap to the front of the bracket to cover both the lug nuts and the center hole of the exterior surface of the wheel.

The step of changing the appearance of the exterior surface of the wheel can include the step of interchangeably attaching the first cap and the second cap to the front of the bracket in order to cover only the center hole or to cover both the lug nuts and the center hole.

The method can include the step of providing the bracket is integrated with the exposed side of the wheel.

The method can include the steps of providing the bracket with a rear side, and attaching the rear side of the bracket to the exposed side of the wheel.

The method can include the steps of providing a second bracket on an exposed side of a second wheel, the second wheel can have a front side with lug nuts surrounding a central opening, providing a second plurality of caps that are each attachable to the front side of the second bracket, changing appearance of the exterior surface of the second wheel with each of the second interchangeable caps, providing a third bracket on an exposed side of a third wheel, the third wheel can have a front side with lug nuts surrounding a central opening, providing a third plurality of caps that are each attachable to the front side of the third bracket, changing appearance of the exterior surface of the third wheel with each of the third interchangeable caps, providing a fourth bracket on an exposed side of a fourth wheel. The fourth wheel can have front side with lug nuts surrounding a central opening, providing a fourth plurality of caps that are each attachable to the front side of the fourth bracket, and changing appearance of the exterior surface of the fourth wheel with each of the fourth interchangeable caps.

A base bracket for changing appearances of a wheel hub can include a bracket on an exposed side of a wheel hub having a front side showing an appearance of lug nuts surrounding a center hole, and interchangeable caps attachable to the front side of the bracket for changing the appearance of the wheel. The interchangeable caps can include a first cap attachable to the front side of the bracket for covering the center hole on the wheel hub, and a second cap larger than the first cap for being attachable to the front side of the bracket for covering both the lug nuts and the center hole of the wheel hub.

The base bracket can further include a second bracket on an exposed side of a second wheel hub having a front side showing an appearance of lug nuts surrounding a center hole, second interchangeable caps attachable to the front side of the second bracket for changing the appearance of the second wheel hub, a third bracket on an exposed side of a third wheel hub having a front side showing an appearance of lug nuts surrounding a center hole of the wheel hub, third interchangeable caps attachable to the front side of the third bracket for changing the appearance of the third wheel hub, a fourth bracket on an exposed side of a fourth wheel hub having a front side showing an appearance of lug nuts surrounding a center hole of the fourth wheel hub, and fourth interchangeable caps attachable to the front side of the fourth bracket for changing the appearance of the fourth wheel hub.

Each of the interchangeable caps can include a first cap attachable to the front side of the bracket for covering the center hole on each wheel hub, and a second cap larger than the first cap for being attachable to the front side of the bracket for covering both the lug nuts and the center hole of each wheel hub.

Another embodiment of a wheel assembly for a vehicle, can include at least one cap assembly, each cap assembly comprising a base bracket and a cap adapted to be attached to an exposed side of a vehicle wheel having a front side with a plurality of lug nut holes surrounding a cylindrical center receptacle with a center hole, the center hole having a center hole diameter, the base bracket having a generally cylindrical shape with a proximate end and a distal end, the base bracket having a bracket diameter, the distal end of the base bracket adaptable to attach into the cylindrical center receptacle of the vehicle wheel, and the cap having a generally cylindrical shape with an open bottom end and an outer face end, with the open bottom end of the cap for attaching about the proximate end of the base bracket.

The at least one cap assembly can include a first cap for covering the center hole in the wheel while leaving the lug nut holes with the lug nuts from the wheel exposed, the first cap having a first cap diameter substantially similar to the center hole diameter, and a second cap for covering both the center hole and the wheel lug nut holes, the second cap having a diameter substantially similar to a diameter across the lug nut holes, wherein interchanging the first cap and the second cap with each other results in changing the aesthetic appearance of the wheel.

The distal end of the base bracket can include a plurality of tabs extending therefrom, each the tabs having inwardly protruding edges facing toward one another, which are attachable about rib edges on the cylindrical center receptacle of the vehicle wheel.

The rib edges can be in a ring configuration that is pre-formed on the cylindrical center receptacle of the vehicle wheel, and the rib edges form a concave curved groove in which the inwardly protruding edges of the plurality of tabs snap into.

The wheel assembly can include an adapter ring having a proximate end and a distal end, the proximate end of the adapter ring having the rib edges, the rib edges form a concave curved groove in which the inwardly protruding edges of the plurality of tabs snap into, the proximate end of the adapter ring having a plurality of legs with an outer end of the legs having outwardly protruding edges facing away from one another, the outwardly protruding edges adapted to fit about inwardly protruding ring shaped edge inside of the cylindrical center receptacle of the vehicle wheel.

Each cap can include a depressible release button on the outer face end. Each cap can include a spring within the open bottom end of the cap between the depressible release button and the base bracket, the depressible release button being depressible and rotatable in one direction to an attach position to attach the cap assembly to the vehicle wheel, and the depressible release button being depressible and rotatable on an opposite direction to a release position to release the cap assembly from the vehicle wheel.

The open bottom of each cap can include ball bearings which allow the cap to rotate relative to the base bracket from the attach position to the release position and back and move the cap in and out relative to the base bracket.

Each cap can include outward extending studs which can slide into elongated slots and into reverse L shaped slots to lock the cap to the base.

Another wheel assembly for a vehicle can include a first cap assembly comprising a base bracket and a pair of caps, with each cap adapted to be attached to an exposed side of a first vehicle wheel having a front side with a plurality of lug nut holes surrounding a cylindrical center receptacle with a center hole, the center hole having a center hole diameter, the base bracket having a generally cylindrical shape with a proximate end and a distal end, the base bracket having a bracket diameter, the distal end of the base bracket adaptable to attach into the cylindrical center receptacle of the vehicle wheel, the pair of caps includes a small cap and a large cap, each of the pair of caps having a generally cylindrical shape with an open bottom end and an outer face end, with the open bottom end of the cap for attaching about the proximate end of the base bracket, the small cap for covering the center hole in the wheel while leaving the lug nut holes with the lug nuts from the wheel exposed, the small cap having a first cap diameter substantially similar to the center hole diameter, and the larger cap for covering both the center hole and the wheel lug nut holes, the larger cap having a diameter substantially similar to a diameter across the lug nut holes, wherein interchanging the small cap and the large cap with each other results in changing the aesthetic appearance of the first vehicle wheel.

The distal end of the base bracket can include a plurality of tabs extending therefrom, each the tabs having inwardly protruding edges facing toward one another, which are attachable about rib edges on the cylindrical center receptacle of the vehicle wheel.

The rib edges can be in a ring configuration that is pre-formed on the cylindrical center receptacle of the vehicle wheel, and the rib edges form a concave curved groove in which the inwardly protruding edges of the plurality of tabs snap into.

The wheel assembly can include an adapter ring having a proximate end and a distal end, the proximate end of the adapter ring having the rib edges, the rib edges form a concave curved groove in which the inwardly protruding edges of the plurality of tabs snap into, the proximate end of the adapter ring having a plurality of legs with an outer end of the legs having outwardly protruding edges facing away from one another, the outwardly protruding edges adapted to fit about inwardly protruding ring shaped edge inside of the cylindrical center receptacle of the vehicle wheel.

The wheel assembly can include a spring within the open bottom end of each cap between the depressible release button and the base bracket, the depressible release button being depressible and rotatable in on direction to attach each cap assembly to the vehicle wheel, and the depressible release button being depressible and rotatable on an opposite direction to release the cap assembly from the vehicle wheel.

The open bottom of each cap can have ball bearings which allow each cap to rotate relative to the base bracket from the attach position to the release position and back and move each cap in and out relative to each base bracket.

The small cap and the large cap can have outward extending studs which can slide into elongated slots and into reverse L shaped slots to lock the cap to the base.

Further objects and advantages of this invention will be apparent from the following detailed description of the presently preferred embodiments which are illustrated schematically in the accompanying drawings.

BRIEF DESCRIPTION OF THE FIGURES

First Embodiment

FIG. 8 is another perspective view of the large cover assembly of FIGS. 5-6 with large cap assembly pulled out.

FIG. 9 is a rear perspective view of the large cover assembly with large cap assembly of FIG. 8.

The system is the same for both cap sizes.

Figure 15:
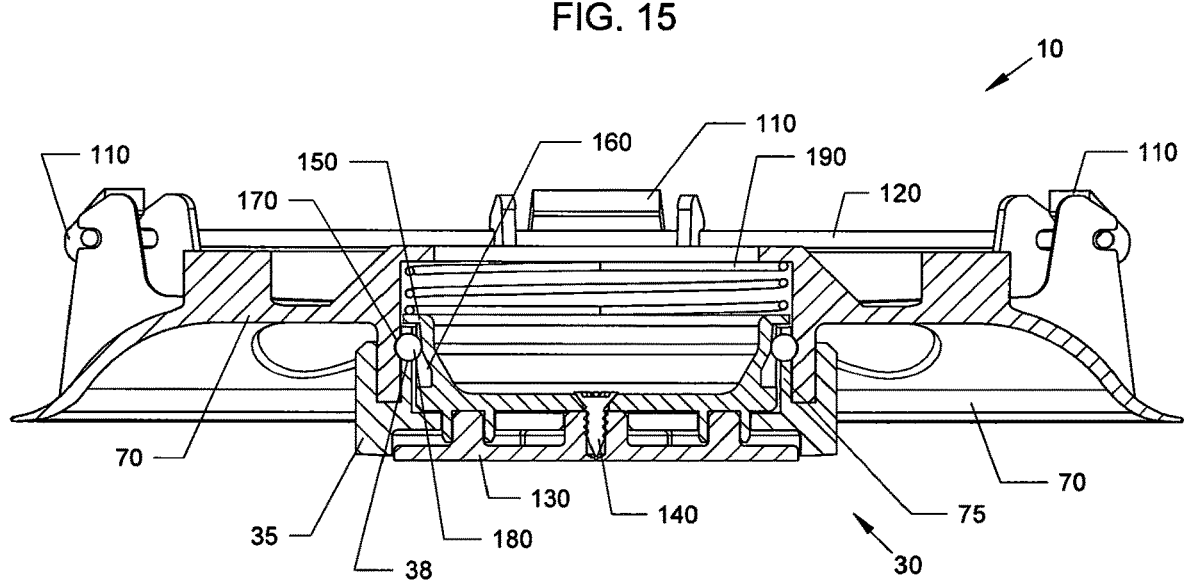
FIG. 15. A cross-sectional view of cover assembly with small cap of FIG. 13 along arrow 15X showing how the ball bearing retaining system works.

FIG. 17 is another view of the cover assembly of FIG. 15 with the cap assembly removed from the base bracket.

FIG. 18 is a front right exploded perspective view of the wheel cover assembly with the small cap.

FIG. 19 is a rear perspective view of the exploded wheel cover assembly and small cap of FIG. 18.

FIG. 20 is a rear view of the cover assembly of the preceding figures. Both cap variations are the same from this side.

FIG. 21 is a rear perspective view of the cover assembly of FIG. 20.

Figure 22:
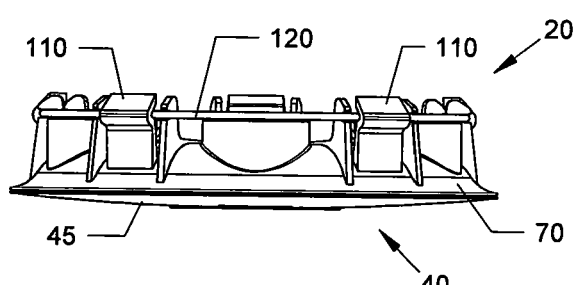

FIG. 22 is a top side view of the cover assembly of FIGS. 19-20 with large cap installed.

Figure 23:
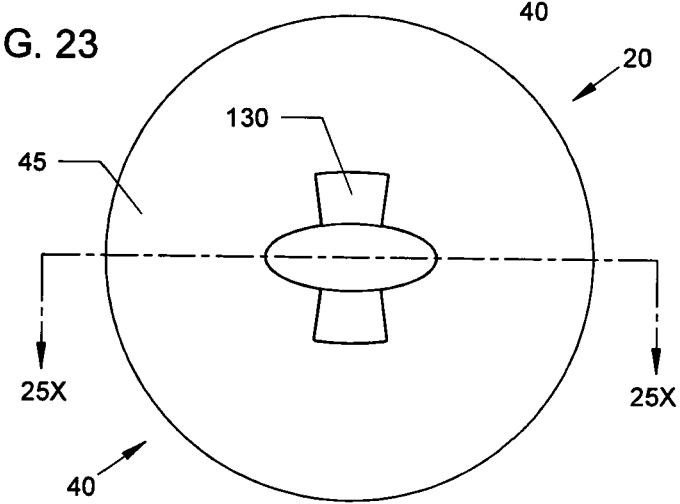

FIG. 23 is a front view of the cover assembly with large cap installed of FIG. 22.

Figure 24:
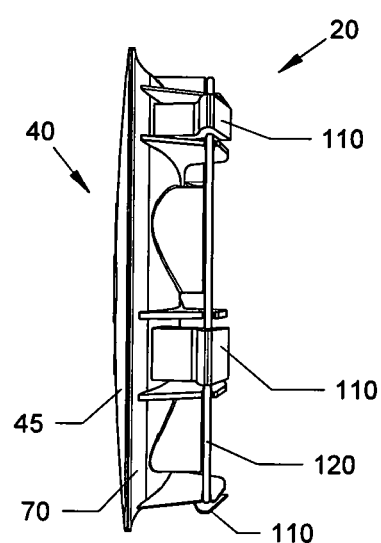

FIG. 24 is a right side view of the cover assembly with large cap installed of FIG. 22.

Figure 25:
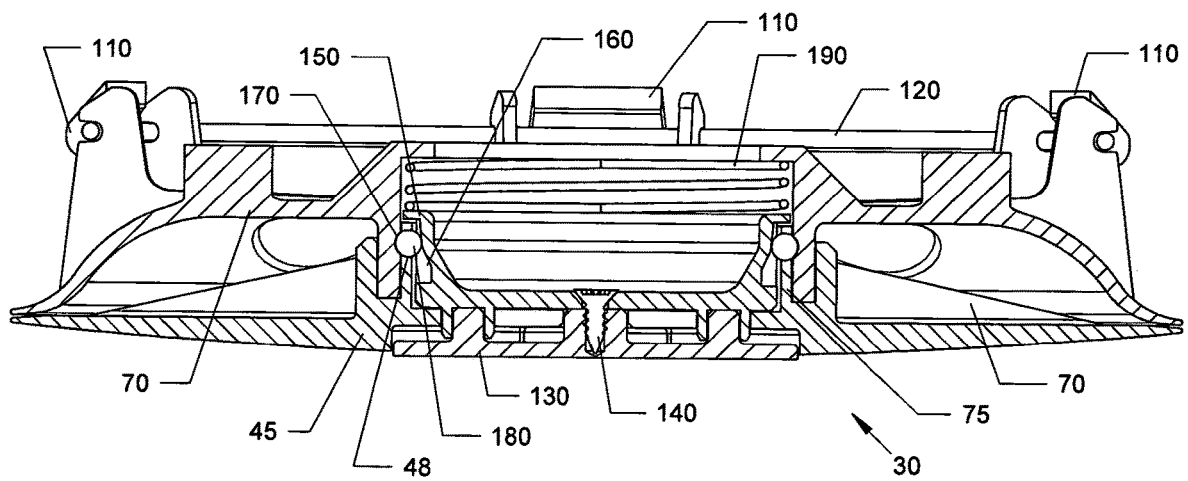

FIG. 25 is a cross-sectional view of the cover assembly with large cap installed of FIG. 23 along arrow 25X.

FIG. 26 is a front exploded view of the wheel cover assembly showing large cap installed of FIG. 22.

FIG. 27 is a rear view of the exploded view of the wheel cover assembly with large cap of FIG. 26.

Second Embodiment

Figure 28:
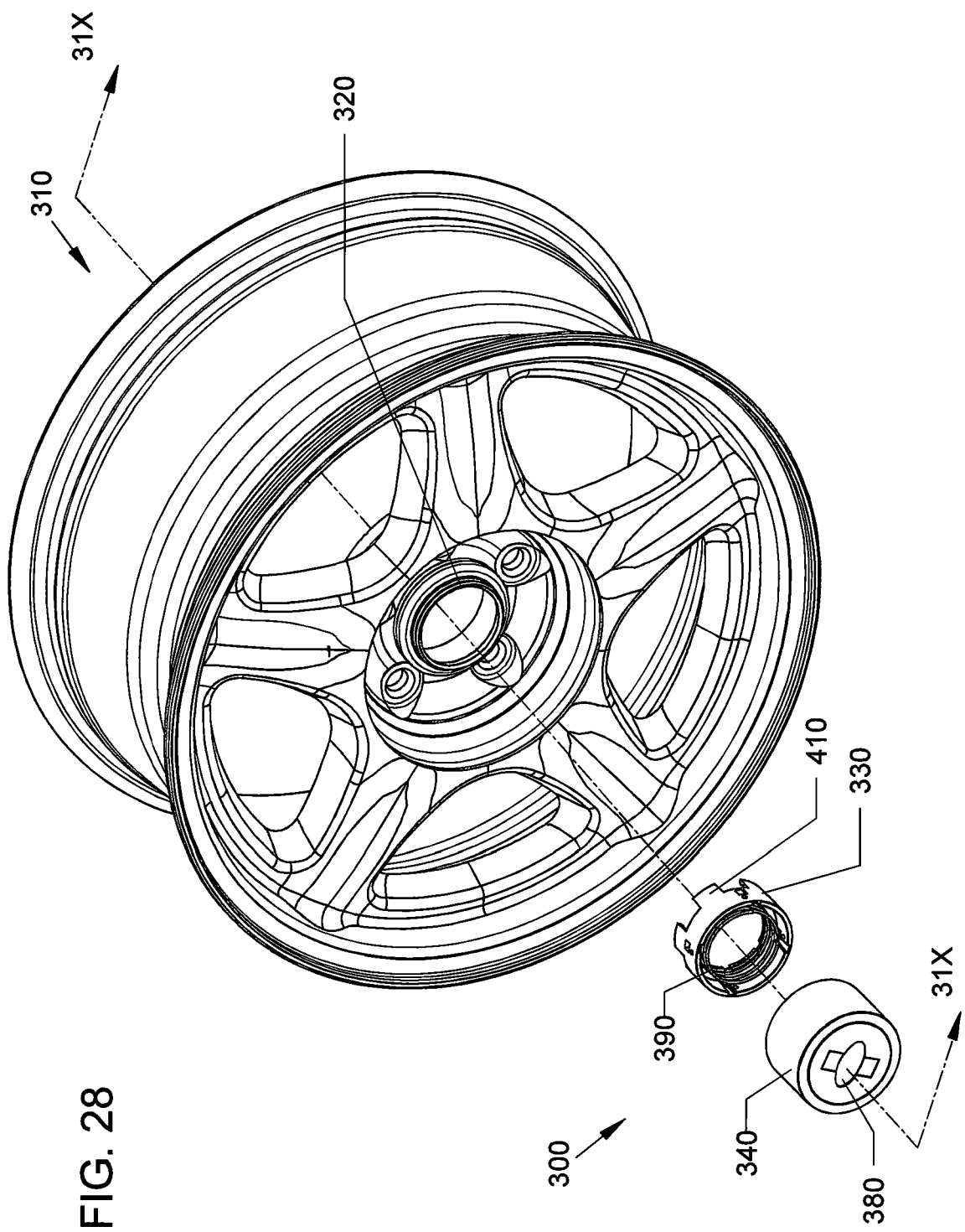

FIG. 28 is a front perspective view of the small cap assembly with the base and small cap components ready to mount to a proprietary wheel.

Figure 29:
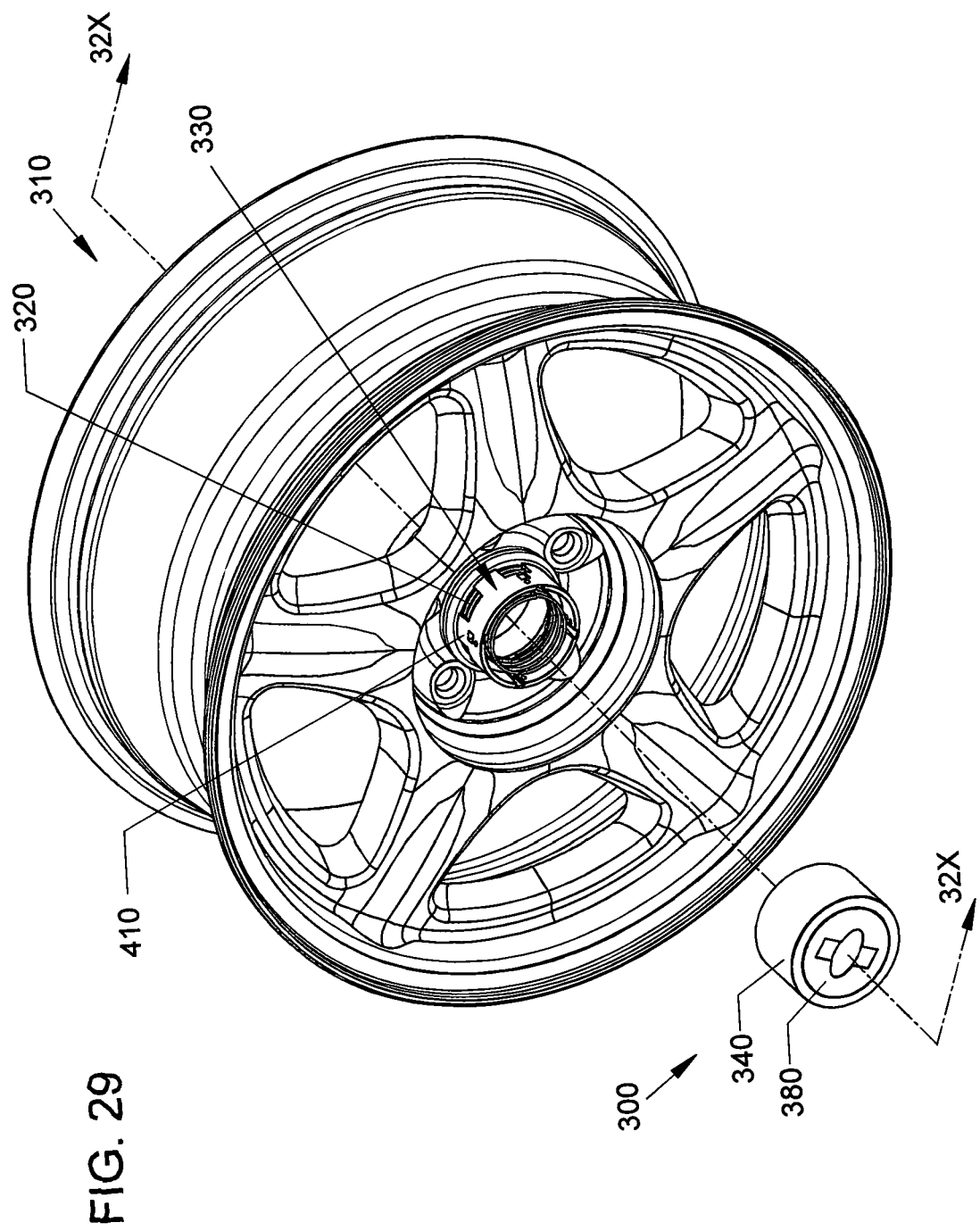

FIG. 29 is a perspective view of FIG. 28 with the base assembled to the wheel.

Figure 30:
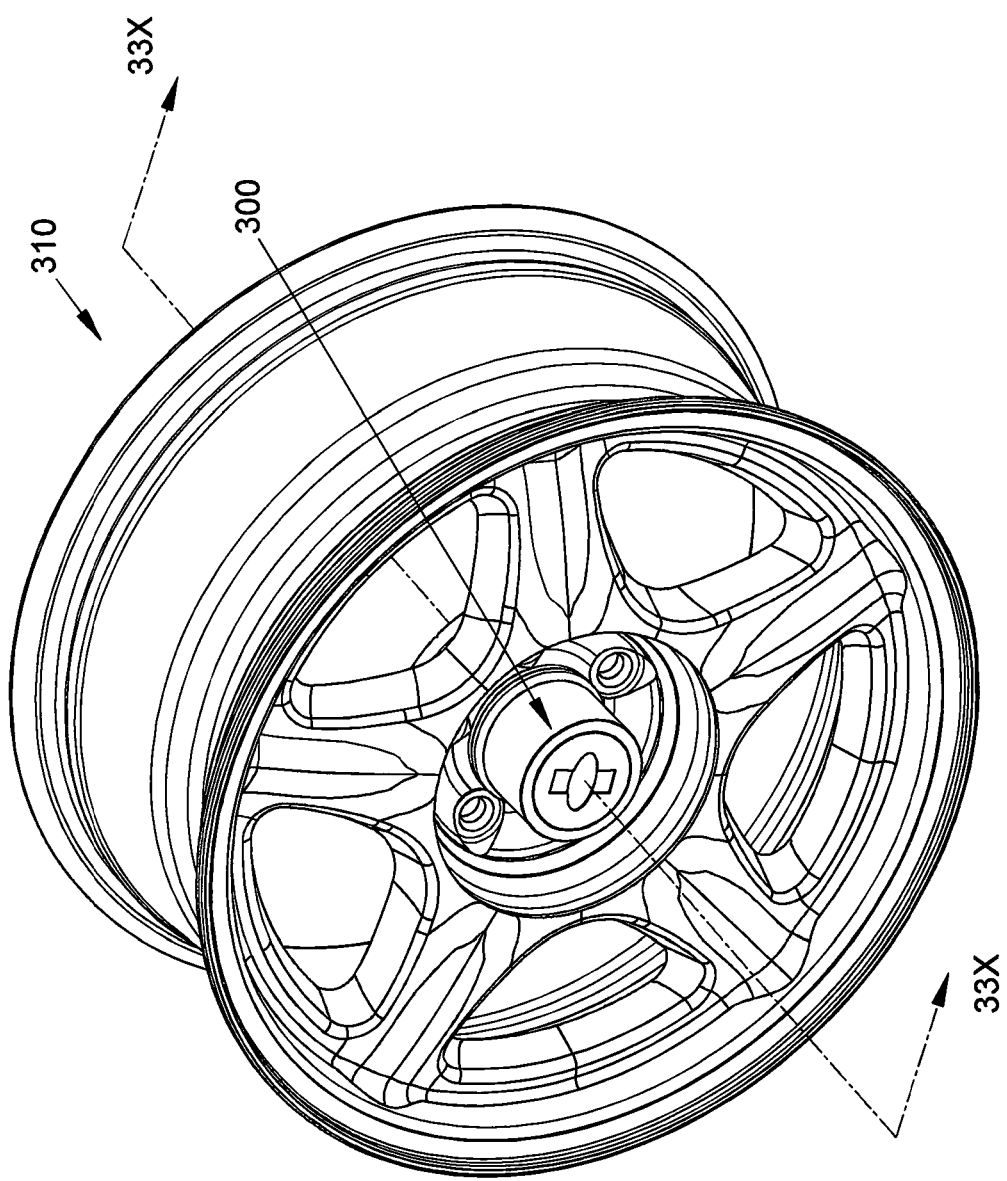

FIG. 30 is a perspective view of the FIG. 29 with the entire small cap assembly assembled to the wheel.

Figure 31:
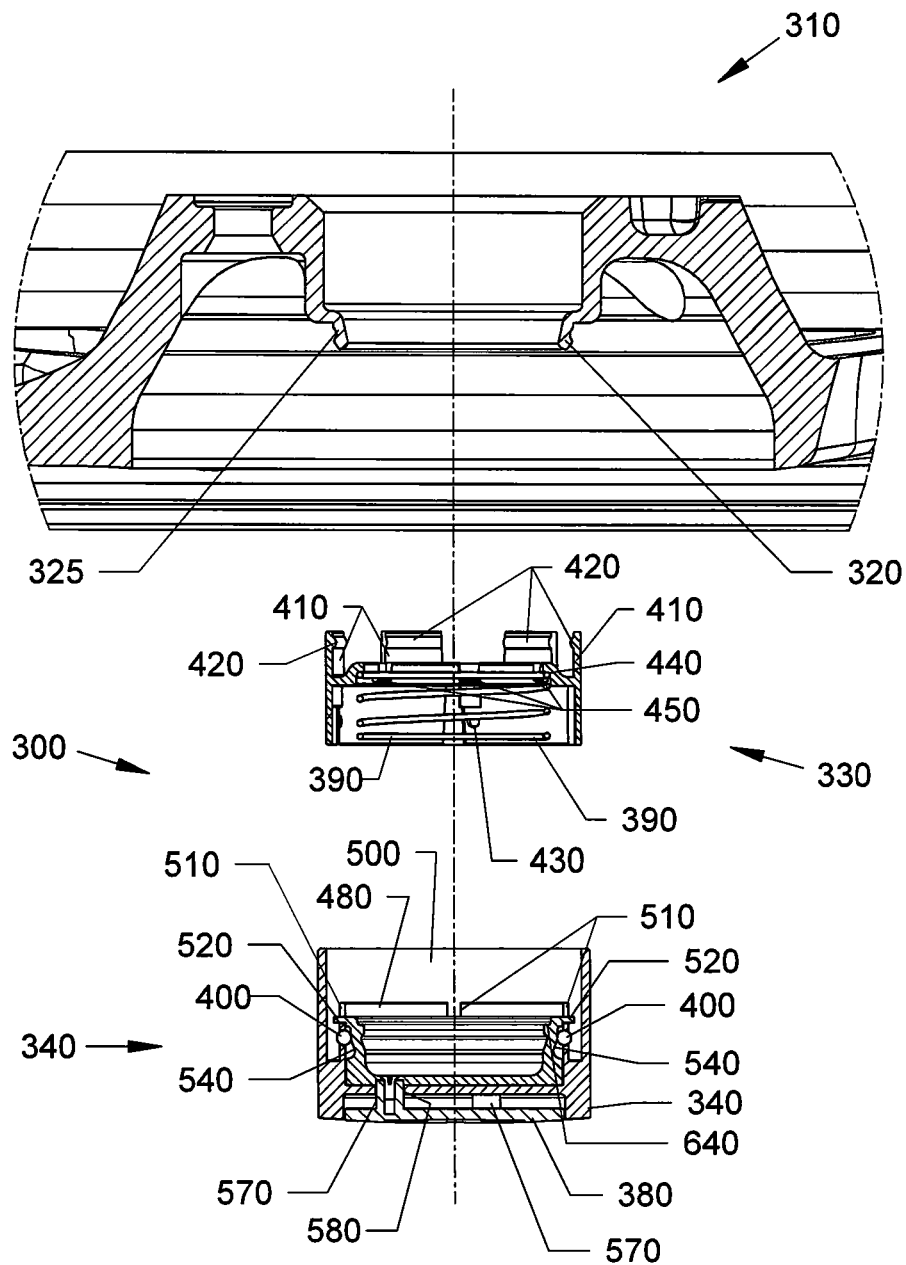

FIG. 31 is a cross-sectional enlarged perspective view of FIG. 28 along arrows 31X.

Figure 32:
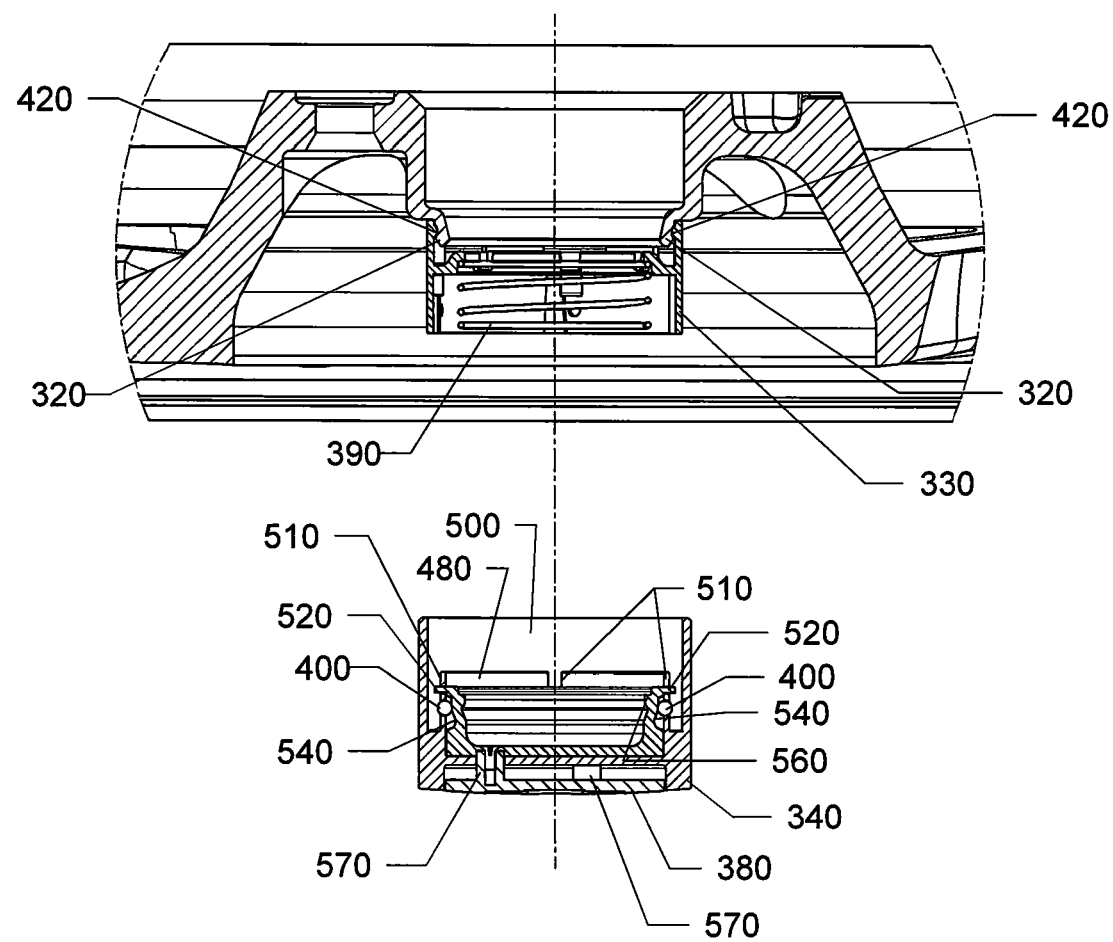

FIG. 32 is a cross-sectional enlarged perspective view of FIG. 29 along arrows 32X.

Figure 33:
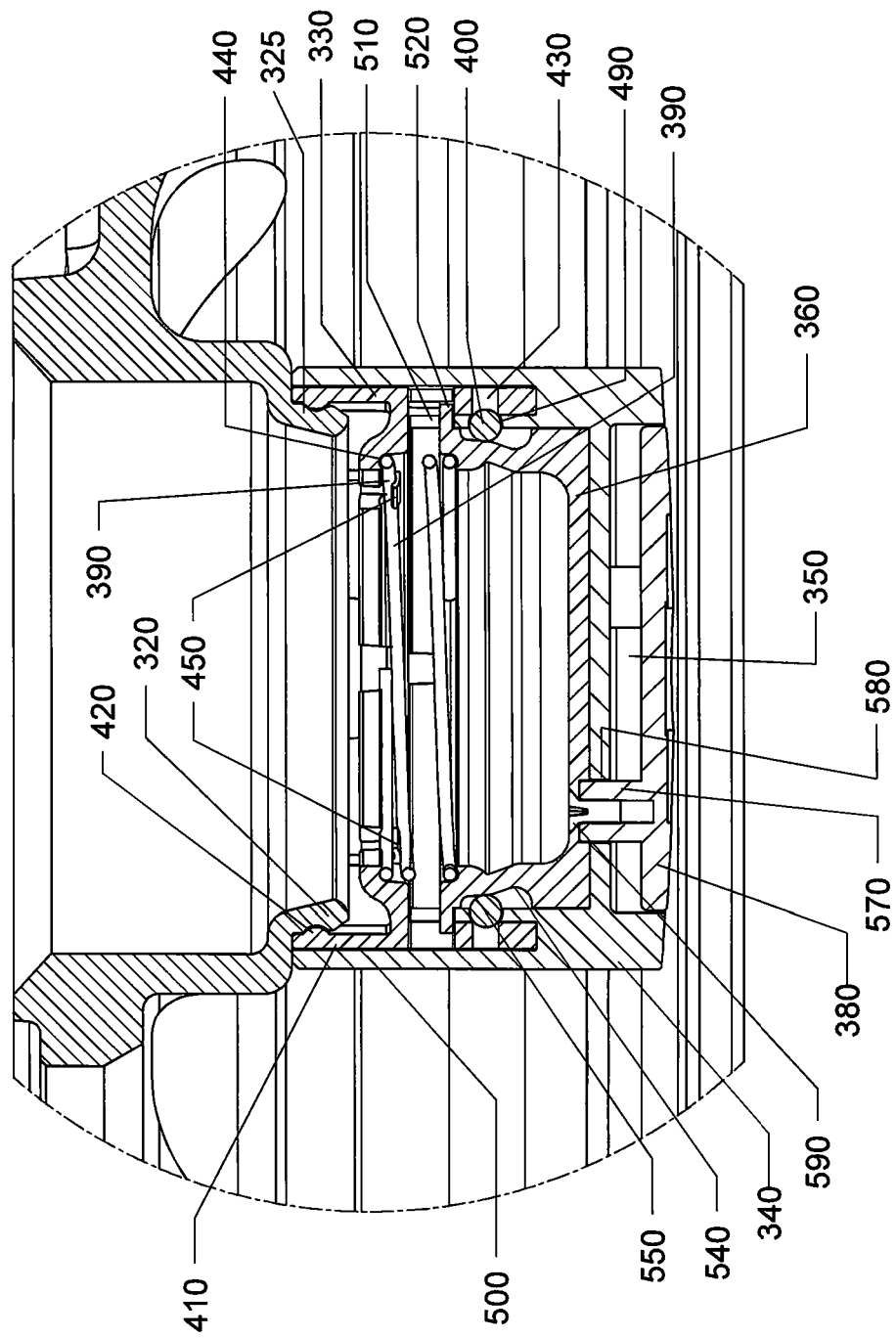

FIG. 33 is a cross-sectional enlarged perspective view of FIG. 30 along arrows 33X.

Figure 34:
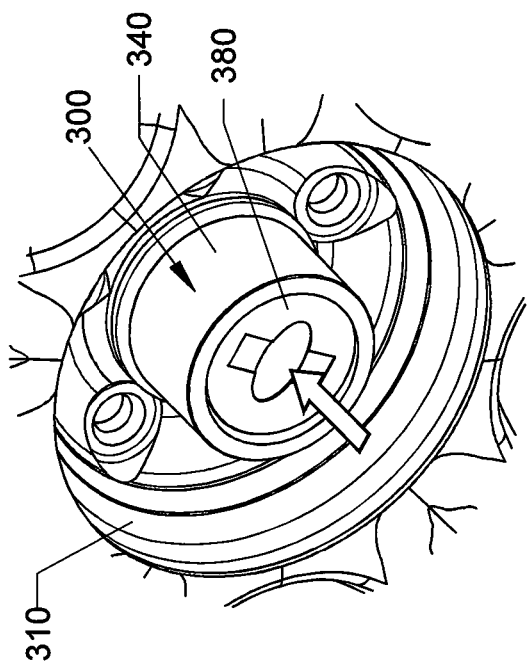

FIG. 34 is a front perspective detail showing the first step of the locking sequence in locking the small cap to the base shown in the previous FIGURES.

Figure 35:
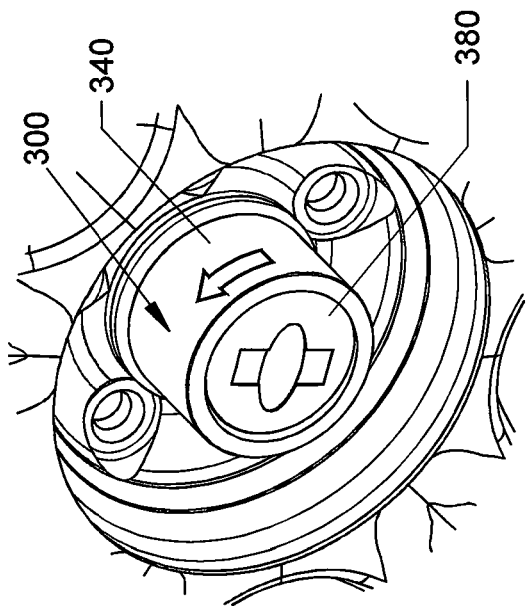

FIG. 35 is a front perspective view of FIG. 34 showing the second step of the locking sequence, the small cap is rotated counter-clockwise.

Figure 36:
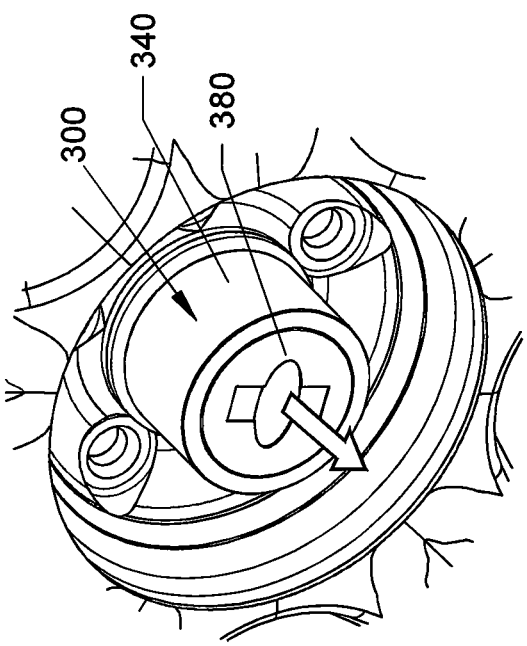

FIG. 36 is a front perspective view of FIG. 35 showing the third step of the locking sequence, the release button is released locking the small cap to the base.

Figure 37:
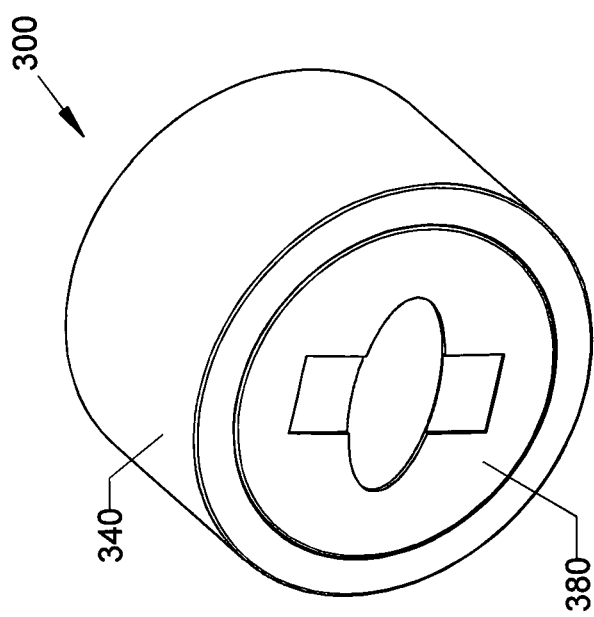

FIG. 37 is an enlarged front perspective view of the small cap assembly of the preceding FIGURES.

Figure 38:
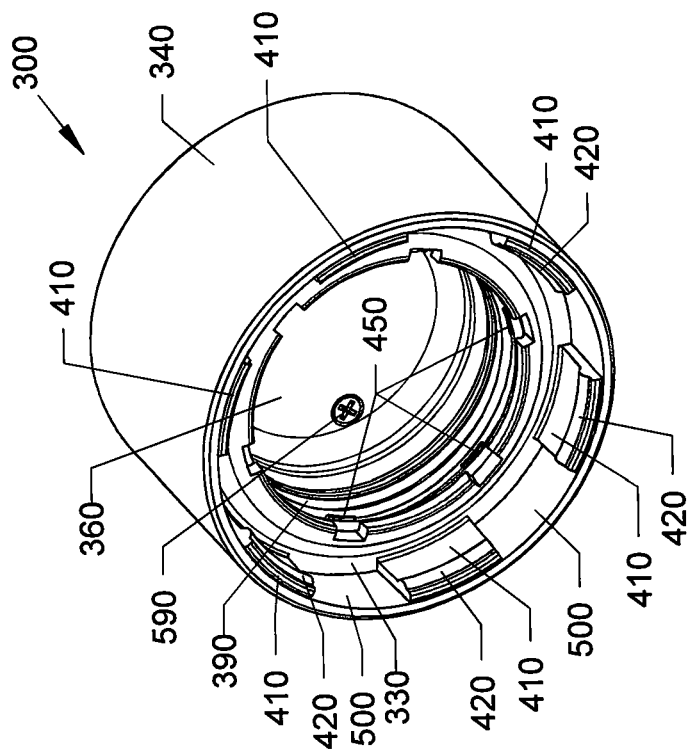

FIG. 38 shows a rear perspective view of the small cap assembly of FIG. 37.

FIG. 39 is a front view of the small cap assembly of FIG. 37.

FIG. 40 is a side view of the small cap assembly of FIG. 37.

FIG. 41 is a rear view of the small cap assembly of FIG. 37.

Figure 42:
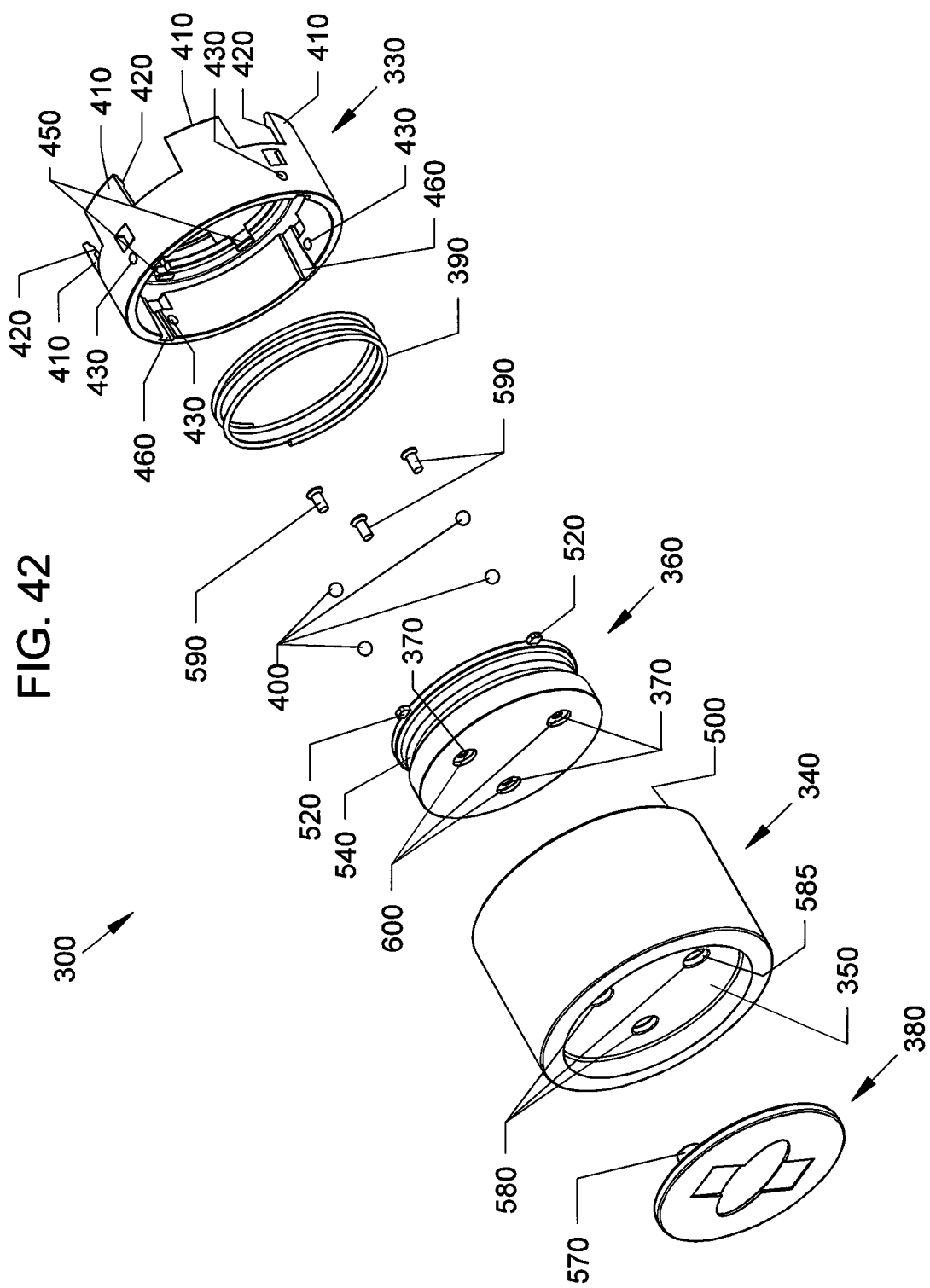

FIG. 42 is a front exploded perspective view of the small cap assembly of FIG. 37.

Figure 43:
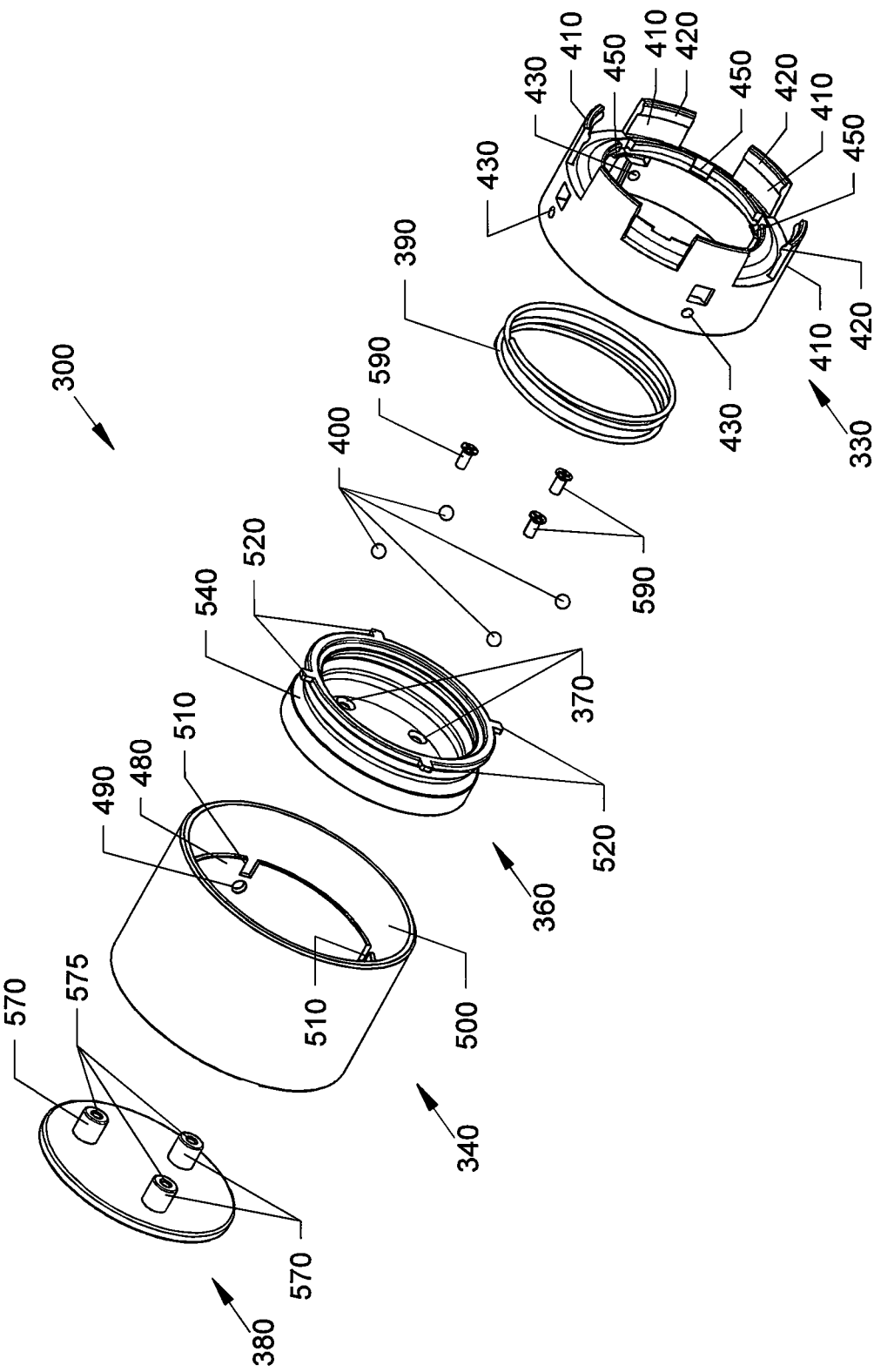

FIG. 43 is a rear exploded perspective view of the small cap assembly of FIG. 37.

Figure 44:
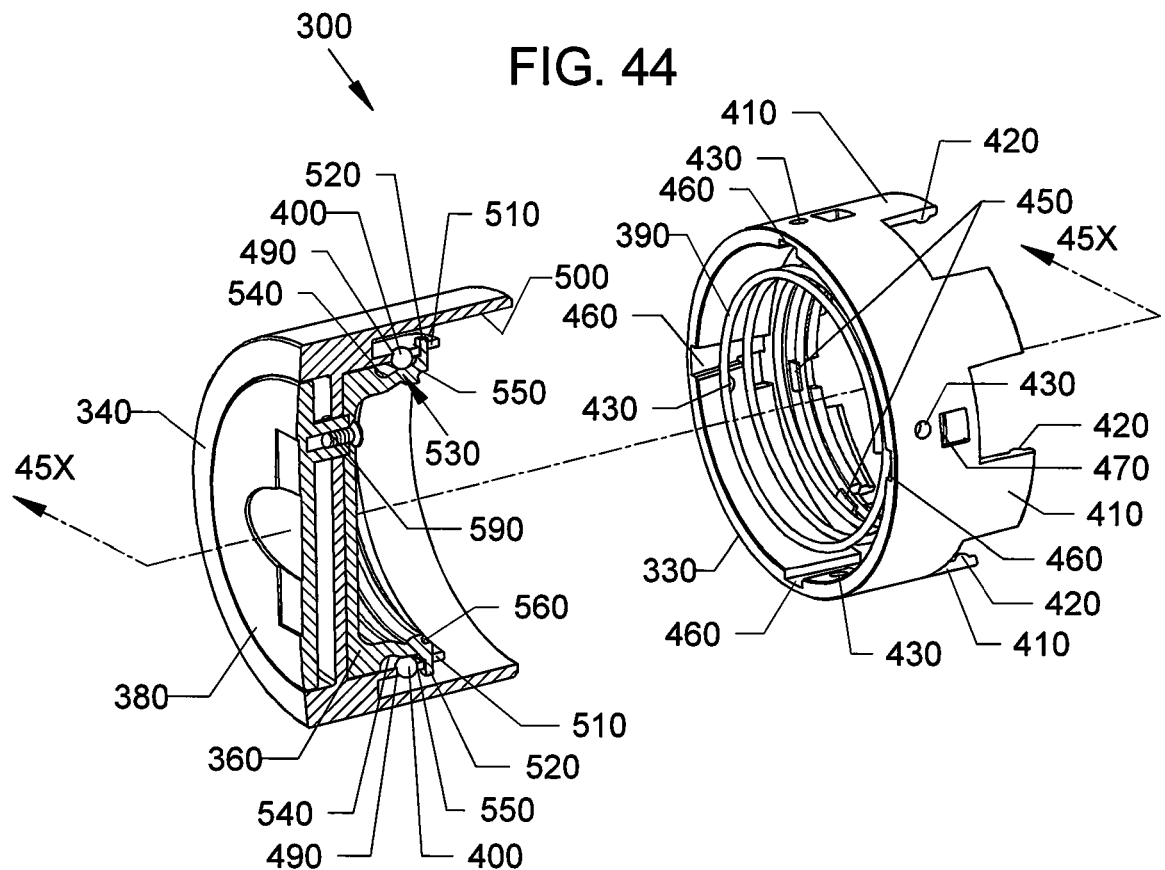

FIG. 44 is an enlarged perspective cross-sectional view of the cap of the preceding FIGURES separated from a perspective view of the base.

Figure 45:
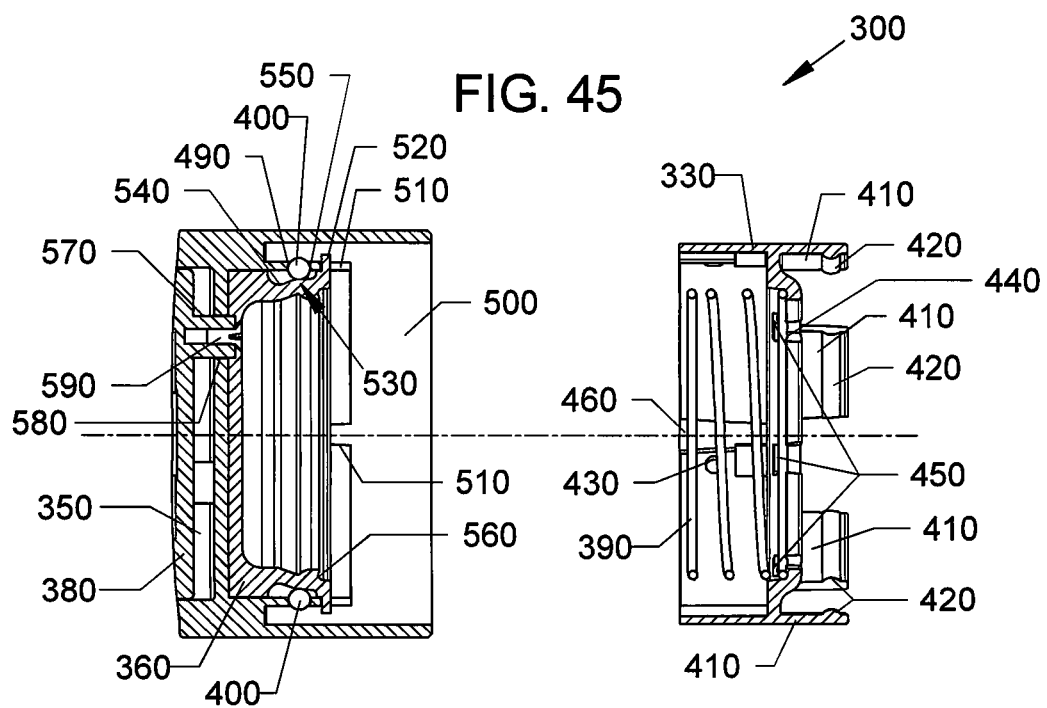

FIG. 45 is a cross-sectional view of the small cap and base of FIG. 44 along arrows 45X.

FIG. 46 is another perspective view of the cap and base of FIG. 44 with the spring loaded release button pressed into the small cap.

FIG. 47 is a cross-sectional view of the small cap and base of FIG. 46 along arrows 47X.

FIG. 48 is an enlarged perspective view of a cut-away view of the cap attached to the base of the preceding FIGURES.

FIG. 49 is a cross-sectional view of the cap attached to base of FIG. 48 along arrows 49X.

FIG. 50 is another perspective view of FIG. 48 with the small cap rotated counter-clockwise relative to the base.

FIG. 51 is a cross-sectional view of the cap and base of FIG. 50 along arrows 51X.

FIG. 52 is another perspective view of the cap and base of FIG. 50 with the spring release button returned to undepressed condition.

Figure 2:
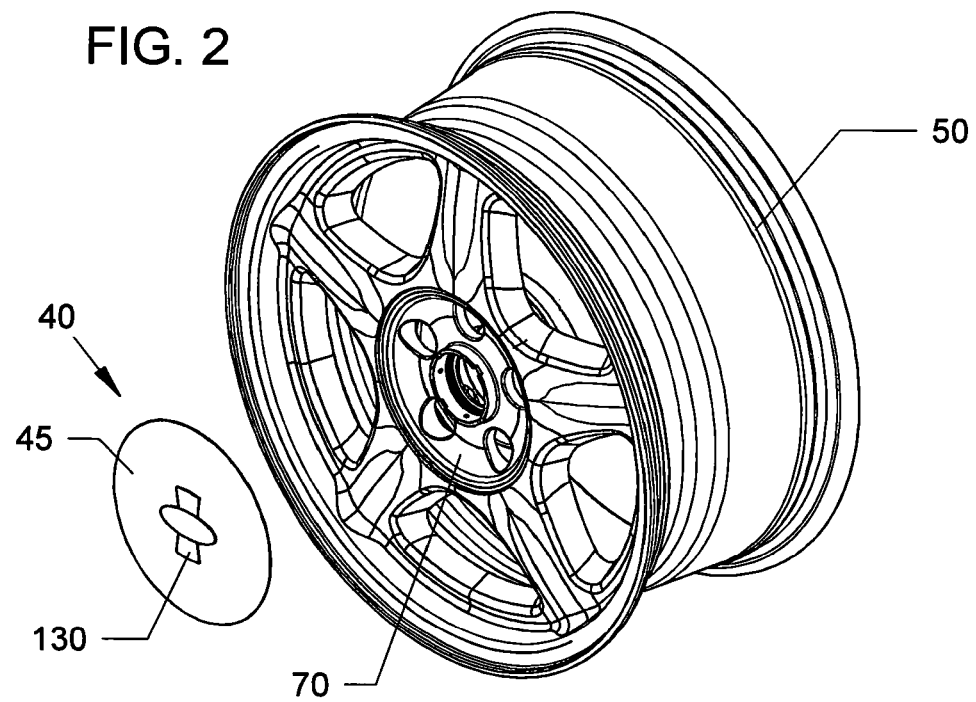
FIG. 2 is a front right perspective view of the wheel of FIG. 1 with base bracket of the large cover assembly installed on the wheel and the large cap pulled out.

FIG. 53 is a cross-sectional view of the cap and base of FIG. 2 along arrows 53X.

Third Embodiment

Figure 54:
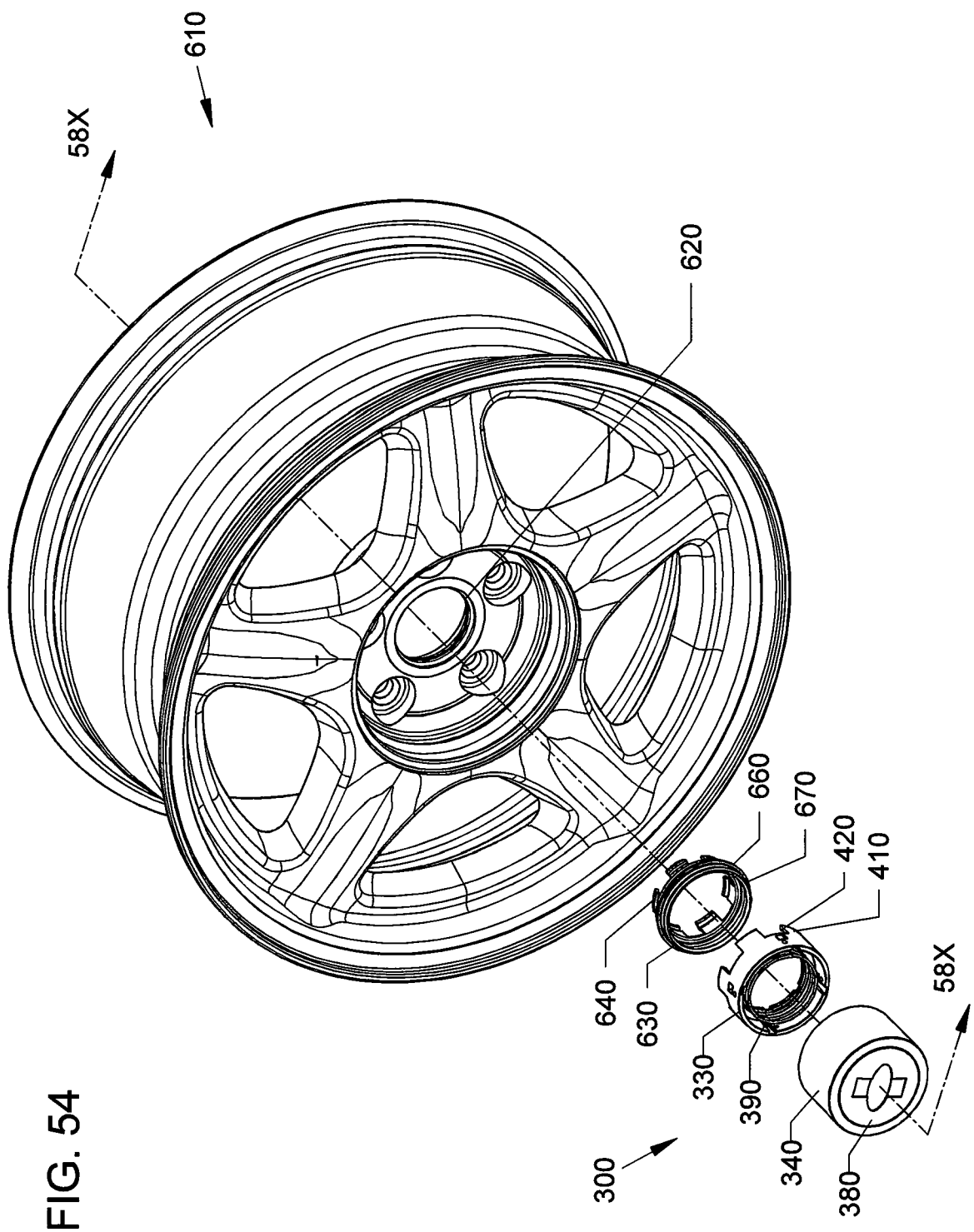

FIG. 54 is a front perspective exploded view of an OEM wheel with the small cap and base positioned to be mounted to the wheel using a novel adapter ring.

Figure 55:
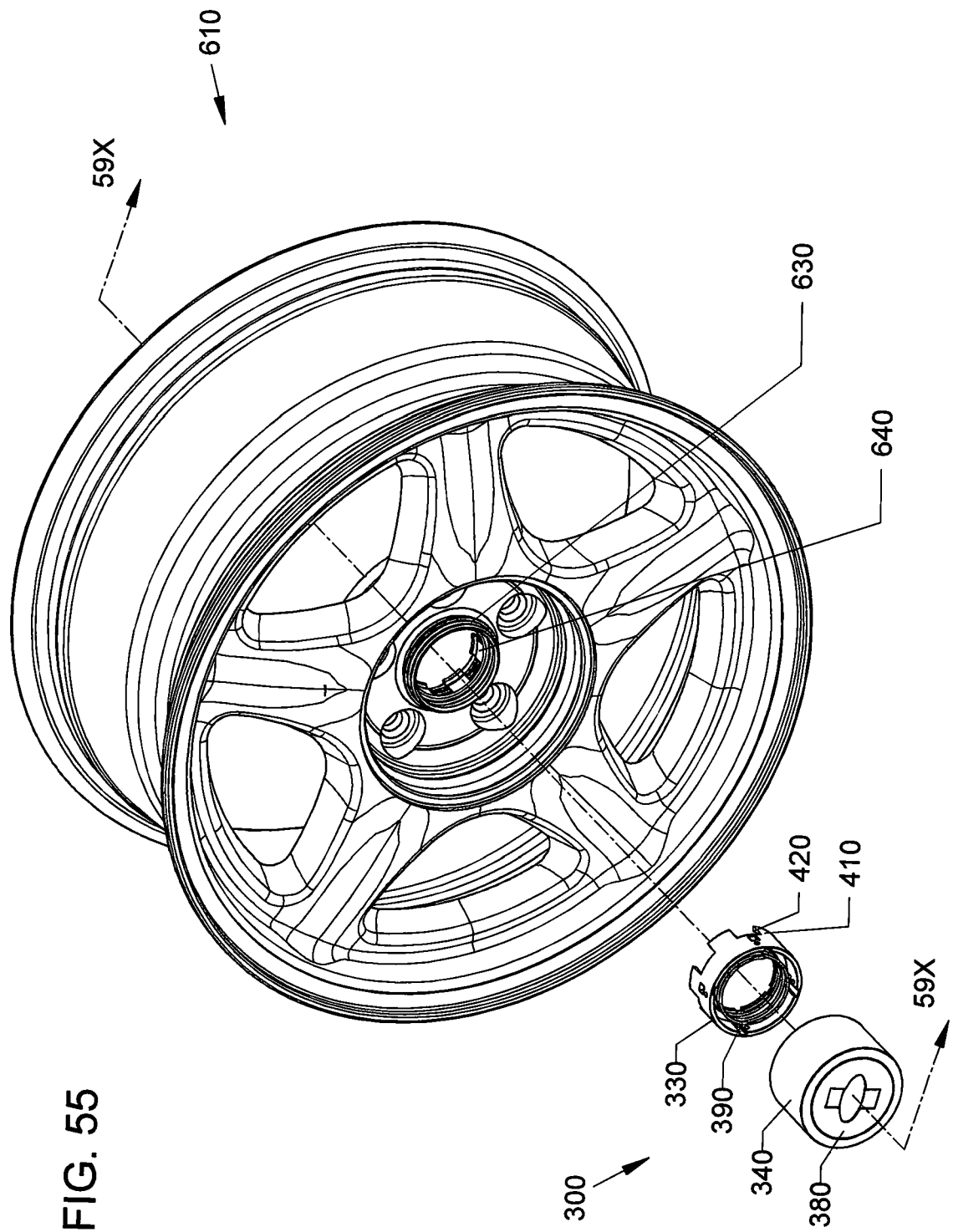

FIG. 55 is a perspective view of the wheel with installed adapter ring with cap and base ready to be attached to the wheel.

Figure 56:
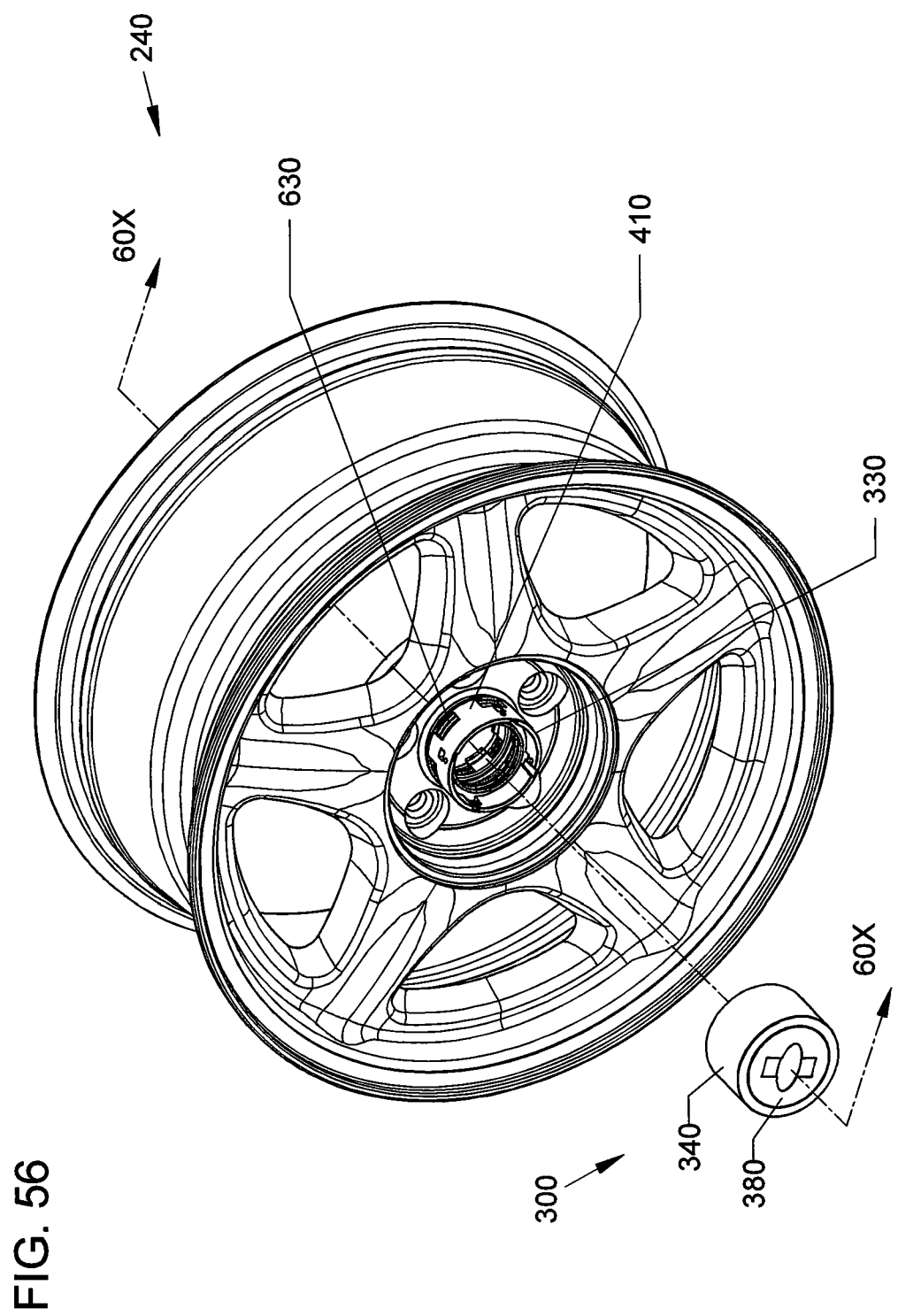

FIG. 56 is a perspective view of FIG. 55 with the installed adapter ring and attached base with cap ready to be installed.

Figure 57:
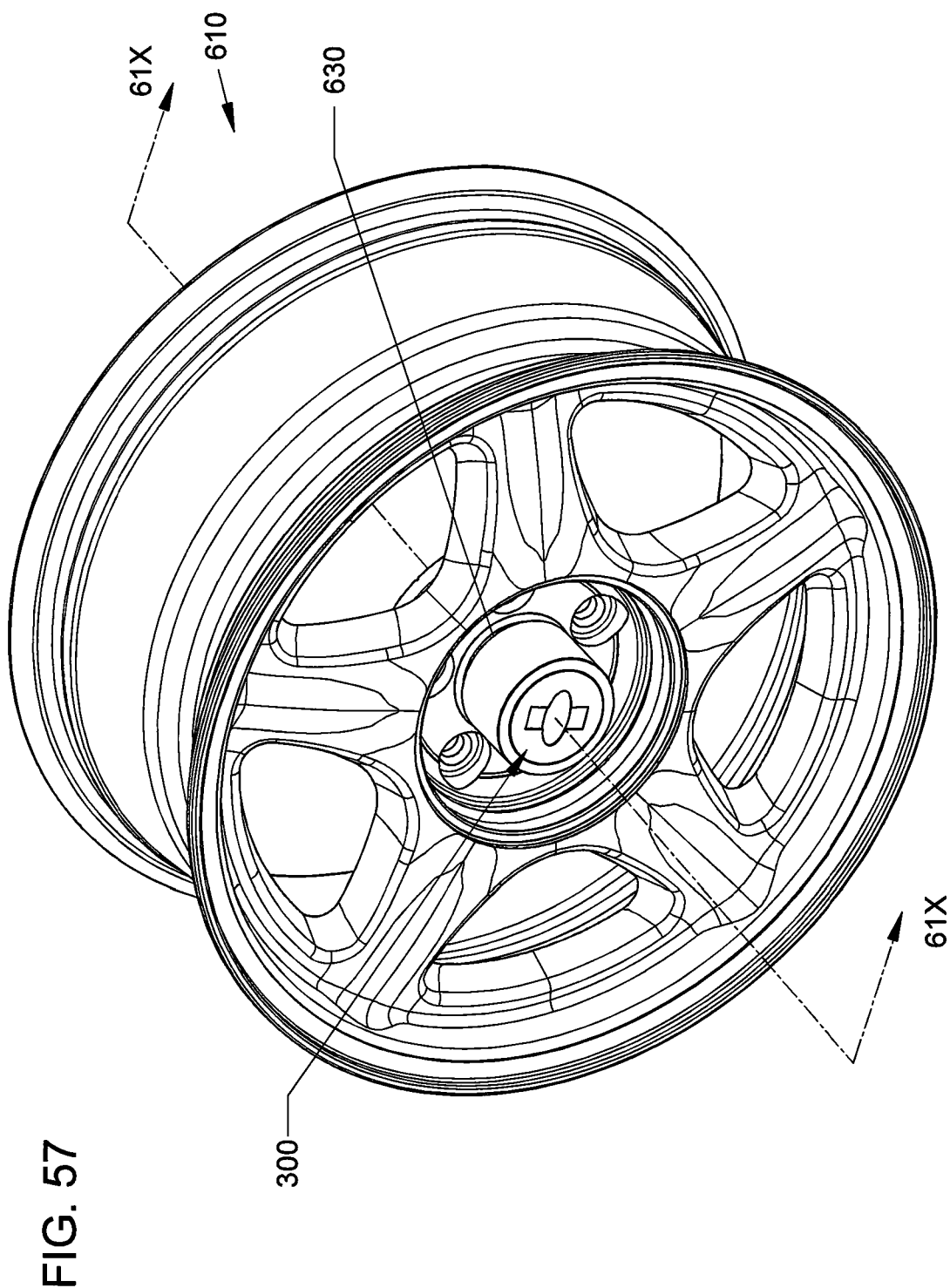

FIG. 57 is a perspective view of FIG. 56 with cap locked on the base and adaptor ring attached to the wheel.

Figure 58:
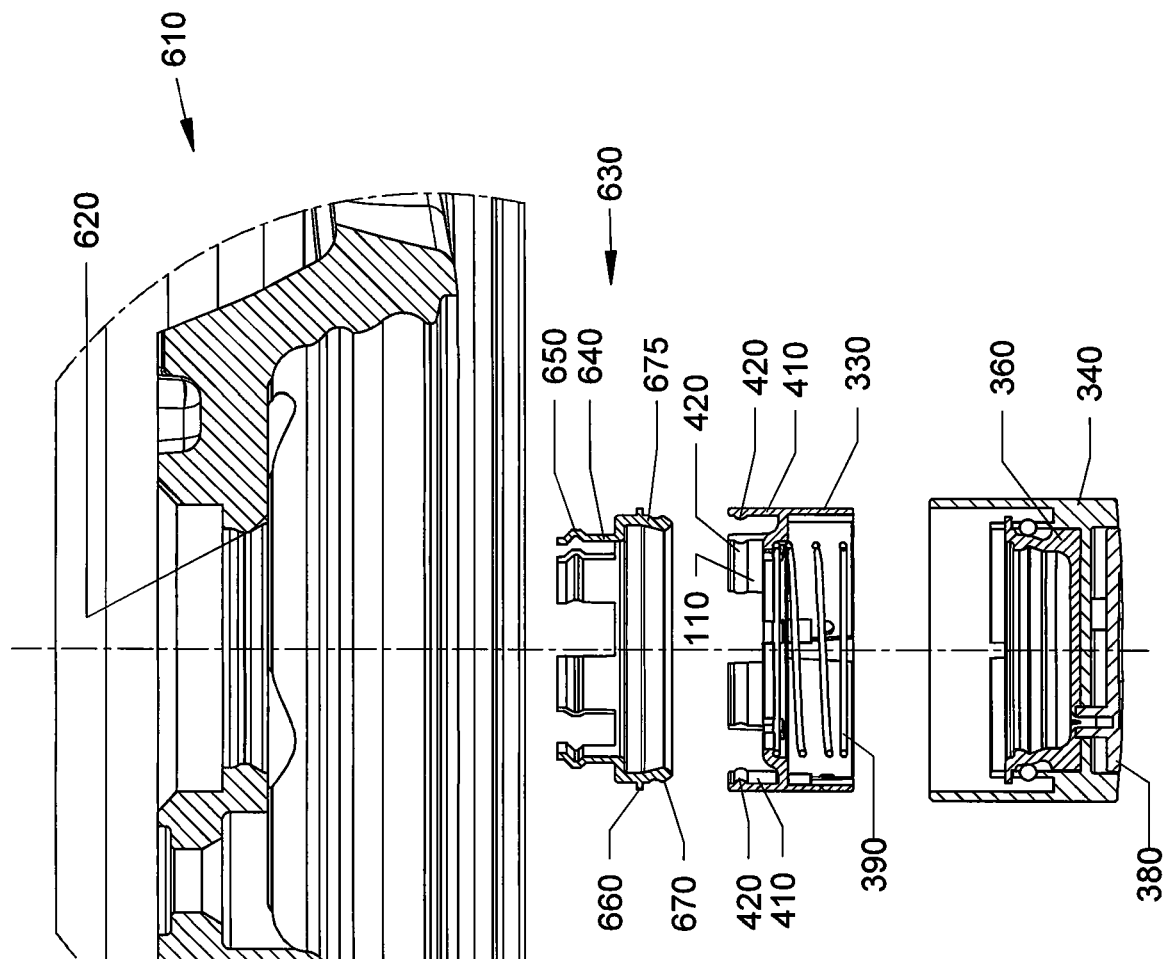

FIG. 58 is an enlarged cross-sectional view of wheel, adapter ring, base and small cap of FIG. 54 along arrows 58X.

Figure 59:
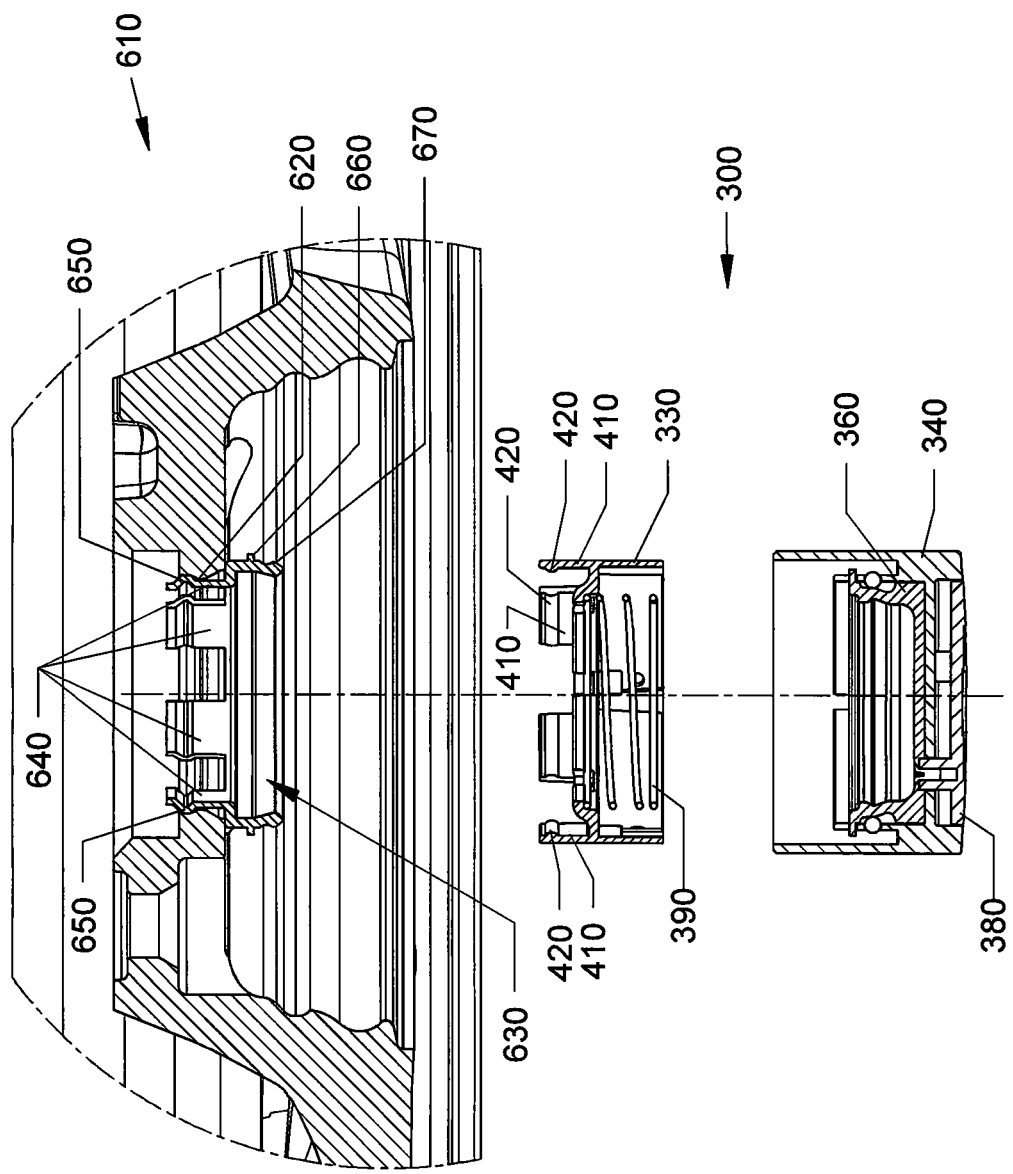

FIG. 59 is an enlarged cross-sectional view of wheel, adapter ring, base and small cap of FIG. 55 along arrows 59X.

Figure 60:
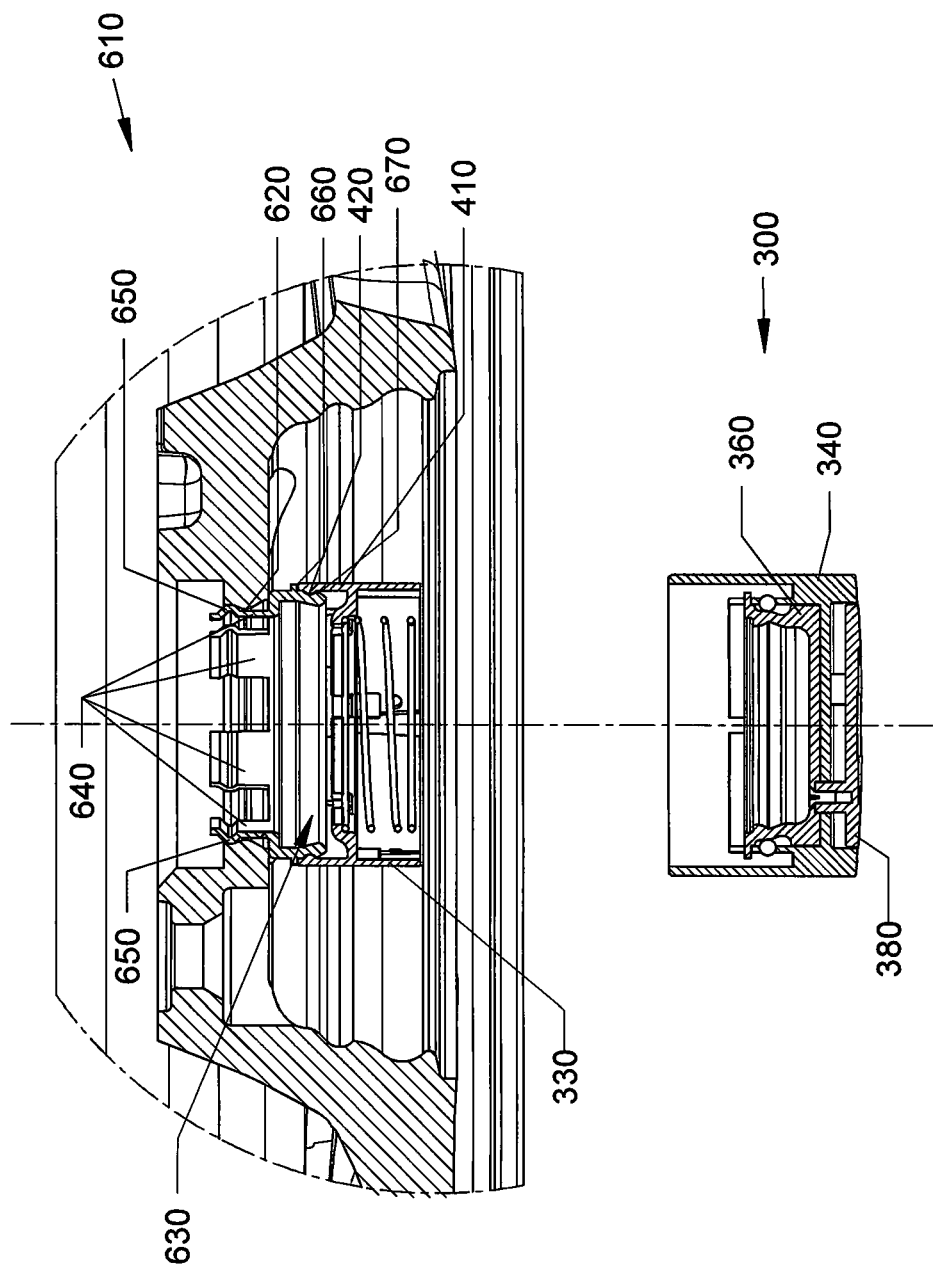

FIG. 60 is an enlarged cross-sectional view of wheel, installed adapter ring and attached base and small cap of FIG. 56 along arrows 60X.

Figure 61:
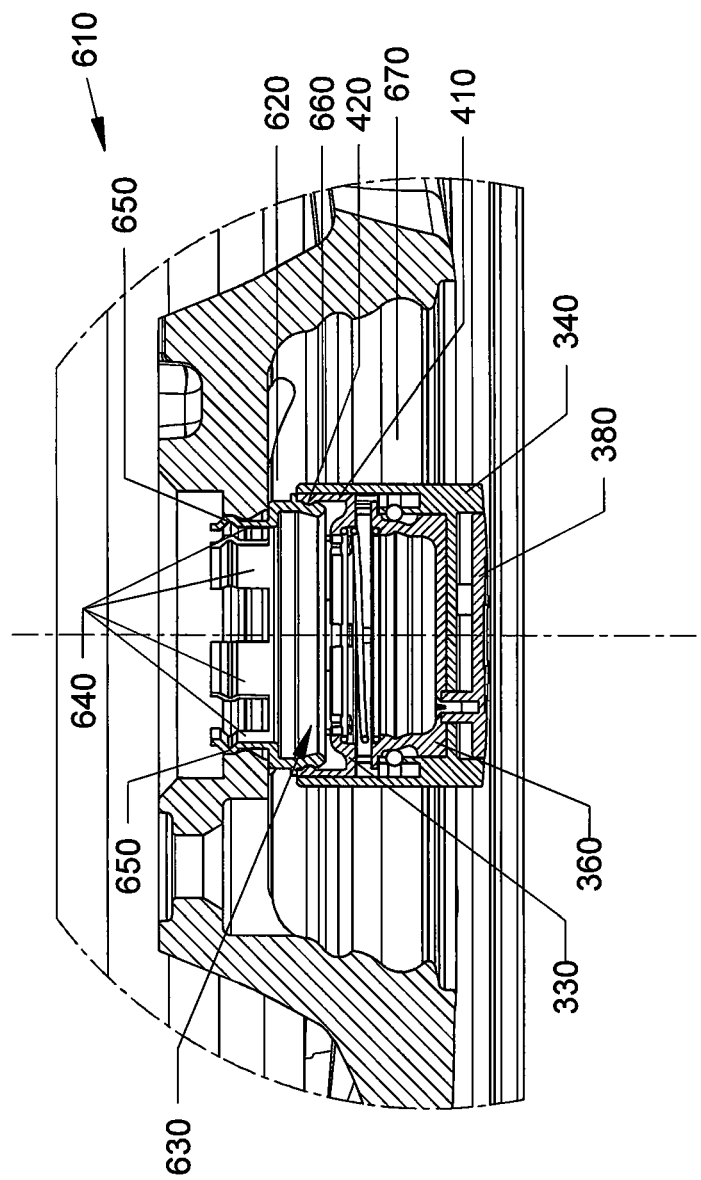

FIG. 61 is an enlarged cross-sectional view of wheel, installed adapter ring and attached base and locked small cap of FIG. 57 along arrows 61X.

FIG. 62 is a front perspective view of the adapter ring of the preceding FIGURES.

FIG. 63 is a rear perspective view of the adapter ring of FIG. 62.

FIG. 64 is a top view of the adapter ring of FIG. 62.

FIG. 65 is a front view of the adapter ring of FIG. 62.

FIG. 66 is a side view of the adapter ring of FIG. 62.

FIG. 67 is a rear view of the adapter ring of FIG. 62.

Figure 68:
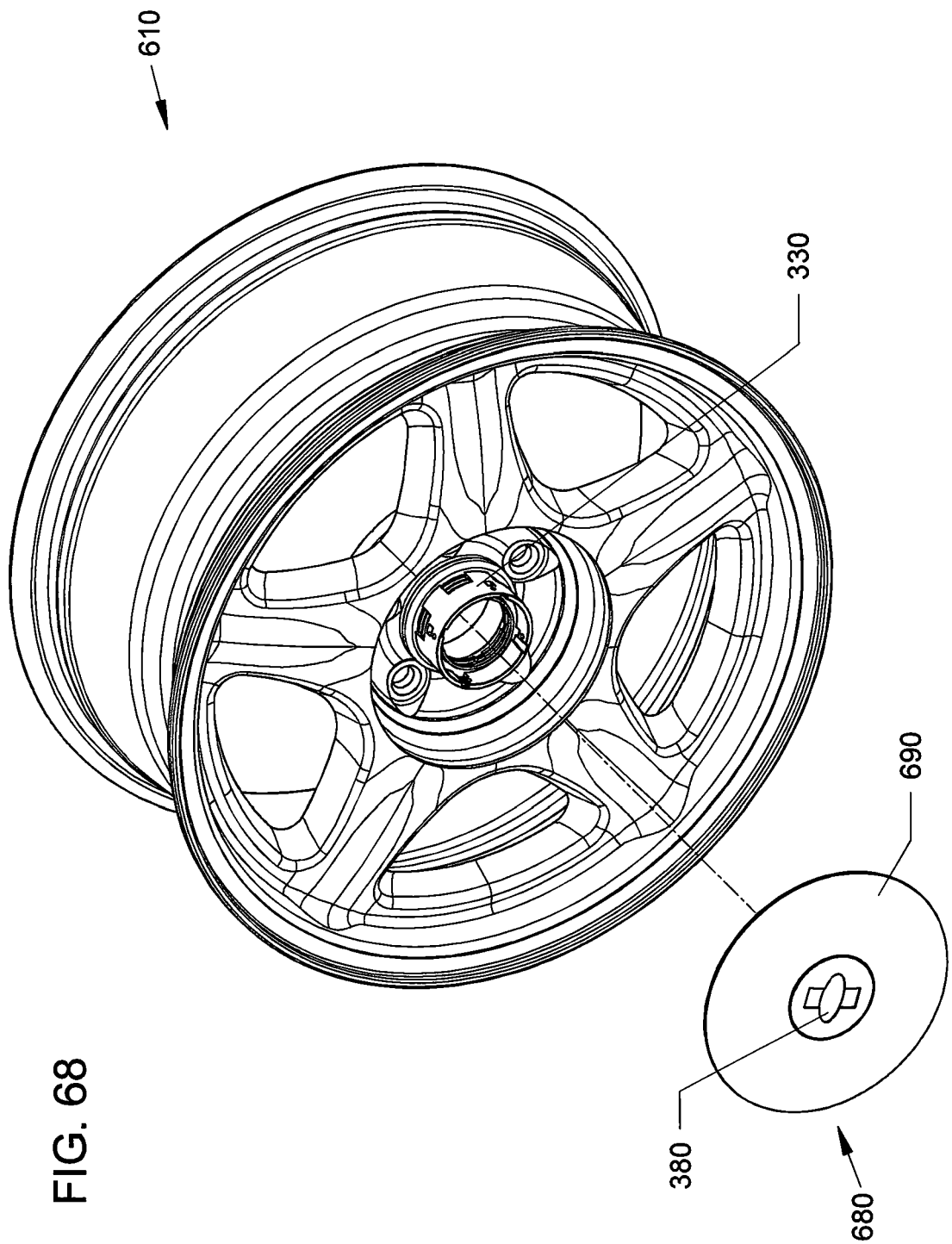

FIG. 68 is a front perspective view of an OEM wheel with a base mounted via an adapter ring of FIG. 56 with a large cap assembly is ready to mount to the base.

Figure 69:
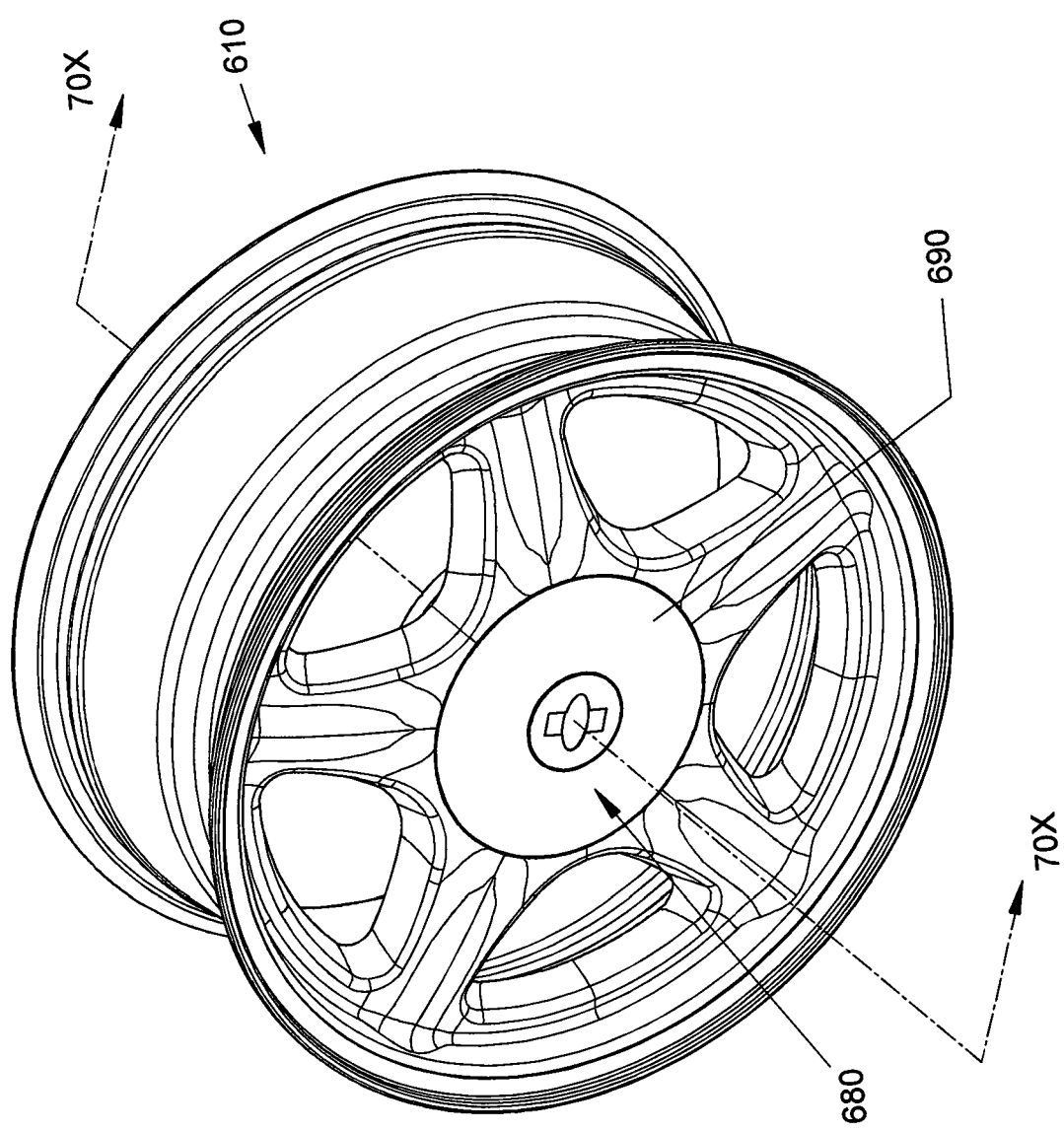

FIG. 69 is a perspective view of FIG. 68 showing the large cap assembly mounted to the wheel.

Figure 70:
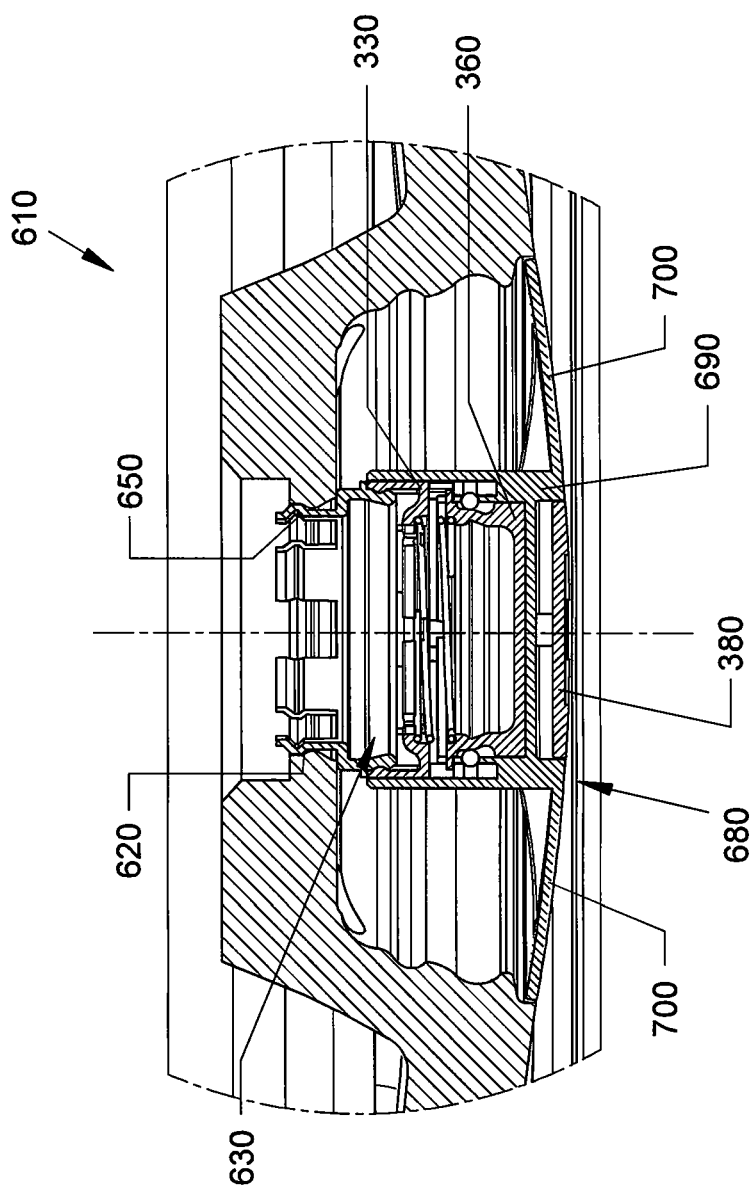

FIG. 70 is a cross-sectional view of the wheel and large cap of FIG. 69 along arrows 70X.

Figure 71:
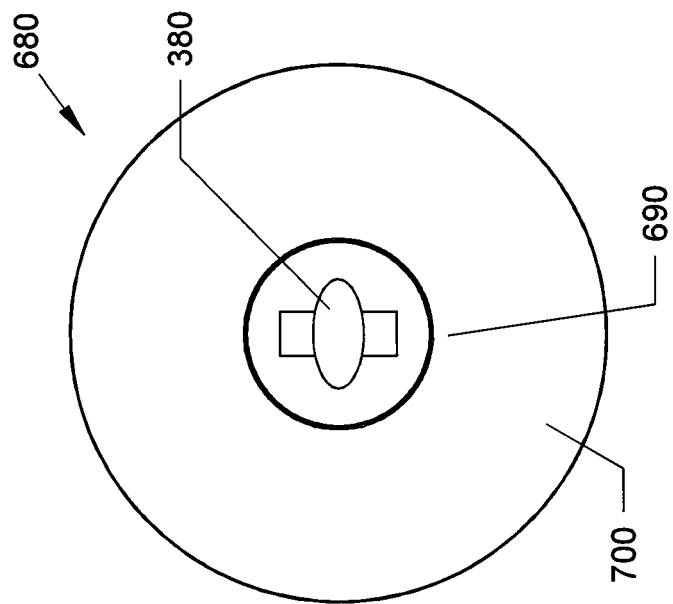

FIG. 71 is a front view of the large cap assembly of FIG. 68.

Figure 72:
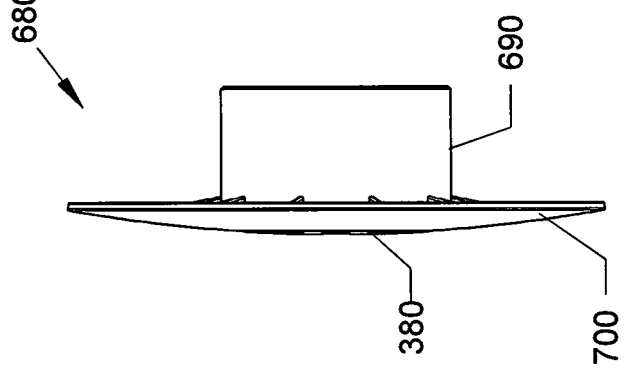

FIG. 72 is a side view of the large cap assembly of FIG. 71.

Figure 73:
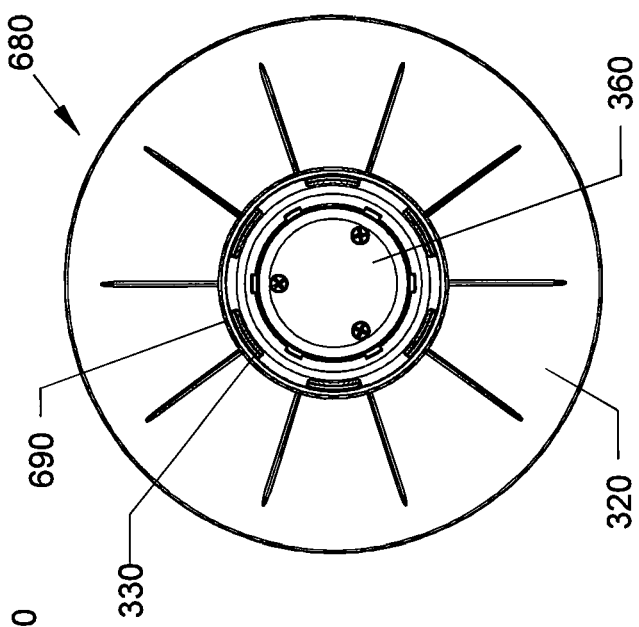

FIG. 73 is a rear view of the large cap assembly of FIG. 71.

Figure 74:
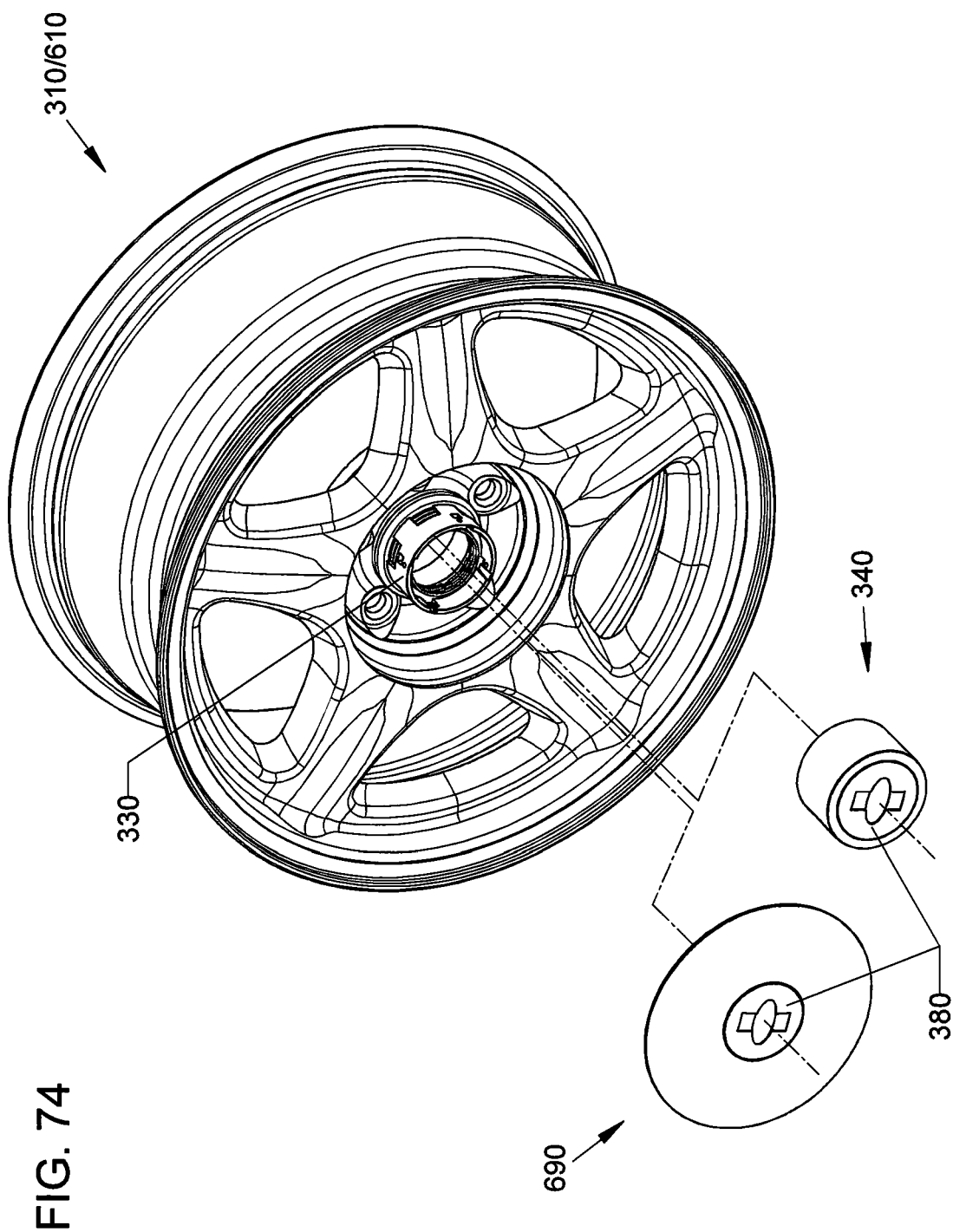

FIG. 74 is a perspective view of a wheel with a base mounted, with the small cap assembly and the large cap assembly shown to illustrate the options of mounting either the large or small caps to the base.

Fourth Embodiment

FIG. 75 shows a perspective view of a small cap assembly of the cap separated from the base with no lock ball feature shown with the base separated from the small cap, with bosses/studs.

FIG. 76 is another view of the cap engaged to the base of FIG. 75 with a partial ghost view showing the studs inserted into slots, but not locked.

FIG. 77 is another view of the cap engaged to the base of FIG. 76 with the lock bosses bottomed out in the radial locator slots.

FIG. 78 is another view of the cap engaged to the base of FIG. 77 showing the lock bosses fully seating into the axial lock slots.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Wheel cover bracket assembly with small cap.
20 Wheel cover bracket assembly with large cap.
30 Small cap assembly.
35 Small cap.
38 Bearing retaining bore in small cap.
40 Large cap assembly.
45 Large cap.
48 Bearing retaining bore in large cap.
50 Car wheel/hub.
70 Base.
75. Cylindrical center receptacle
80 Center bore of wheel.
90 Lug nut holes of wheel.
100 Lug nuts.
110 Base retaining tabs.
120 Base retaining tab hoop spring.
125 Retainer groove in wheel.
130 Emblem/release button.
140 Screw.
150 Cap retainer.
160 Cap retainer bearing guide.
170 Base bearing pocket.
180 Ball bearing.
190 Cap retainer coil spring.
200 Lug nut hole in base.
300 Small cap assembly.
310 Car wheel.
320 Wheel hub cover mount rib.
325 Outer perimeter concave groove
330 Base.
340 Small cap.
350 Cavity in cover for actuator plate.
360 Cap retainer.
370 Actuator plate mount screw holes.
380 Emblem/release button.
390 Cap retainer coil spring.
400 Ball bearing.
410 Base retaining tabs.
420 Base snap arm retaining shoulder.
430 Base ball pocket.
440 Base spring nest.
450 Base spring retaining hooks.
460 Base index slot.
470 Base cover retaining stop.
480 Small cap lock sleeve.
490 Small cap ball pocket.
500 Small cap snap block sleeve blocks snap from flexing and releasing when engaged.
510 Small cap index slot.
520 Cap retainer index tab.
530 Cap retainer lock ball ramp.
540 Cap retainer ramp release area.
550 Cap retainer ramp lock area.
560 Lock ring spring nest.
570 Release button mount boss(es).
575 Threaded holes in back of boss(es).
580 Narrow depth holes in cap for release button mounting bosses.
585 Through-holes in cap 340 to allow screws to pass therethrough
590 Screw(s).
600 Cavities in lock ring for release button mount bosses.
610 OEM (original equipment manufacturer) wheel with standard snap mount geometry.
620 Snap mount geometry on OEM wheel (having an inwardly protruding ring shaped edge).
630 Adapter ring.
640 Adapter ring snap leg.
650 Adapter ring snap shoulder.
660 Adapter ring stop shoulder.
670 Adapter ring hub base snap mount geometry (mount rib).
675 Outer perimeter concave groove.
680 Large cap assembly.
690 Large cap.
700 Lug shield integrated into small cap.
710 Small cap assembly with No Lock Ball Feature (NLBF).
720 Small cap (NLBF).
730 Emblem/release button (NLBF).
740 Lock ring with lock bosses (NLBF).
750 Base (NLBF).
760 Lock boss(es)/stud(s).
770 Radial locator slot(s) (elongated slots with narrowing diameters from open to lower ends.
780 Axial lock(s) slot (reverse L shaped slot(s).
790 Lock boss/stud path(es) from separated components to components locked together.

First Embodiment

Figure 1:
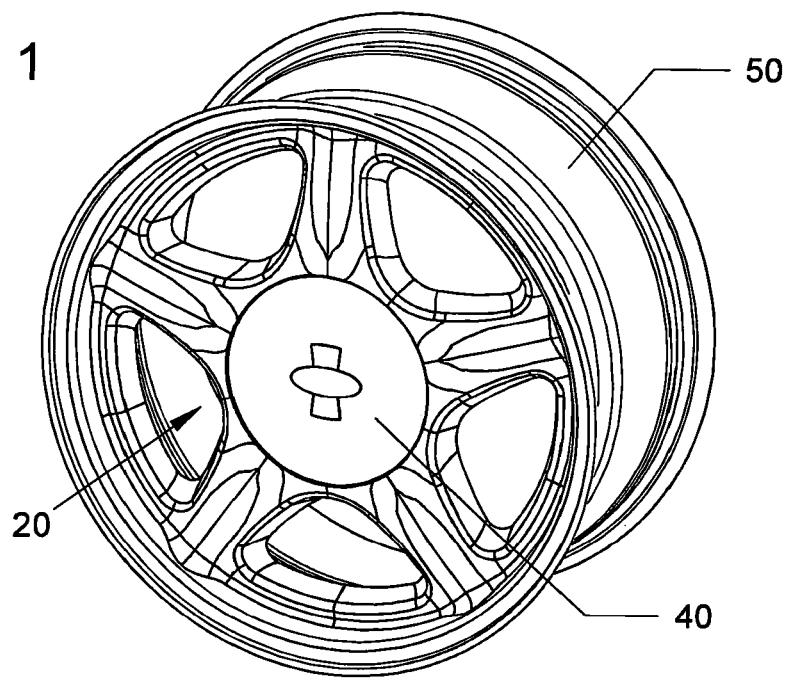
FIG. 1 is a front perspective view of a vehicle wheel with large cover bracket assembly and large cap assembly installed.

FIG. 1 is a front perspective view of a vehicle wheel 50 with large cover bracket assembly 20 and large cap assembly 40 installed. FIG. 2 is a front right perspective view of the wheel 50 of FIG. 1 with base bracket 70 of the large cover assembly 20 installed on the wheel 50 and the large cap assembly 40 pulled out. The exterior of the large cap assembly 40 includes a large cap 45 along with a push button emblem 130, that will be described in more detail later.

Figure 3:
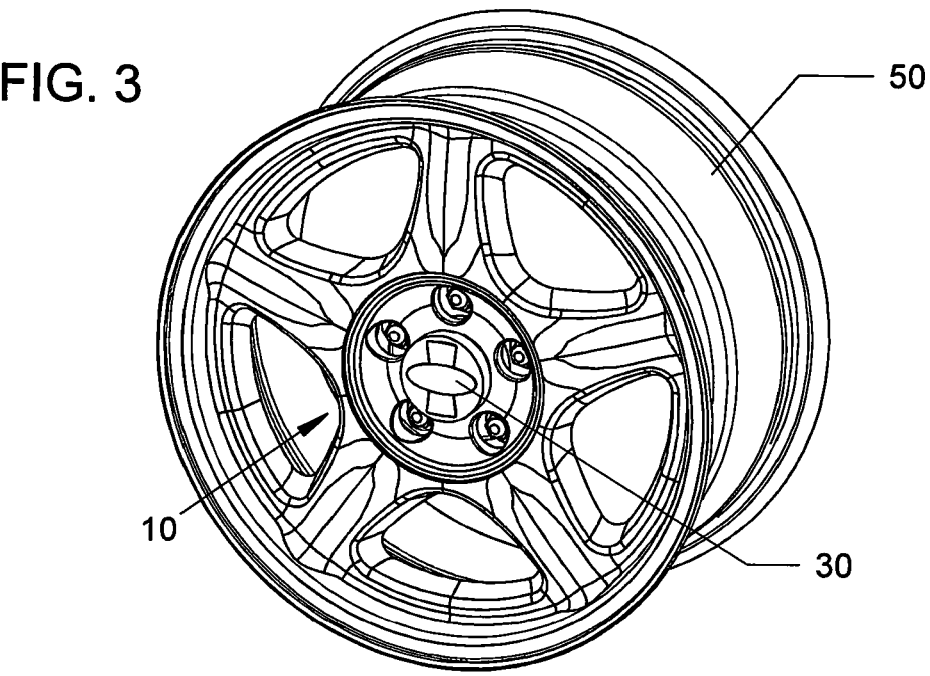
FIG. 3 is a front perspective view of the wheel of FIG. 1 with a small cover bracket assembly installed over the base bracket.
Figure 4:
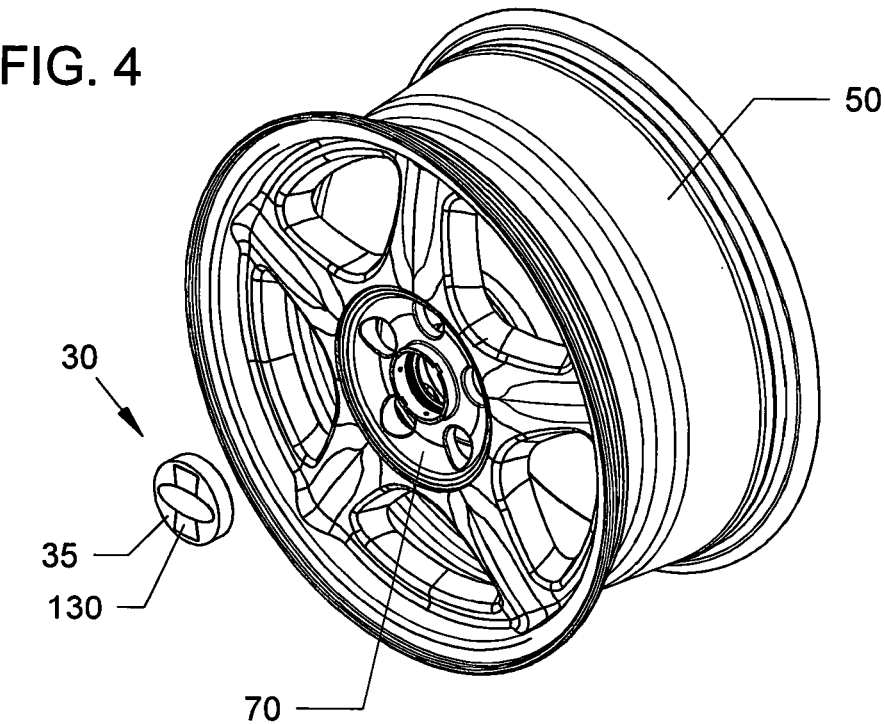
FIG. 4 is a front right perspective view of the wheel of FIG. 3 with base bracket of the small cover bracket assembly installed and small cap assembly pulled out.

FIG. 3 is a front perspective view of the wheel 50 of FIG. 1 with a small cover bracket assembly 10 installed over the base bracket 70. FIG. 4 is a front right perspective view of the wheel of FIG. 3 with base bracket 70 of the small cover bracket assembly 10 installed and the small cap assembly 30 pulled out. The exterior of the small cap assembly 30 includes a small cap 35 along with a push button emblem 130, which will be described in more detail later.

Figure 5:
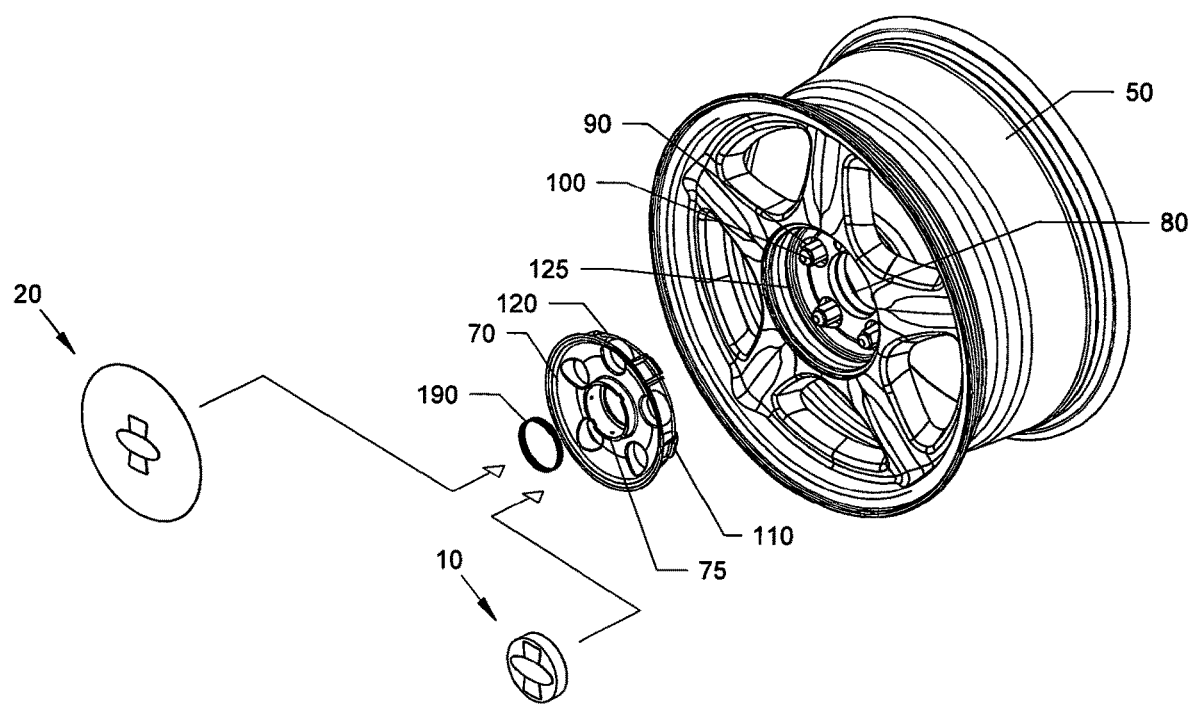
FIG. 5 is an exploded front right perspective view of the wheel of the preceding figures with separated base bracket and both the large cap and small cap.

FIG. 5 is an exploded front right perspective view of the wheel 50 of the preceding figures with separated base bracket 70 and large cap assembly 20 and small cap assembly 10. The cap retainer coil spring 190 can be sized to fit inside the cylindrical center receptacle 75 in the base bracket 70.

Figure 6:
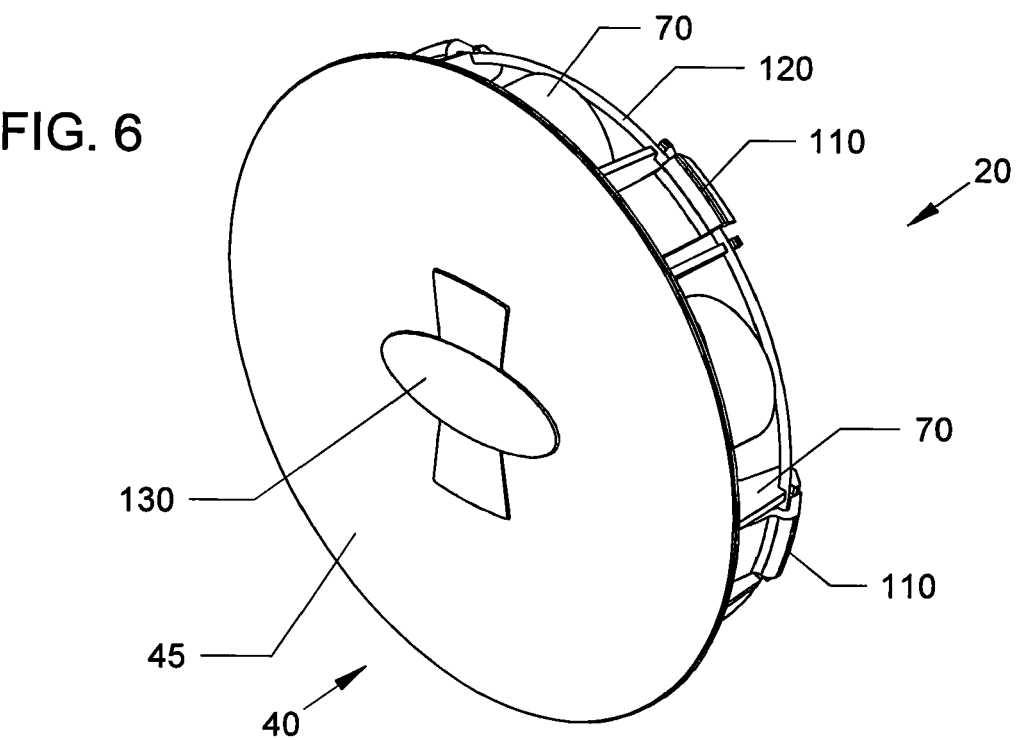
FIG. 6 is a front right perspective view of the large cover assembly with large cap.

FIG. 6 is a front right perspective view of the large cover assembly 20 with the large cap assembly 40, with the base bracket 70 with base retaining hoop spring 120 held to the bracket 70 by base retaining tabs 110.

Figure 7:
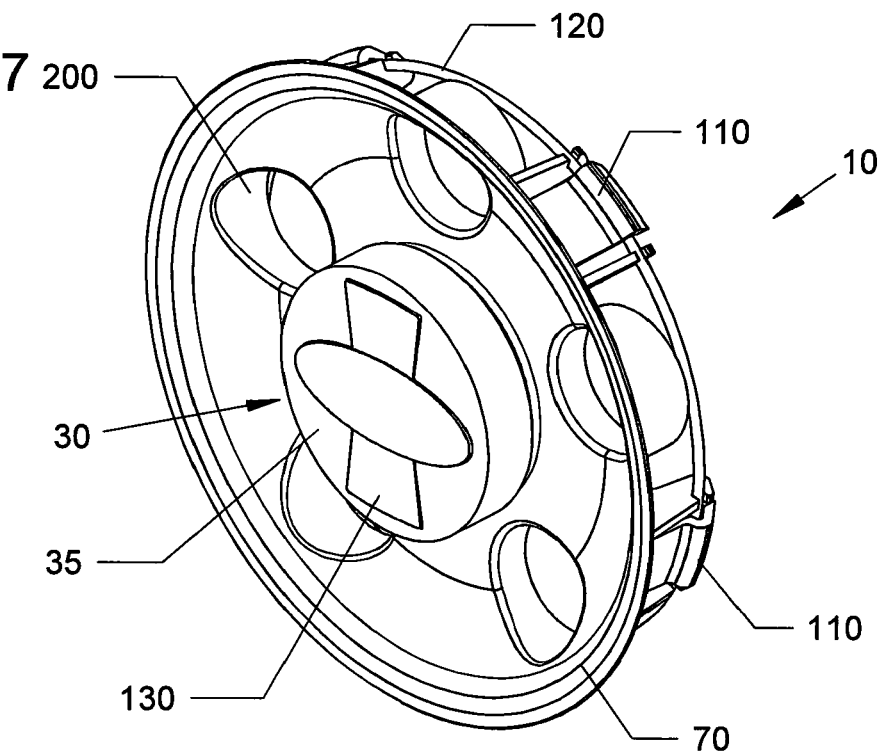
FIG. 7 is a front right perspective view of the small cover assembly with small cap.

FIG. 7 is a front right perspective view of the small cover assembly 10 with small cap assembly 30 with the base bracket 70 with base retaining hoop spring 120 held to the bracket 70 by base retaining tabs 110.

FIG. 8 is another perspective view of the large cover assembly 20 of FIGS. 5-6 with large cap assembly 40 pulled out. FIG. 9 is a rear perspective view of the cover assembly with large cap of FIG. 8.

Figure 10:
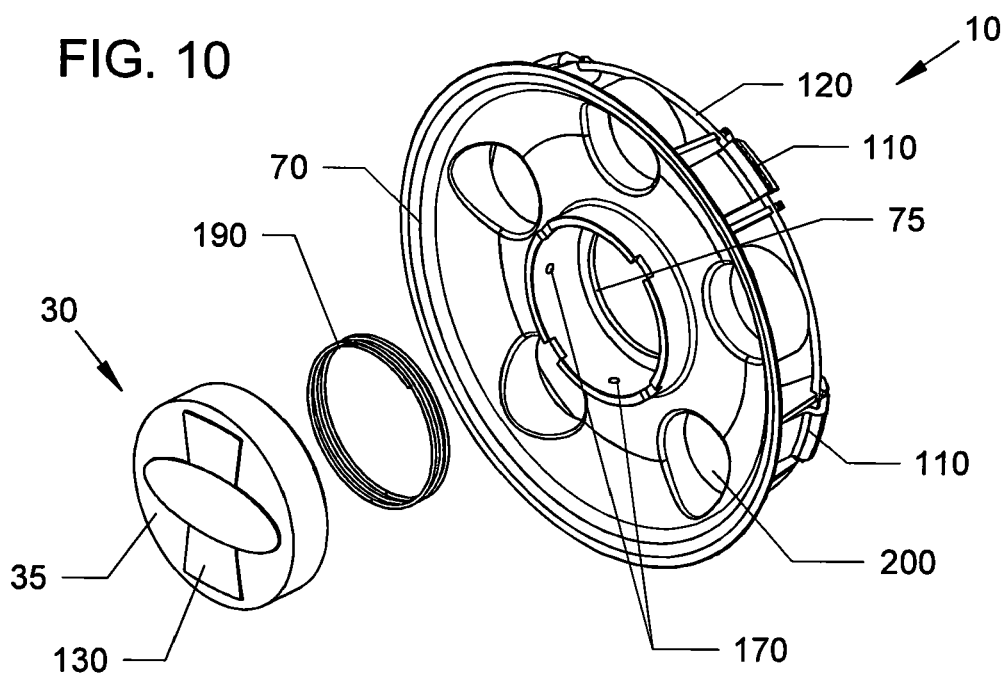
FIG. 10 is another perspective view of the small cover assembly of FIG. 7 with small cap assembly pulled out.

FIG. 10 is another perspective view of the small cover assembly 10 of FIG. 7 with small cap assembly 30 pulled out, and showing base retaining hoop spring 120 held to the bracket 70 by base retaining tabs 110.

Figure 11:
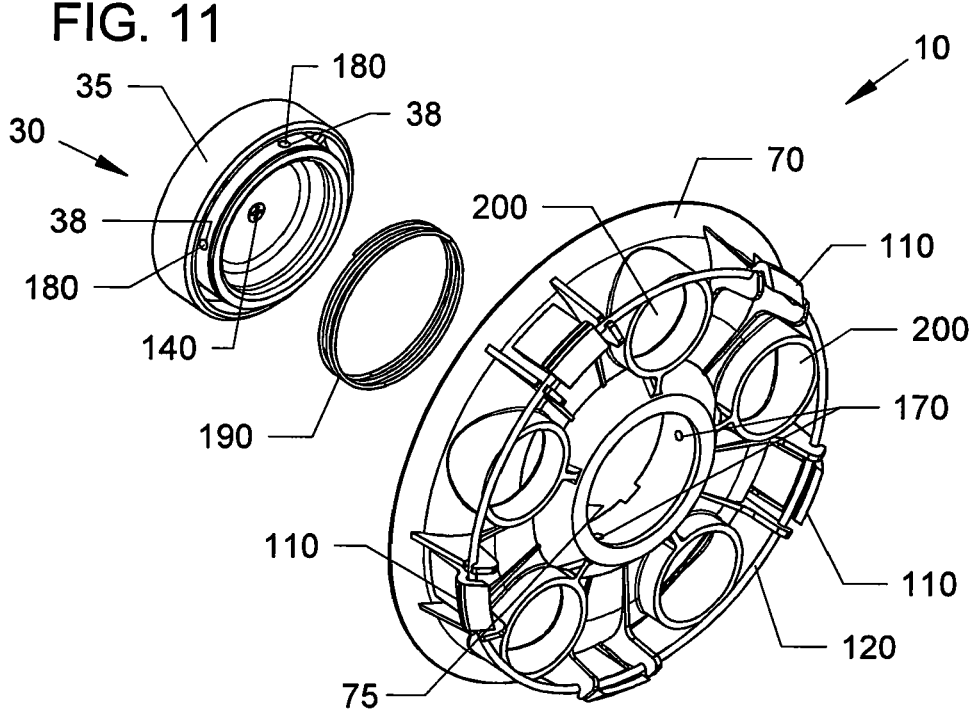
FIG. 11 is a rear perspective view of the small cover assembly with small cap assembly of FIG. 10.

FIG. 11 is a rear perspective view of the small cover assembly 10 with small cap assembly 30 of FIG. 10, and showing base retaining hoop spring 120 held to the bracket 70 by base retaining tabs 110.

Figure 12:
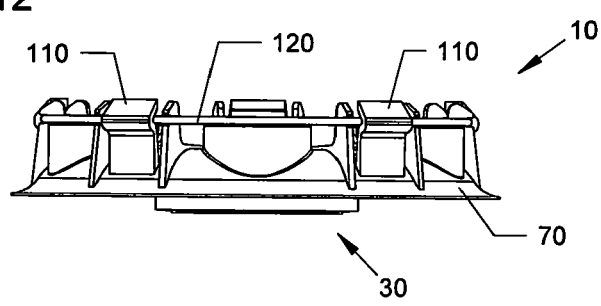
FIG. 12 is a top side view of the cover assembly of FIG. 10 with small cap installed.
Figure 13:
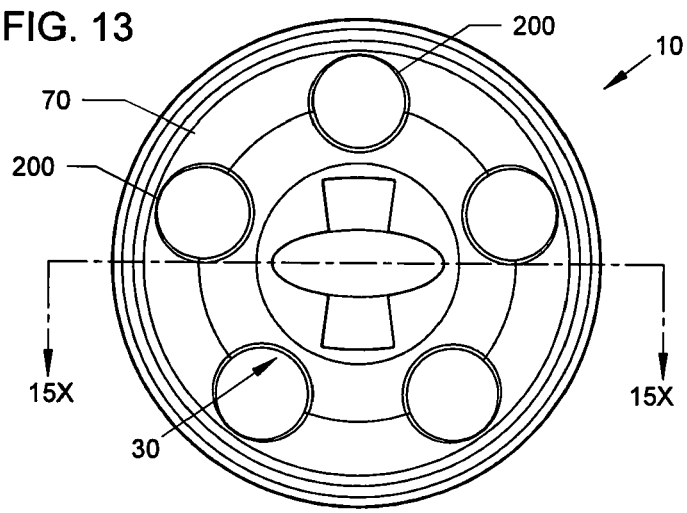
FIG. 13 is a front view of the cover assembly and small cap of FIG. 12.
Figure 14:
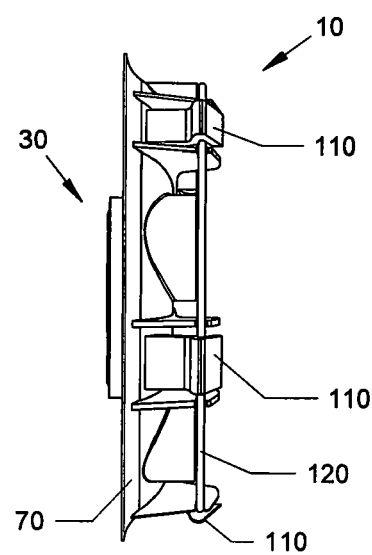
FIG. 14 is a right side view of the cover assembly with small cap of FIG. 12.

FIG. 12 is a top side view of the small cover assembly 10 of FIG. 10 with small cap assembly 30 installed. FIG. 13 is a front view of the small cover assembly 10 and small cap assembly 30 of FIG. 12. FIG. 14 is a right side view of the small cover assembly 10 with small cap assembly 30 of FIG. 12.

FIG. 15. A cross-sectional view of small cover assembly 10 with small cap of FIG. 13 along arrow 15X showing how the ball bearing retaining system works.

Figure 16:
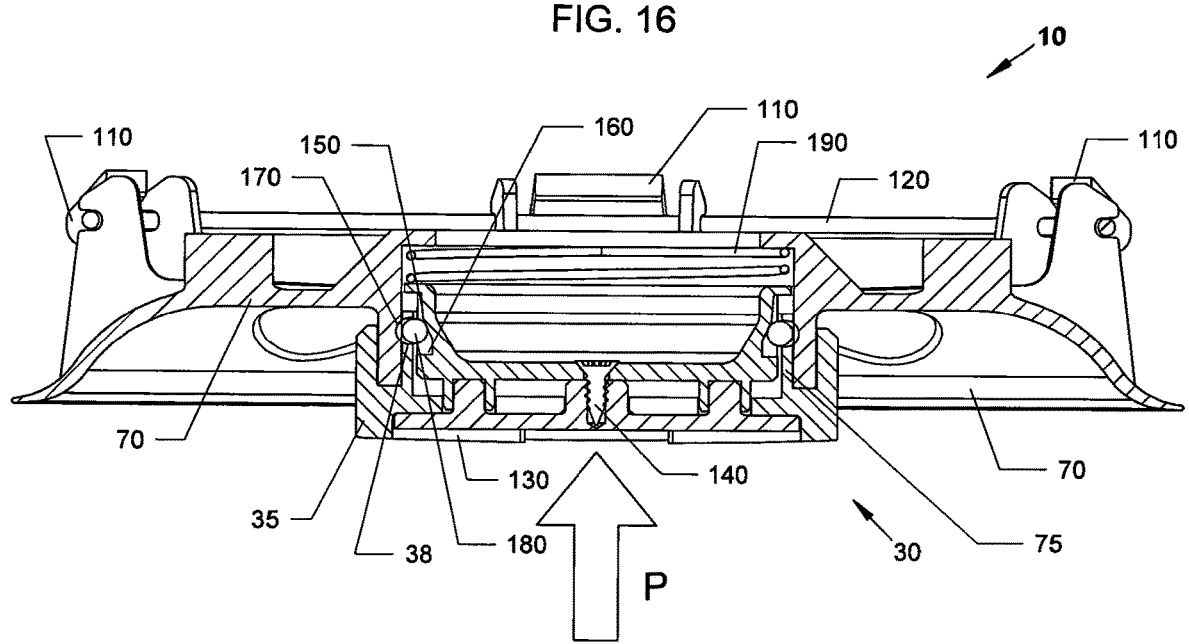
FIG. 16 is another view of the cover assembly of FIG. 15 with emblem/release button pushed up showing that the ball bearings fall away from the base bearing pockets allowing the cap assembly to be removed from the base.

FIG. 16 is another view of the small cover assembly of FIG. 15 with emblem/release button 130 pushed up in the direction of arrow P into the small cap 35 showing that the ball bearings 180 (in bearing retaining bore 38) fall away from the base bearing pockets 170 pushing to compress coil spring 190 allowing the small cap assembly 30 to be removed from the base bracket 70. The system is the same for both small and large cap sizes.

FIG. 17 is another view of the small cover assembly 10 of FIG. 15 with the cap assembly 30 removed from the base bracket 70.

The small cap assembly 30 of FIG. 15 is held in place by the ball bearings 180 which are, in turn, held captive by the small cap 35 and the cap retainer 150. The bearing retainer bore 38 can be conical with the larger opening on the inside closest to the cap retainer 150. Therefore, the ball bearing 180 cannot move beyond the inner surface of the small cap 35. However, it does protrude enough to engage the base bearing pocket 170 when the cap retainer 150 is pushed out or down, with respect to FIG. 15, by the retainer coil spring 190.

As the cap retainer 150 is pushed out, the cap retainer bearing guide 160 becomes narrower and, as a result, the ball bearing 180 is pushed fully into the conical bearing retaining bore 38 and base bearing pockets 170. At that point, the movement of the cap retainer 150 is limited, as is that of the emblem 130, since they are attached with a screw 140. With the pressure on the ball bearing 180 into the base bearing pocket 170 from the coil spring 190 and the cap retainer 150, and the ball bearing being enclosed by the conical bearing retaining bore 38, the cap small cap assembly 30 is locked onto the base 70.

Referring to FIGS. 16-17, the small cap assembly 30 can be removed from the small cover assembly 10 by first holding the small cap 35 with one hand. With the small cap being held firmly, the emblem 130 is depressed until its stopping point where the underside of the emblem meets the small cap 35. The direction of movement of the emblem is shown with the arrow in FIG. 16. Note that the small cap is already touching the cylindrical center receptacle 75 of the base 70 and will remain stationary.

The emblem 130 and the cap retainer 150 can be attached with a screw 140. This ensures that the emblem 130 and the cap retainer 150 move as one piece yet can be separated for assembly and disassembly. Once the emblem 130 and the cap retainer 150 are fully depressed, the ball bearing 180 is free to move into the wider portion of the cap retainer bearing guide 160.

With the emblem 130 still being depressed, the small cap assembly 30 is now rotated to the right or left. This motion will cause the ball bearing 180 to fully dislodge from the base bearing pocket 170 and move partially into the wider portion of the cap retainer bearing guide 160 and not protrude beyond the smaller hole of the conical bearing retaining bore 38. Note that the base 70 is held in place in the wheel by the base retaining tabs 110 and the retainer groove in the wheel 125.

The tension of the base retaining hoop spring 120 firmly locks the base retaining tabs 110 into the retainer groove in the wheel 125 and keeps the base from moving once installed onto the wheel. Note that as the small cap assembly 30 is rotated, both the emblem 130 and the cap retainer 150 move with the small cap 35 since tabs on the cap retainer 150 pass through the small cap 35 and engage the emblem 130.

Now that the small cap assembly 30, has been rotated about the center of the base 70, moving the ball bearing 180 to a flat portion of the base, yet still held captive by the cap retainer 150 and the conical bearing retainer bore 38, the small cap assembly can be removed. The cap retainer coil spring 190 will also push the small cap assembly out of the base 70 and release the small cap assembly 35 as shown in FIG. 17.

The installation of the small cap assembly 30 is the exact reverse procedure for removal of the small cap.

FIG. 18 is a front right exploded perspective view of the small wheel cover assembly 10 with the small cap assembly 30. FIG. 19 is a rear perspective view of the exploded small wheel cover assembly 10 and small cap assembly 30 of FIG. 18.

FIG. 20 is a rear view of the cover assembly 10/20 of the preceding figures. Both cap variations 10/20 are the same from this side. FIG. 21 is a rear perspective view of the cover assembly 10/20 of FIG. 20. The lug nut holes 120 allow for the lug nuts that attach the vehicle wheel 50 to the axle to be exposed. The nut 140 is visible because it secures the cap retainer 150 and the emblem 130 about the small cap 35 and, thus, forming the small assembly 30. The cap retainer 150 functions to lock and unlock the ball bearings into the base bearing pockets 170. There can be more than 1 ball bearing 180 but no less than 2. The cap retainer 150 can be a separate piece of the small cap assembly 30 or large cap assembly 40 but is affixed to and part of those assemblies. The center receptacle is a feature of the base 70 that engages the ball bearings and the small cap 35 or large cap 45.

FIG. 22 is a top side view of the large cover assembly 20 of FIGS. 19-20 with large cap assembly 40 installed. FIG. 23 is a front view of the large cover assembly 20 with large cap assembly 40 installed of FIG. 22. FIG. 24 is a right side view of the large cover assembly 20 with large cap assembly 40 installed of FIG. 22.

FIG. 25 is a cross-sectional view of the large cover assembly 20 with large cap assembly 40 installed of FIG. 23 along arrow 25X.

FIG. 26 is a front exploded view of the large wheel cover assembly 20 showing large cap assembly 40 installed of FIG. 22. FIG. 27 is a rear view of the exploded view of the large wheel cover assembly 20 with large cap assembly 40 of FIG. 26.

Referring to FIGS. 22-27, the large cover assembly 20 and large cap assembly 40 work similar to the small cover assembly 10 and small cap assembly 30, with the exception that the large cap 45 covers both the central receptacle 75 and all of the lug nut holes 20 in the base bracket 70. The large cap assembly 40 and the small cap assembly 30 can share all parts with the exception of the small cap 35 and the large cap 45. Therefore, the installation, function and removal of the large cap assembly 40 is exactly the same as the small cap assembly 30.

The invention can also be practiced with a wheel 50 having a cylindrical center receptacle 75 or base 70 as part of the wheel 50 shown in FIG. 5. The base 70 can be either independent or integrated into the wheel 50 or made part of the wheel 50.

Second Embodiment

FIG. 28 is a front perspective view of the small cap assembly 300 with the base 330 having base retaining tabs 410 with interior cap retainer coil spring 390 and small cap 340 ready to mount to a 310 wheel having a mount rib 320, which will be described later in further detail. Small cap 340 can have an emblem release button 380 mounted thereon. FIG. 29 is a perspective view of FIG. 28 with the base 330 assembled to the wheel 310. FIG. 30 is a perspective view of the FIG. 29 with the entire small cap assembly 300 assembled to the wheel 310.

FIG. 31 is a cross-sectional enlarged perspective view of FIG. 28 along arrows 31X. FIG. 32 is a cross-sectional enlarged perspective view of FIG. 29 along arrows 32X. FIG. 33 is a cross-sectional enlarged perspective view of FIG. 30 along arrows 33X.

Referring to FIGS. 31-33, the small cap assembly 300 can include a small cap 340 and base 330. The cap 340 can have a generally cylindrical shape with emblem/release button 380 having rear facing release button mount boss(es) 570 which can slide into and are held in place by the base of narrow depth holes 580 in the base of cavity 350 (which is shown in relation to FIGS. 42, 43, 45, 47, 49, 51, 53.

A plurality of ball bearing(s) 400 can be supported within base ball pocket(s) 430. For example, four ball bearings 400 are shown equally spaced apart from one another and supported in the base ball pocket(s) 430.

Additional components of the cap 340 are shown in FIGS. 31-34 such as a small cap lock sleeve 480, a small cap snap block sleeve 500 blocks snap from flexing and releasing when engaged, small cap index slot 510, cap retainer index slot 520, cap retainer ramp release area 540, cap retainer ramp lock area 550, release button mount boss 570, and screw(s) 590, which will be further shown and described in additional figures.

Components of the base 330 are also shown in FIGS. 31-34 such as the cap retainer coil spring 390, base retainer tabs 410, base snap arm retaining shoulder 420, base spring nest 440, and base spring retaining hooks 450, and which will be further shown and described in additional figures.

When assembled, the small cap assembly 300 (which combines the small cap 340 and base 330, the base snap arm retaining shoulder 420 on top of each of the base retaining tabs 410 snaps into the outer perimeter concave groove 325 on the cylindrical (or ring shaped) rib 320, as shown in FIGS. 30-33.

FIG. 34 is a front perspective detail showing the first step of the locking sequence in locking the small cap 340 to the base 330 shown in the previous FIGURES. This step shows the spring loaded release button 380 being pressed into the body of the cap assembly 300. Then the entire assembly 300 is slid onto the base 330 (shown in the previous drawings, for example, FIG. 33).

FIG. 35 is a front perspective view of FIG. 34 showing the second step of the locking sequence, the small cap 340 can be rotated counter-clockwise.

FIG. 36 is a front perspective view of FIG. 35 showing the third step of the locking sequence, the release button 380 can be released locking the small cap 340 to the base 330. In this configuration, the snap arms 410 of the base 330 are restrained from flexing by the small cap snap block sleeve 500 preventing the small cap assembly 300 from being removed from the mounting rib 320 of the wheel (see FIG. 33). The sequence can be reversed to remove the small cap 340 from the base 330.

FIG. 37 is an enlarged front perspective view of the small cap assembly 300 of the preceding FIGURES. FIG. 38 shows a rear perspective view of the small cap assembly 300 of FIG. 37. FIG. 39 is a front view of the small cap assembly 300 of FIG. 37. FIG. 40 is a side view of the small cap assembly 300 of FIG. 37. FIG. 41 is a rear view of the small cap assembly 300 of FIG. 37.

FIG. 42 is a front exploded perspective view of the small cap assembly 300 of FIG. 37. FIG. 43 is a rear exploded perspective view of the small cap assembly 300 of FIG. 37.

FIG. 44 is an enlarged perspective cross-sectional view of the cap 340 of the preceding FIGURES separated from a perspective view of the base 330. FIG. 44 is the first of five figures illustrating the details of the locking sequence that secures the small cap 340 to the base 330. The small cap components are sectioned to better illustrate the internal details. The small cap 340 is separated from the base 330 in this view. FIG. 45 is a cross-sectional view of the small cap 340 and base 330 of FIG. 44 along arrows 45X.

FIG. 46 is another perspective view of the cap 340 and base 330 of FIG. 44 with the spring loaded release button 380 pressed into the small cap 340. This in turn slides the cap retainer to the right and orients the lock ball ramp release area 540 and part of the cap retainer lock ball ramp 530 such that the ball bearing(s) 400 can fall toward the axis of the assembly and permit the small cap 340 to slide over the base 330 without the ball bearing(s) 400 interfering with the base 330. FIG. 47 is a cross-sectional view of the small cap 340 and base 330 of FIG. 46 along arrows 47X.

FIG. 48 is an enlarged perspective view of a cut-away view of the cap 340 attached to the base 330 of the preceding FIGURES. The release button 380 is still pressed into the small cap 340 maintaining the ball bearing orientation of FIG. 46. FIG. 49 is a cross-sectional view of the cap 340 attached to base 330 of FIG. 48 along arrows 49X.

Referring to FIGS. 42-49, the screw(s) 590 pass through the actuator plate mount screw holes 370 inside of cap retainer 360 and through holes 585 in small cap 340 and into threaded openings 575 in on the rear facing ends of mount boss(s) 570 of the emblem/release button 380 to fixably hold the button 380 to cap retainer 360.

FIG. 50 is another perspective view of FIG. 48 with the small cap 340 rotated counter-clockwise relative to the base 330. This rotation aligns the lock ball(s) 400 with the ball pocket(s) 430 in the base 330. It also rotates the cap retainer index tab 520 out of the small cap index slot 510 and under the base retaining stop 470. Cap retainer index tab(s) 520 (shown in FIG. 42-43) passes into base index slot(s) 460 (as seen in FIGS. 42, 44) in the base 330 when the small cap 330 is attached to the base 330. Note that the release button 380 is still depressed and the ball bearing(s) 440 are free to float into and out of the base ball pocket(s) 430. In this configuration, the base 330 and the small cap 340 are still free to rotate relative to each other. FIG. 51 is a cross-sectional view of the cap 340 and base 330 of FIG. 50 along arrows 51X.

FIG. 52 is another perspective view of the cap 340 and base 330 of FIG. 50 with the spring release button 380 returned to an undepressed condition. This results in the ball bearing ramp 530 pressing the lock ball(s) 400 back into the small cap ball pocket(s) 430. This causes the outside portion of the ball bearing(s) 400 to protrude from the outside of the small cap ball pocket (#490) and into the base ball pocket 430. Attempting to rotate the small cap 340 relative to the base 330 would now result in the ball bearing(s) 400 striking the side of the small cap ball pocket 490 preventing rotation. This provides radial and axial locking of the small cap 340 to the base 330. The cap retainer index tab 520 can also now positioned under the base cover retaining stop 470 which provides another level of axial locking to the assembly 300. FIG. 53 is a cross-sectional view of the cap and base of FIG. 52 along arrows 53X.

The small cap is shown which can cover the center hole in the wheel while leaving the lug nut holes with the lug nuts from the wheel exposed. The small cap can have a first cap diameter substantially similar to the center hole diameter.

While this embodiment shows only the small cap, this embodiment can also be used with a larger cap similar to the ones in the previous embodiments. The larger can be used for covering both the center hole and the lug nut holes. The larger cap can have a diameter substantially similar to a diameter across the lug nut holes, wherein interchanging the small cap and the larger cap with each other results in changing the aesthetic appearance of the wheel.

Third Embodiment

FIG. 54 is a front perspective exploded view of an OEM (original equipment manufacturer) wheel 610 with the small cap 340 and base 330 positioned to be mounted to the wheel 610 using a novel adapter ring 630.

FIG. 55 is a perspective view of the wheel with installed adapter ring 630 with cap assembly 300 comprising the cap 340 and base 330 (inside) ready to be attached to the wheel 610.

FIG. 56 is a perspective view of FIG. 55 with the installed adapter ring 630 and cap assembly 300 attached base 330 with cap 340 ready to be installed.

FIG. 57 is a perspective view of FIG. 56 with cap assembly 300 locked on the adapter ring 630 attached to the wheel 610.

FIG. 58 is an enlarged cross-sectional view of wheel 610, adapter ring 630, base 330 and small cap 340 of FIG. 54 along arrows 58X.

FIG. 59 is an enlarged cross-sectional view of wheel 610, adapter ring 630, cap assembly 300 comprising the base 330 and small cap 340 of FIG. 55 along arrows 59X.

FIG. 60 is an enlarged cross-sectional view of wheel 610, installed adapter ring 630 and cap assembly 300 comprising the attached base 330 and small cap 340 of FIG. 56 along arrows 60X.

FIG. 61 is an enlarged cross-sectional view of wheel 610, installed adapter ring 630 and attached base and locked small cap of FIG. 57 along arrows 61X.

FIG. 62 is a front perspective view of the adapter ring 630 of the preceding FIGURES. FIG. 63 is a rear perspective view of the adapter ring 630 of FIG. 62. FIG. 64 is a top view of the adapter ring 630 of FIG. 62. FIG. 65 is a front view of the adapter ring 630 of FIG. 62. FIG. 66 is a side view of the adapter ring 630 of FIG. 62. FIG. 67 is a rear view of the adapter ring 630 of FIG. 62.

Referring to FIGS. 54-67, the cap assembly 300 comprising a small cap 340 and base 330 are the same components as those previously described in FIGS. 24-53. In FIGS. 54-67, the novel adapter ring 630 used with an OEM wheel 610 is to be used with the novel cap assembly 300.

Referring to FIGS. 54-67, the adapter ring 610 can have a generally ring shape with a proximal end having an adapter ring hub base mount geometry that is a mount rib similar to mount rib 320, and an adapter ring stop shoulder 660 with an outer perimeter concave groove 675 formed between the shoulder 660 and the rib area 670. The outer perimeter concave groove 675 functioning similar to the outer perimeter concave groove 325 previously described. Extending rearwardly from the adapter ring 610 can be a plurality of adapter ring snap legs 640, each having outwardly protruding adapter ring snap shoulders 650.

To be installed, the outer ends of the legs are inserted into the central opening of the wheel 610 and snap about the snap mount geometry 620 (shown more clearly in FIG. 70) inside the central opening of the wheel 610. The snap mount geometry 620 of the OEM wheel includes an inwardly protruding ring shaped edge inside of the cylindrical center receptacle of the vehicle wheel 610 so that the legs 640 initially bend inward toward one another until the shoulder 650 snaps about the inwardly protruding ring shaped edge 620 inside of the cylindrical center receptacle of the vehicle wheel 610.

Next, the cap assembly 300 base 330 snaps into the adapter 630 similar to the base 330 attaching the wheel 310 of the previous Figures. Next the cap 340 attaches and detaches to the base 330 similar to the previous embodiment.

FIG. 68 is a front perspective view of an OEM wheel 610 with a base 330 mounted via an adapter ring 630 of FIG. 56 with a large cap assembly 680 is shown ready to mount to the base 330. This large cap assembly 680 is identical to the previously illustrated small cap assembly 300 with the addition of a wide "brim" that shields the wheels mounting lug nuts (similar to the aesthetic effect of the large cap 45 in the previous embodiments). In this embodiment, the back of the large cap 690 can have rearwardly extending components similar to the cylindrical shape and interior components of the small cap 340 previously described. With the large cap assembly 680 mounted and dismounted in an identical fashion.

FIG. 69 is a perspective view of FIG. 68 showing the large cap assembly 680 mounted to the wheel 610. FIG. 70 is a cross-sectional view of the wheel 610 and large cap assembly 680 of FIG. 69 along arrows 70X, showing the lug shield 700 integrated onto a small cap 340 body with components including the emblem/release button 380 and cap retainer 360 shown.

FIG. 71 is a front view of the large cap assembly 680 of FIG. 68. FIG. 72 is a side view of the large cap assembly 680 of FIG. 71. FIG. 73 is a rear view of the large cap assembly 680 of FIG. 71.

FIG. 74 is a perspective view of a wheel 310/610 of the preceding FIGURES with a base 330 mounted, with the small cap 340 and the large cap 690 are shown to illustrate the alternative options of mounting either the large cap 690 or small cap 340 to the base 330.

Fourth Embodiment

FIG. 75 shows a perspective view of a small cap assembly with no lock ball feature (NLBF) 710 of the cap 720 separated from the base 750 with no lock ball feature 710 shown with the base 750 separated from the small cap, with bosses/studs 760 extending outward from the lock ring 740.

This embodiment is an alternative to using the ball bearing(s) 400 and related components of the preceding embodiments.

FIG. 76 is another view of the cap 720 engaged to the base 750 of FIG. 75 with a partial ghost view showing the bosses/studs 760 inserted into elongated slots 700 which narrow down from open outer end into a lower end in the direction of arrow I, but not locked. The lock bosses/studs 760 can be seen aligned with and engaged to the radial locator slots 770. The small cap 720 is compressing the spring 390 in this configuration and hand pressure must be maintained to keep the small cap 720 engaged to the base 750. The release button 730 has been pressed down which aligns the lock bosses/studs 760 with the lock boss/stud paths 70 such that the small cap assembly can be rotated slightly CCW to align the lock bosses/studs 760 to the axial lock slots 780.

FIG. 77 is another view of the cap engaged to the base of FIG. 76 with the lock bosses bottomed out in the radial locator slots. The small cap assembly (with its affixed cap retainer and release button) has been rotated CCW in the direction of arrow R which positions the lock bosses/studs 760 under the axial lock slots 780. The axial slots 780 can have a reverse L shape. The small cap 720 is still spring loaded at this point.

FIG. 78 is another view of the cap 720 engaged to the base 750 of FIG. 77 showing the lock bosses/studs 760 fully seating into the axial lock slots 780 (the cap retainer spring 390 shown in FIG. 75 and described in previous figures pushes the emblem/release button 730 outward in the direction of arrow P). The spring loaded release button 730 has been released and has returned to the up position which seats the lock bosses/studs 760 into the axial lock slots 780. This locks the small cap 720 to the base 750.

The small cap assembly 710 can mount to the different wheels with or without an adapter ring 630 as previous shown and described.

Although the embodiments may show certain numbers of components such as ball bearings, bosses/studs, and the like, the invention can be used with less or more than those numbers shown and described, as needed.

Modifications, and/or changes can also be made as needed to any of the components shown and described in any of the FIGURES.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A wheel assembly for a vehicle, comprising:
   at least one cap assembly, each cap assembly comprising a base bracket and a cap adapted to be attached to an exposed side of a vehicle wheel having a front side with a plurality of lug nut holes surrounding a cylindrical center receptacle with a center hole, the center hole having a center hole diameter,
   the base bracket having a generally cylindrical shape with a proximate end and a distal end, the base bracket having a bracket diameter, the distal end of the base bracket adaptable to attach into the cylindrical center receptacle of the vehicle wheel, and
   the cap having a generally cylindrical shape with an open bottom end and an outer face end, with the open bottom end of the cap for attaching about the proximate end of the base bracket; and
   an adapter ring having a proximate end and a distal end, the proximate end of the adapter ring having rib edges for attaching to the distal end of the base bracket, the proximate end of the adapter ring having a plurality of legs with an outer end of the legs having outwardly protruding edges facing away from one another, the outwardly protruding edges adapted to fit about an inwardly protruding ring shaped edge inside of the cylindrical center receptacle of the vehicle wheel, wherein the cap includes a depressible release button on the outer face end;
   a spring within the open bottom end of the cap between the depressible release button and the base bracket, the depressible release button being depressible and rotatable in one direction to an attach position to attach the cap assembly to the vehicle wheel, and the depressible release button being depressible and rotatable in an opposite direction to a release position to release the cap assembly from the vehicle wheel;
   wherein the open bottom of the cap includes:
   ball bearings and base bearing pockets which allow the cap to rotate relative to the base bracket from the attach position to the release position and back and move the cap relative to the base bracket.

2. A wheel assembly for a vehicle, comprising:
   at least one cap assembly, each cap assembly comprising a base bracket and a cap adapted to be attached to an exposed side of a vehicle wheel having a front side with a plurality of lug nut holes surrounding a cylindrical center receptacle with a center hole, the center hole having a center hole diameter,
   the base bracket having a generally cylindrical shape with a proximate end and a distal end, the base bracket having a bracket diameter, the distal end of the base bracket adaptable to attach into the cylindrical center receptacle of the vehicle wheel, and
   the cap having a generally cylindrical shape with an open bottom end and an outer face end, with the open bottom end of the cap for attaching about the proximate end of the base bracket; and
   an adapter ring having a proximate end and a distal end, the proximate end of the adapter ring having rib edges for attaching to the distal end of the base bracket, the proximate end of the adapter ring having a plurality of legs with an outer end of the legs having outwardly protruding edges facing away from one another, the outwardly protruding edges adapted to fit about an inwardly protruding ring shaped edge inside of the cylindrical center receptacle of the vehicle wheel, wherein the cap includes a depressible release button on the outer face end;
   a spring within the open bottom end of the cap between the depressible release button and the base bracket, the depressible release button being depressible and rotatable in one direction to an attach position to attach the cap assembly to the vehicle wheel, and the depressible release button being depressible and rotatable in an opposite direction to a release position to release the cap assembly from the vehicle wheel,
   wherein the cap includes outward extending studs which slide into elongated slots in the base bracket and into reverse L shaped slots in the base bracket to lock the cap to the base bracket.

3. A wheel assembly for a vehicle, comprising:
at least one cap assembly, each cap assembly comprising a base bracket and a cap adapted to be attached to an exposed side of a vehicle wheel having a front side with a plurality of lug nut holes surrounding a cylindrical center receptacle with a center hole, the center hole having a center hole diameter,
the base bracket having a generally cylindrical shape with a proximate end and a distal end, the base bracket having a bracket diameter, the distal end of the base bracket adaptable to attach into the cylindrical center receptacle of the vehicle wheel, and
the cap having a generally cylindrical shape with an open bottom end and an outer face end, with the open bottom end of the cap for attaching about the proximate end of the base bracket; and
an adapter ring having a proximate end and a distal end, the proximate end of the adapter ring having rib edges for attaching to the distal end of the base bracket, the proximate end of the adapter ring having a plurality of legs with an outer end of the legs having outwardly protruding edges facing away from one another, the outwardly protruding edges adapted to fit about an inwardly protruding ring shaped edge inside of the cylindrical center receptacle of the vehicle wheel, wherein the at least one cap assembly includes:
a first cap for covering the center hole in the wheel while leaving the lug nut holes with the lug nuts from the wheel exposed, the first cap having a first cap diameter substantially similar to the center hole diameter; and
a second cap for covering both the center hole and the wheel lug nut holes, the second cap having a diameter substantially similar to a diameter across the lug nut holes, wherein interchanging the first cap and the second cap with each other results in changing the aesthetic appearance of the wheel,
wherein the first cap and the second cap each includes:
a depressible release button on the outer face end;
a spring within the open bottom end of each cap between the depressible release button and the base bracket, the depressible release button being depressible and rotatable in one direction to attach each cap assembly to the vehicle wheel, and the depressible release button being depressible and rotatable on an opposite direction to release the cap assembly from the vehicle wheel,
wherein the open bottom of each cap includes:
ball bearings which allow the cap to rotate relative to the base bracket from an attach position to a release position and back and to move the cap in and out relative to the bracket.

4. A wheel assembly for a vehicle, comprising:
at least one cap assembly, each cap assembly comprising a base bracket and a cap adapted to be attached to an exposed side of a vehicle wheel having a front side with a plurality of lug nut holes surrounding a cylindrical center receptacle with a center hole, the center hole having a center hole diameter,
the base bracket having a generally cylindrical shape with a proximate end and a distal end, the base bracket having a bracket diameter, the distal end of the base bracket adaptable to attach into the cylindrical center receptacle of the vehicle wheel, and
the cap having a generally cylindrical shape with an open bottom end and an outer face end, with the open bottom end of the cap for attaching about the proximate end of the base bracket; and
an adapter ring having a proximate end and a distal end, the proximate end of the adapter ring having rib edges for attaching to the distal end of the base bracket, the proximate end of the adapter ring having a plurality of legs with an outer end of the legs having outwardly protruding edges facing away from one another, the outwardly protruding edges adapted to fit about an inwardly protruding ring shaped edge inside of the cylindrical center receptacle of the vehicle wheel, wherein the at least one cap assembly includes:
a first cap for covering the center hole in the wheel while leaving the lug nut holes with the lug nuts from the wheel exposed, the first cap having a first cap diameter substantially similar to the center hole diameter; and
a second cap for covering both the center hole and the wheel lug nut holes, the second cap having a diameter substantially similar to a diameter across the lug nut holes, wherein interchanging the first cap and the second cap with each other results in changing the aesthetic appearance of the wheel,
wherein the first cap and the second cap each includes:
a depressible release button on the outer face end;
a spring within the open bottom end of each cap between the depressible release button and the base bracket, the depressible release button being depressible and rotatable in one direction to attach each cap assembly to the vehicle wheel, and the depressible release button being depressible and rotatable on an opposite direction to release the cap assembly from the vehicle wheel,
wherein the cap includes outward extending studs which slide into elongated slots in the base bracket and into reverse L shaped slots in the base bracket to lock the cap to the base bracket.

5. A wheel assembly for a vehicle, comprising:
a first cap assembly comprising a base bracket and a pair of caps, with each cap adapted to be attached to an exposed side of a first vehicle wheel having a front side with a plurality of lug nut holes surrounding a cylindrical center receptacle with a center hole, the center hole having a center hole diameter,
the base bracket having a generally cylindrical shape with a proximate end and a distal end, the base bracket having a bracket diameter, the distal end of the base bracket adaptable to attach into the cylindrical center receptacle of the vehicle wheel, and
the pair of caps includes a small cap and a large cap, each of the pair of caps having a generally cylindrical shape with an open bottom end and an outer face end, with the open bottom end of the cap for attaching about the proximate end of the base bracket,
the small cap for covering the center hole in the wheel while leaving the lug nut holes with the lug nuts from the wheel exposed, the small cap having a first cap diameter substantially similar to the center hole diameter;
the large cap for covering both the center hole and the wheel lug nut holes, the large cap having a diameter substantially similar to a diameter across the lug nut holes, wherein interchanging the small cap and the large cap with each other results in changing the aesthetic appearance of the first vehicle wheel; and
an adapter ring having a proximate end and a distal end, the proximate end of the adapter ring having the rib edges, the rib edges form a concave curved groove in which the inwardly protruding edges of the plurality of tabs snap into, the proximate end of the adapter ring having a plurality of legs with an outer end of the legs having outwardly protruding edges facing away from one another, the outwardly protruding edges adapted to fit about inwardly protruding ring shaped edge inside of the cylindrical center receptacle of the vehicle wheel, wherein the distal end of the base bracket includes:
a plurality of tabs extending therefrom, each the tabs having inwardly protruding edges facing toward one another, which are attachable about rib edges on the cylindrical center receptacle of the vehicle wheel.

6. The wheel assembly of claim 5, wherein the rib edges are in a ring configuration that is pre-formed on the cylindrical center receptacle of the vehicle wheel, and the rib edges form a concave curved groove in which the inwardly protruding edges of the plurality of tabs snap into.

7. A wheel assembly for a vehicle, comprising:
a first cap assembly comprising a base bracket and a pair of caps, with each cap adapted to be attached to an exposed side of a first vehicle wheel having a front side with a plurality of lug nut holes surrounding a cylindrical center receptacle with a center hole, the center hole having a center hole diameter,
the base bracket having a generally cylindrical shape with a proximate end and a distal end, the base bracket having a bracket diameter, the distal end of the base bracket adaptable to attach into the cylindrical center receptacle of the vehicle wheel, and
the pair of caps includes a small cap and a large cap, each of the pair of caps having a generally cylindrical shape with an open bottom end and an outer face end, with the open bottom end of the cap for attaching about the proximate end of the base bracket,
the small cap for covering the center hole in the wheel while leaving the lug nut holes with the lug nuts from the wheel exposed, the small cap having a first cap diameter substantially similar to the center hole diameter;
the large cap for covering both the center hole and the wheel lug nut holes, the large cap having a diameter substantially similar to a diameter across the lug nut holes, wherein interchanging the small cap and the large cap with each other results in changing the aesthetic appearance of the first vehicle wheel; and
an adapter ring having a proximate end and a distal end, the proximate end of the adapter ring having the rib edges, the rib edges form a concave curved groove in which the inwardly protruding edges of the plurality of tabs snap into, the proximate end of the adapter ring having a plurality of legs with an outer end of the legs having outwardly protruding edges facing away from one another, the outwardly protruding edges adapted to fit about inwardly protruding ring shaped edge inside of the cylindrical center receptacle of the vehicle wheel, wherein the outwardly protruding edge on each of plurality of the legs of the adapter ring each includes an outwardly protruding adapter ring shoulder adjacent to and spaced inward from the outer end of each of the legs which snap about the inwardly protruding ring shaped edge inside of the cylindrical center receptacle of the vehicle wheel.

8. A wheel assembly for a vehicle, comprising:
a first cap assembly comprising a base bracket and a pair of caps, with each cap adapted to be attached to an exposed side of a first vehicle wheel having a front side with a plurality of lug nut holes surrounding a cylindrical center receptacle with a center hole, the center hole having a center hole diameter,
the base bracket having a generally cylindrical shape with a proximate end and a distal end, the base bracket having a bracket diameter, the distal end of the base bracket adaptable to attach into the cylindrical center receptacle of the vehicle wheel, and
the pair of caps includes a small cap and a large cap, each of the pair of caps having a generally cylindrical shape with an open bottom end and an outer face end, with the open bottom end of the cap for attaching about the proximate end of the base bracket,
the small cap for covering the center hole in the wheel while leaving the lug nut holes with the lug nuts from the wheel exposed, the small cap having a first cap diameter substantially similar to the center hole diameter;
the large cap for covering both the center hole and the wheel lug nut holes, the large cap having a diameter substantially similar to a diameter across the lug nut holes, wherein interchanging the small cap and the large cap with each other results in changing the aesthetic appearance of the first vehicle wheel; and
an adapter ring having a proximate end and a distal end, the proximate end of the adapter ring having the rib edges, the rib edges form a concave curved groove in which the inwardly protruding edges of the plurality of tabs snap into, the proximate end of the adapter ring having a plurality of legs with an outer end of the legs having outwardly protruding edges facing away from one another, the outwardly protruding edges adapted to fit about inwardly protruding ring shaped edge inside of the cylindrical center receptacle of the vehicle wheel;
a spring within the open bottom end of each cap between a depressible release button and the base bracket, the depressible release button being depressible and rotatable in one direction to attach each cap assembly to the vehicle wheel, and the depressible release button being depressible and rotatable in one an opposite direction to release the cap assembly from the vehicle wheel; wherein the open bottom of each cap includes:
ball bearings and base bearing pockets which allow each cap to rotate relative to the base bracket from an attach position to a release position and back and move each cap relative to each base bracket.

9. A wheel assembly for a vehicle, comprising:
a first cap assembly comprising a base bracket and a pair of caps, with each cap adapted to be attached to an exposed side of a first vehicle wheel having a front side with a plurality of lug nut holes surrounding a cylindrical center receptacle with a center hole, the center hole having a center hole diameter,
the base bracket having a generally cylindrical shape with a proximate end and a distal end, the base bracket having a bracket diameter, the distal end of the base bracket adaptable to attach into the cylindrical center receptacle of the vehicle wheel, and
the pair of caps includes a small cap and a large cap, each of the pair of caps having a generally cylindrical shape with an open bottom end and an outer face end, with the open bottom end of the cap for attaching about the proximate end of the base bracket,
the small cap for covering the center hole in the wheel while leaving the lug nut holes with the lug nuts from the wheel exposed, the small cap having a first cap diameter substantially similar to the center hole diameter;
the large cap for covering both the center hole and the wheel lug nut holes, the large cap having a diameter substantially similar to a diameter across the lug nut holes, wherein interchanging the small cap and the large cap with each other results in changing the aesthetic appearance of the first vehicle wheel; and an adapter ring having a proximate end and a distal end, the proximate end of the adapter ring having the rib edges, the rib edges form a concave curved groove in which the inwardly protruding edges of the plurality of tabs snap into, the proximate end of the adapter ring having a plurality of legs with an outer end of the legs having outwardly protruding edges facing away from one another, the outwardly protruding edges adapted to fit about inwardly protruding ring shaped edge inside of the cylindrical center receptacle of the vehicle wheel;

a spring within the open bottom end of each cap between a depressible release button and the base bracket, the depressible release button being depressible and rotatable in one direction to attach each cap assembly to the vehicle wheel, and the depressible release button being depressible and rotatable in one opposite direction to release the cap assembly from the vehicle wheel; wherein the small cap and the large cap each includes outward extending studs which slide into elongated slots in the base bracket and into reverse L shaped slots in the base bracket to lock the cap to the base bracket.

* * * * *